US008250614B1

(12) United States Patent
Ellis et al.

(10) Patent No.: US 8,250,614 B1
(45) Date of Patent: Aug. 21, 2012

(54) SYSTEMS AND METHODS FOR PROVIDING AN ON-DEMAND MEDIA PORTAL AND GRID GUIDE

(75) Inventors: Michael D. Ellis, Boulder, CO (US); William L. Thomas, Bixby, OK (US); Matthew Scott Reichardt, Wayne, PA (US); Simo Elkhadiri, Marrakech (MA); Kevin Kershaw, Highlands Ranch, CO (US)

(73) Assignee: United Video Properties, Inc., Santa Clara, CA (US)

( * ) Notice: Subject to any disclaimer, the term of this patent is extended or adjusted under 35 U.S.C. 154(b) by 414 days.

(21) Appl. No.: 11/394,634

(22) Filed: Mar. 31, 2006
(Under 37 CFR 1.47)

Related U.S. Application Data

(60) Provisional application No. 60/755,749, filed on Dec. 29, 2005.

(51) Int. Cl.
*H04N 7/173* (2011.01)

(52) U.S. Cl. ............... 725/87; 725/58; 725/91; 725/100

(58) Field of Classification Search .................... 725/58, 725/86–104
See application file for complete search history.

(56) References Cited

U.S. PATENT DOCUMENTS

| | | | | |
|---|---|---|---|---|
| 5,534,911 | A | 7/1996 | Levitan | |
| 5,585,838 | A | 12/1996 | Lawler et al. | |
| 5,801,787 | A | 9/1998 | Schein et al. | |
| 6,091,883 | A | 7/2000 | Artigalas et al. | |
| 6,239,794 | B1 | 5/2001 | Yuen et al. | |
| 6,563,515 | B1 | 5/2003 | Reynolds et al. | |
| 6,564,378 | B1 | 5/2003 | Satterfield | |
| 6,664,984 | B2 * | 12/2003 | Schlarb et al. | 715/826 |
| 6,771,886 | B1 * | 8/2004 | Mendelsohn | 386/83 |
| 2001/0036271 | A1 * | 11/2001 | Javed | 380/217 |
| 2005/0240961 | A1 * | 10/2005 | Jerding et al. | 725/37 |
| 2006/0206913 | A1 * | 9/2006 | Jerding et al. | 725/95 |
| 2009/0254942 | A1 | 10/2009 | Matsuzaki | |

FOREIGN PATENT DOCUMENTS

| | | |
|---|---|---|
| WO | WO 98/47287 | 10/1998 |

* cited by examiner

*Primary Examiner* — Nicholas Corbo
(74) *Attorney, Agent, or Firm* — Ropes & Gray LLP

(57) ABSTRACT

A media-on-demand (MOD) portal application allows users to view and access from a single display interface MOD content provided by multiple media providers, such as vendors and service providers. The MOD portal application may provide grid display screens showing program listings of available media content. The grids may include rows and columns, where each row and each column includes program listings associated with a particular category. In one illustrative grid, each row includes programming from a single media vendor and each column includes programming of a particular genre. A media guidance application is also provided which automatically determines if a user does not watch an MOD program the user has ordered. The media guidance application may automatically make the unwatched program available to the user at a later time, for example by automatically recording the program or by allowing the user to access the program at the later time.

16 Claims, 25 Drawing Sheets

2800

600

Showtime -- Science Fiction

Search
Director: Kubrick
Year: After 1963

Edit Search

| | Suspense | Science Fiction | Drama |
|---|---|---|---|
| HBO | Dr. Strangelove or: How ... More... | 2001: A Space Odyssey | Barry Lyndon |
| Showtime | The Shining | | Eyes Wide Shut |
| Encore | | A Clockwork Orange | Full Metal Jacket |

2300

| |
|---|
| **Program** — 2302 |
| Vendor — 2304 |
| Provider(s) — 2306 |
| Program type (VOD, PPV, other) — 2308 |
| Program format (HD, SD, etc.) — 2310 |
| Vendor's program information<br><br>+ Vendor's category(ies) for program (hot pick, new release, etc.)<br><br>+ Vendor's rating(s) of program in different category(ies) (e.g., 1st hot pick, 9th new release, etc.)<br><br>+ Other vendor program information (price, etc.) — 2312 |
| Program storage location — 2314 |
| Data access information (for program) — 2316 |
| Supplemental program information — 2318 |

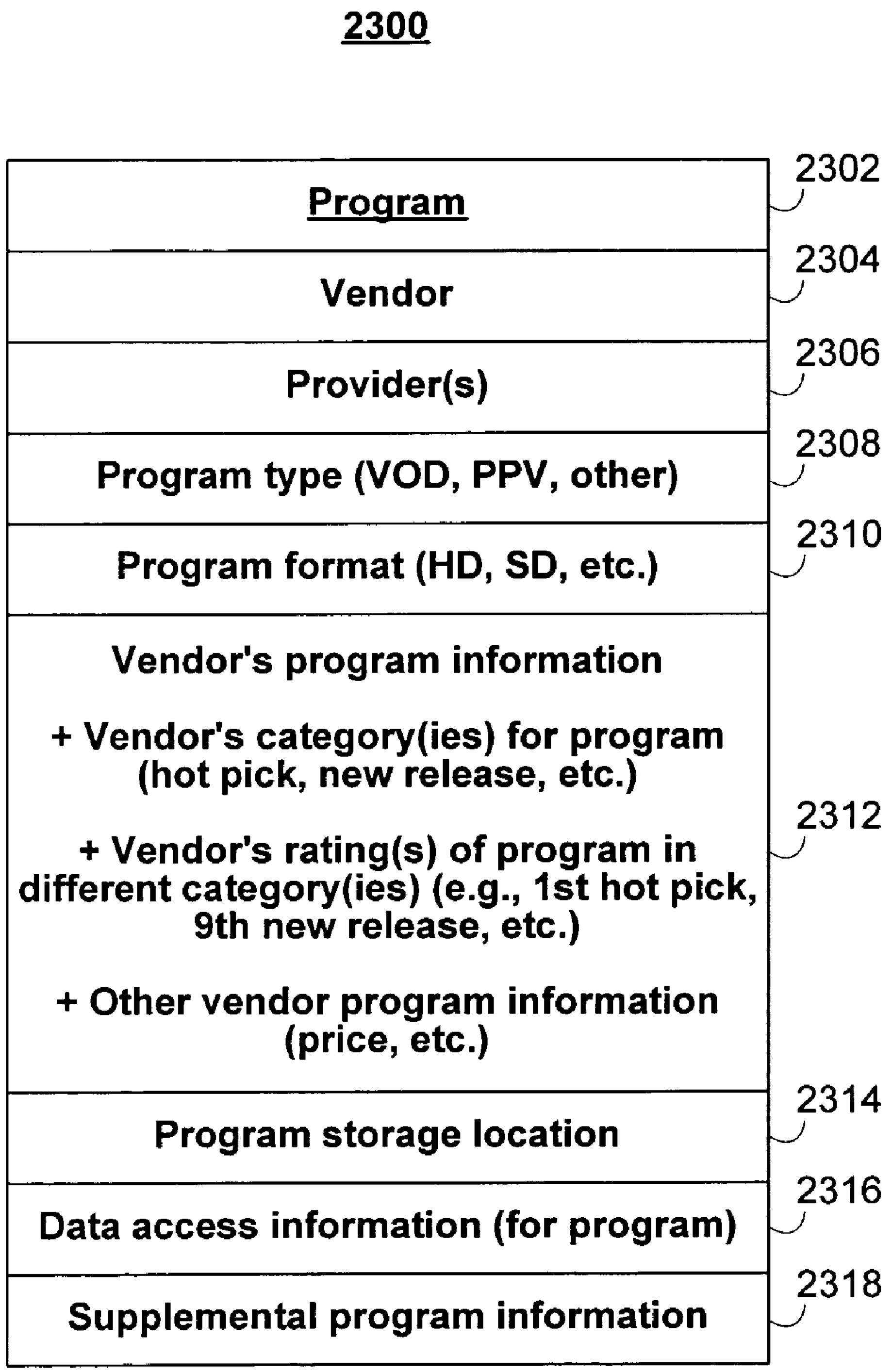

FIG. 23

SYSTEMS AND METHODS FOR PROVIDING AN ON-DEMAND MEDIA PORTAL AND GRID GUIDE

This application claims the benefit of U.S. Provisional Application No. 60/755,749, filed Dec. 29, 2005, which is hereby incorporated by reference herein in its entirety.

BACKGROUND OF THE INVENTION

This invention relates to interactive media guidance systems and methods and more particularly to interactive media guidance systems and methods that provide a portal for accessing on-demand media from one or more media vendors and/or service providers. The invention also relates to an interactive media guidance application that automatically records or otherwise makes accessible to a user on-demand programs that the user does not watch.

Media guidance applications may provide users with access to media content offered by their primary service provider. The media content may be offered directly by the service provider, or by media vendors or other content providers that the user may access through the service provider. The media content offered by the service provider and media vendors is generally presented to users in service-provider specific and vendor-specific media guidance applications. The content from each provider or vendor is also generally presented in a different media guidance environment. In order to access media content, a user may be required to access the media guidance application of the particular provider or vendor offering the media, and to utilize this media guidance application to order or access the media content. This media guidance application may be considered a "portal" to the media content of the particular provider or vendor. The description that follows may apply equally to vendors and providers, where appropriate, but for brevity will be described as it relates to vendors.

The use of independently provided vendor-specific media guidance applications may allow vendors to compete with each other on a brand-based level, rather than solely having to market and compete based on individual media offerings to customers. In competing on a brand-based level, vendors may work to develop and maintain a favorable brand image through advertising and other means in order to attract and retain a loyal customer base. Vendors may therefore focus advertising and other marketing efforts on developing a lasting brand image, thereby lessening the need for and cost of advertising individual media offerings to customers. The media vendors may rely on their advertising and brand-image to attract customers/users to their media guidance application. Once a user accesses the vendor's media guidance application, the vendor may present any number of media offerings to the user, including less popular media offerings.

The use of independent vendor-specific media guidance applications may additionally allow vendors to customize the media guidance environment they provide. The media guidance application may allow vendors to choose, for example, to feature particular media offerings within their guidance application, suggest particular programs for viewing to users, advertise programs or products to users, and/or provide users with assistance in locating programs suited to the users' tastes and interests.

However, the use of vendor-specific media guidance applications may not be convenient for users. The use of vendor-specific media guidance applications may require users to access multiple media guidance applications in order to determine the range of media offerings available to them, locate a particular media offering, and view different vendors' suggestions or featured media offerings. In addition, the user may have to adapt to different media guidance environments where each vendor may have different menus, media organization and listing schemes, and navigation procedures for exploring the vendor's media listings. The use of vendor-specific media guidance applications may therefore complicate a user's search for programming of interest and cause a user to miss available and desired programming.

For example, if a user wants to compare two different vendors' program listings, the user is required to access the first vendor's media guidance application to view that vendor's offerings, before accessing the second vendor's application. In addition to having to access and navigate through the two separate media guidance applications, the user may be required to remember the programs offered by the different vendors. If the user is looking for suggestions of programs to watch, for example, the user may have to access the first vendor's program listings, make note of the programs of interest in the program listing, then access the second vendor's program listings, make note of the programs of interest, and mentally compare the two resulting programs lists to select a desired program. The user must then access the media guidance application of the vendor offering the desired program in order to request the program for viewing.

If the user is looking for a particular program (or other media content), the user may have to access a number of different vendors' portals before locating the program of interest. Within each portal, the user may have to navigate through multiple menu screens before determining whether that vendor offers the program for viewing. A user may fail to locate a desired program if he fails to access a particular vendor's portal because, for example, he is unfamiliar with the vendor, or he forgets to access the vendor's portal. The user may also fail to locate a desired program if he fails to navigate to the menu screen containing the program of interest within the appropriate vendor's portal.

In addition, service providers' media guidance applications generally only provide access for their users to programming offered by the service provider and its associated vendors. However, users may benefit from having access to media content and programming from a greater selection of service providers and media vendors. Different service providers may provide access for their users to different media content, different media vendors, and different media content within common vendors' media offerings. Users may therefore gain access to a wider selection of media content by being provided with access to the media offered by multiple service providers.

Users may therefore benefit from systems and methods that allow the users to view program listings and access media content provided by any combination of service providers, media vendors, and other content providers to which the users may have access. In addition, users may benefit from systems and methods that allow the users to view program listings and access the media content provided by any combination of service providers, media vendors, and other content providers to which the users may have access from a single or consolidated media guidance application.

SUMMARY OF THE INVENTION

In accordance with the principles of the present invention, a media-on-demand (MOD) portal is provided that may allow a user to access program listings and program information related to media programs distributed by one or more media providers, such as media vendors and service providers. The MOD portal may also allow a user to access, order and receive on-demand media programs distributed by various media providers. The invention also provides a media guidance application that may automatically allow a user to access a program at a later time if the user orders but does not watch the program.

Providing users with a media guidance application for access to media content being offered by their service provider and its associated vendors may allow users to more efficiently access programs of their choosing. Such a media guidance application may also allow users to be more informed about different vendors' offerings, and to more effectively select programs for viewing. The media guidance application may be used to provide access to on-demand content, such as video-on-demand (VOD) content and music-on-demand, and other appropriate types of content. The application may also provide access to pay-per-view (PPV) programming, and other programming that a user may access substantially at a time of the user's choosing. The single media guidance application may be termed a media-on-demand (MOD) portal application.

In addition to, or instead of providing access to media offered by a service provider and its associated media vendors, the MOD portal may provide access to media offered by any combination of service providers, media vendors, and other media content providers. Users generally have access to programming solely from their primary service provider and its associated vendors. However, different service providers may provide access for their users to different media content, to different media vendors, and even to different media content from vendors in common with the primary service provider. Users may therefore gain access to a wider selection of media content by being provided with access to media offered by multiple service providers. The MOD portal may therefore be used to give users access to media content from different service providers, and to provide users with an integrated and common interactive media guidance application to access programming from different service providers and vendors.

The MOD portal may include both an MOD portal application and an MOD portal database. The MOD portal application may include a media guidance application which may provide users with display screens and allow users to view and select available media content. The MOD portal database may include information about content providers a user may have access to, and information about media content available from the content providers. The MOD portal application may be operative to maintain accurate media content listings in the MOD portal database. The MOD portal application may also rely on the database to obtain media content information for display to the user, and media content information used to facilitate communication with media providers. For brevity, the MOD portal is generally used to describe the MOD portal application herein, but where appropriate the description may apply equally or additionally to the MOD portal database.

The design of MOD portal application display screens may require balancing of users' and vendors' interests. On the one hand, users may benefit from the MOD portal by being able to access media content provided by different media providers from a single interface, to conveniently compare different providers' offerings, and to view the best selection of programming. On the other hand, vendors may benefit from providing vendor-specific on-demand portals in order to leverage their brand-image to attract users to their portal, and to suggest and sell their programming to users. The MOD portal application display screens balance these competing interests by providing an interface with access to multiple media providers, while also displaying different vendors' identities and the corresponding vendors' program listings in a vendor-centric format.

The present invention provides an on-demand media portal and guide for providing access to and display of multiple vendors' program listings in a unified MOD portal on-demand interface. The MOD portal application interface may provide grid display screens showing program listings organized according to at least two criteria. Each criteria may be further sub-divided into multiple categories. Each row of the grid display may contain program listings for programs corresponding to a particular category, where the different rows correspond to different categories of a first organization criterion. Similarly, each column of the grid may contain program listings for programs corresponding to a particular category of a second organization criterion. Each cell in the grid may therefore contain program listings for programs corresponding to both its row and column categories. In one approach, each row of the grid may contain programs provided by a single program vendor and each column may contain programs of a particular genre, for example. In another approach, each row may contain programs of a particular genre and each column may contain programs ordered by a ranking order, for example.

A further aspect of the present invention allows a media guidance application to make available to a user media content that the user orders but does not watch. The media guidance application may allow the user to order media content such as on-demand programming. The media guidance application may automatically determine if the user does not watch the content because, for example, the user does not play the entire program or the display screen showing the program is obscured during a significant portion of the program. If the media guidance application determines that the user does not watch the program, the media guidance application may cause the program to be automatically recorded. Alternatively, the media guidance application may automatically allow the user to access the media program at a later time without ordering or paying for the media program again from the content provider.

BRIEF DESCRIPTION OF THE DRAWINGS

Further features of the invention, its nature and various advantages, will be more apparent from the accompanying drawings and the following detailed description.

FIG. 23 is a diagram of one embodiment of a program information data structure in accordance with one embodiment of the present invention.

DETAILED DESCRIPTION OF THE INVENTION

Figure 1:
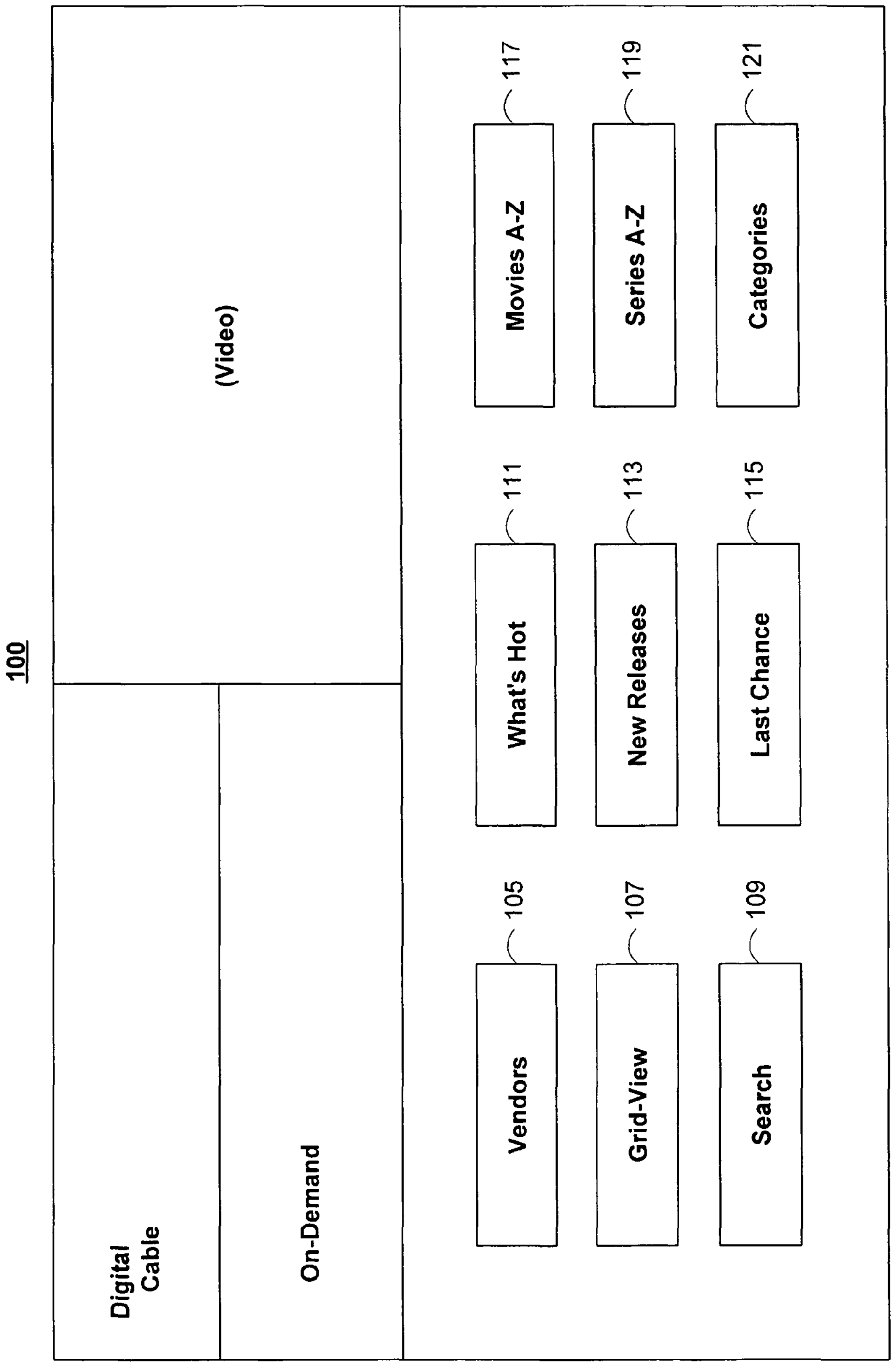
FIG. 1 shows an illustrative portal menu display screen in accordance with one embodiment of the present invention.

The amount of media available to users in any given media delivery system can be substantial. Consequently, many users desire a form of media guidance, an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides are well-known guidance applications that, among other things, allow users to navigate among and to locate television programming viewing choices and, in some systems, digital music choices. The television programming (and music programming) may be provided via traditional broadcast, cable, satellite, Internet, or any other means. The programming may be provided on a subscription basis (sometimes referred to as premium programming), as pay-per-view programs, or on-demand such as in video-on-demand (VOD) systems. The providers of the different types of programming may be referred to herein as media sources, media providers or vendors.

With the advent of the Internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as on-line applications (i.e., provided on a web-site), or as stand-alone applications or clients on hand-held computers, personal digital assistants (PDAs), playback devices (e.g., MP3 players, portable media players, iPods, etc.), or cellular telephones. In some systems, users may control equipment remotely via a media guidance application. For example, users may access an online media guide and set recordings or other settings on their in home equipment. This may be accomplished by the on-line guide controlling the user's equipment directly or via another media guide that runs on the user's equipment. Remote access of interactive media guidance applications is discussed in greater detail in Ellis et al., U.S. patent application Ser. No. 11/246,392, filed Oct. 7, 2005, which is hereby incorporated by reference herein in its entirety.

For purposes of illustration, the present invention will be described herein as relating to television-centric approaches, but this is not meant to limit the invention. For example, the present invention may be applied to allowing a user to access other types of media from a consolidated portal, such as audio media.

An illustrative interactive media guidance system in accordance with the present invention will be described herein, e.g., in connection with FIGS. 13-18. Where appropriate, references to an illustrative media guidance system as it relates to the present invention will also appear in connection with the description of the display screens, data structures, and processes, e.g., in connection with FIGS. 1-12 and 19-28.

Providing users with a media guidance application for accessing from a single interface media content being offered by the users' service provider and its associated media-on-demand vendors may allow users to more efficiently access programs of their choosing. Such a media guidance application may also allow users to be more informed about different vendors' offerings, to more effectively compare different media offerings, and to select desired programs from these different providers and vendors for viewing. The media guidance application may be used to provide access to on-demand content, such as video-on-demand (VOD) and music-on-demand content. The application may also provide access to pay-per-view (PPV) programming, and any other type of programming accessible at a time substantially of the user's choosing. The application may also provide access to other types of media content, including broadcast content. The media guidance application of the present invention is referred to herein as an MOD portal application.

The MOD portal application may be provided either as a stand-alone application, or as an integrated application integrated with an interactive media guidance application or any other application (including, but not limited to those described herein). For illustration of the present invention, the MOD portal application will be discussed as being a stand-alone application herein, but this is not meant to limit the invention. Other embodiments, such as using an MOD portal application integrated with an interactive media guidance application may also be utilized.

In addition to, or instead of, providing access to media offered by a service provider and its associated media vendors, the MOD portal application may provide access to media offered by any combination of service providers, media vendors, and any other available content providers. The MOD portal application may therefore be used to permit users to access media content from different service providers, and to provide users with an integrated, common, and/or single interactive media guidance application to access programming from different service providers and vendors.

Users may access an MOD portal (which may be referred to sometimes herein as a "portal") by using an MOD portal application running on user television equipment, user PC-TV equipment, or other user equipment. For example, the portal may be accessed by selecting an "On-Demand" menu option from a program guide menu screen. The portal may alternatively be accessed by tuning to a particular channel on user television equipment or other user equipment used to view on-demand content. The portal may also be accessed by pressing an "On-Demand" button (or other dedicated button) on a remote control or other user input device. Once the user accesses the portal, the user equipment may receive and/or load and/or launch an MOD portal application. The MOD portal application may generate and display portal display screens on the user equipment.

When the user initially accesses or logs into the portal, the user may be presented with a portal menu screen showing different selectable menu options. An exemplary portal menu screen 100 is shown in FIG. 1. The menu options of the portal menu screen may include different ways of accessing and displaying on-demand content available through the portal. Various exemplary menu options are described below.

The portal menu screen 100 may include Vendors menu option 105, which may allow users to access vendor-specific MOD program listings. When a user selects menu option 105, the user may be presented with a vendor menu screen (not shown) including a list of all vendors the MOD portal may provide access to. In response to the user selecting a particular vendor from the vendor menu screen, the MOD portal application may display vendor-specific menu screens which may include the selected vendor's program listings.

Program listings, as referred to herein, may include listings for MOD media of any type. Program listings may include audio-visual media listings, including movie and television listings, for example, audio media listings, including music, radio and sound-track listings, for example, visual media listings, including pictures, and any other appropriate types of media. For simplicity, listings will be referred to herein as program listings, but are not meant to limit the invention to any type of media.

The portal menu screen 100 may also include Grid-View menu option 107, which may allow users to access various grid display screens showing program listings. Various grid displays and organization schemes may be used, and various methods may be used to choose program listings to include in the grid. The grid display screens may display program listings of appropriate information according to at least two organization criteria. The organization criteria may correspond to vendors, program types, ratings or categories, or any other appropriate criteria. Organization criteria may also be combinations of one or more basic criteria, including combinations such as program types (movie, television series, etc.) and program genres (drama, comedy, etc.) or other appropriate combinations. The organization criteria may be determined by one or more service providers, program vendors, MOD portal providers, or users, by the MOD portal application, or by any other entities or applications. Service providers, vendors, and MOD portal providers may enter into agreements to determine preferred organization criteria. The criteria may also be determined by user preferences, which may be stored in user equipment or as part of the MOD portal. By way of example, the grid may display programs offered by different vendors (a first organization criterion) in different rows of the grid, and programs of different categories (a second organization criterion) in different columns of the grid. In such a grid, programs included in cells of a same row may be offered by the same vendor, but may correspond to different categories. Conversely, programs in a same column may be in the same category, but may be offered by different vendors. Exemplary grid display screens are shown and described in greater detail in connection with FIGS. 2-9.

Figure 6:
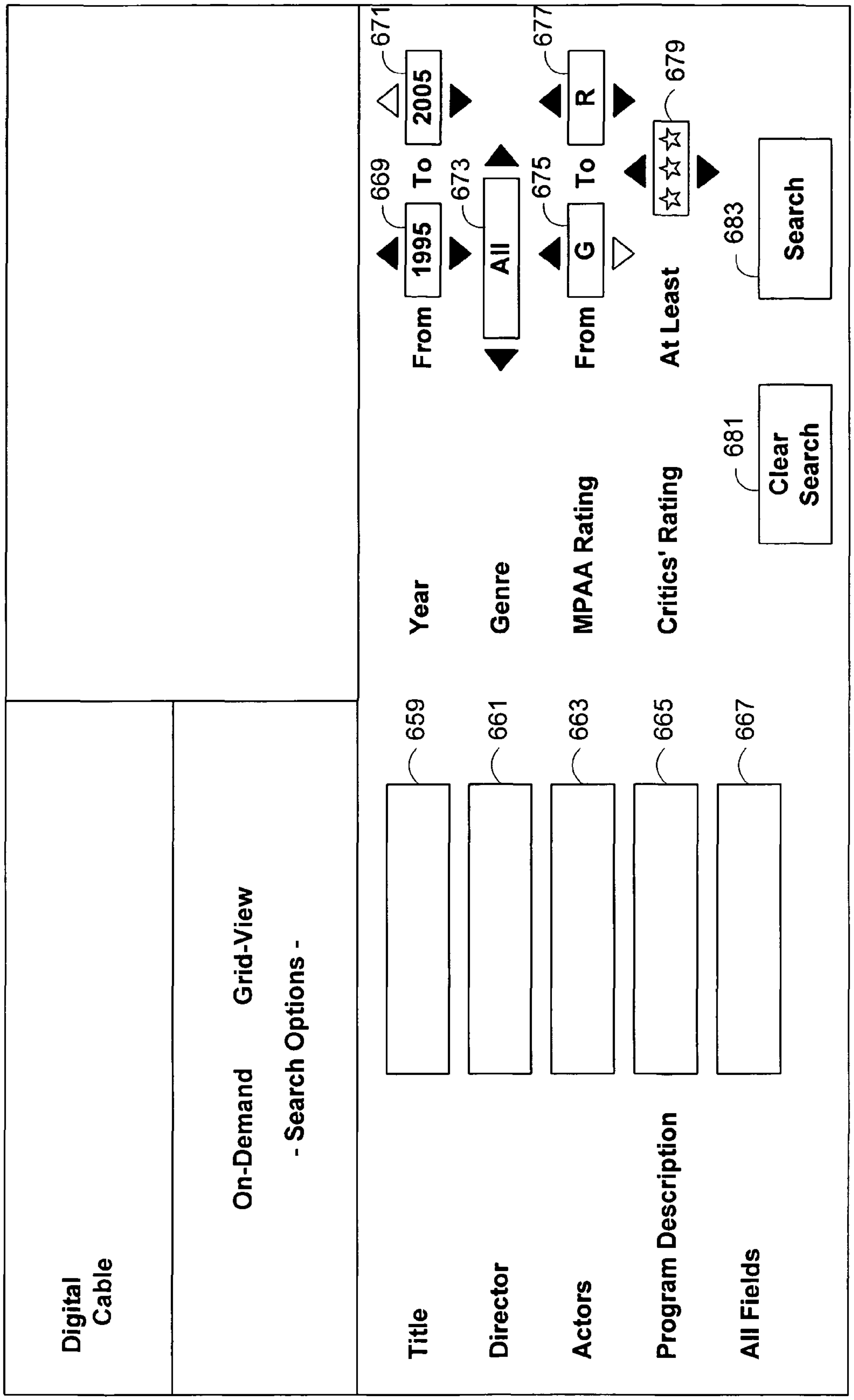
FIG. 6 shows an illustrative search display screen in accordance with one embodiment of the present invention.
Figure 7:
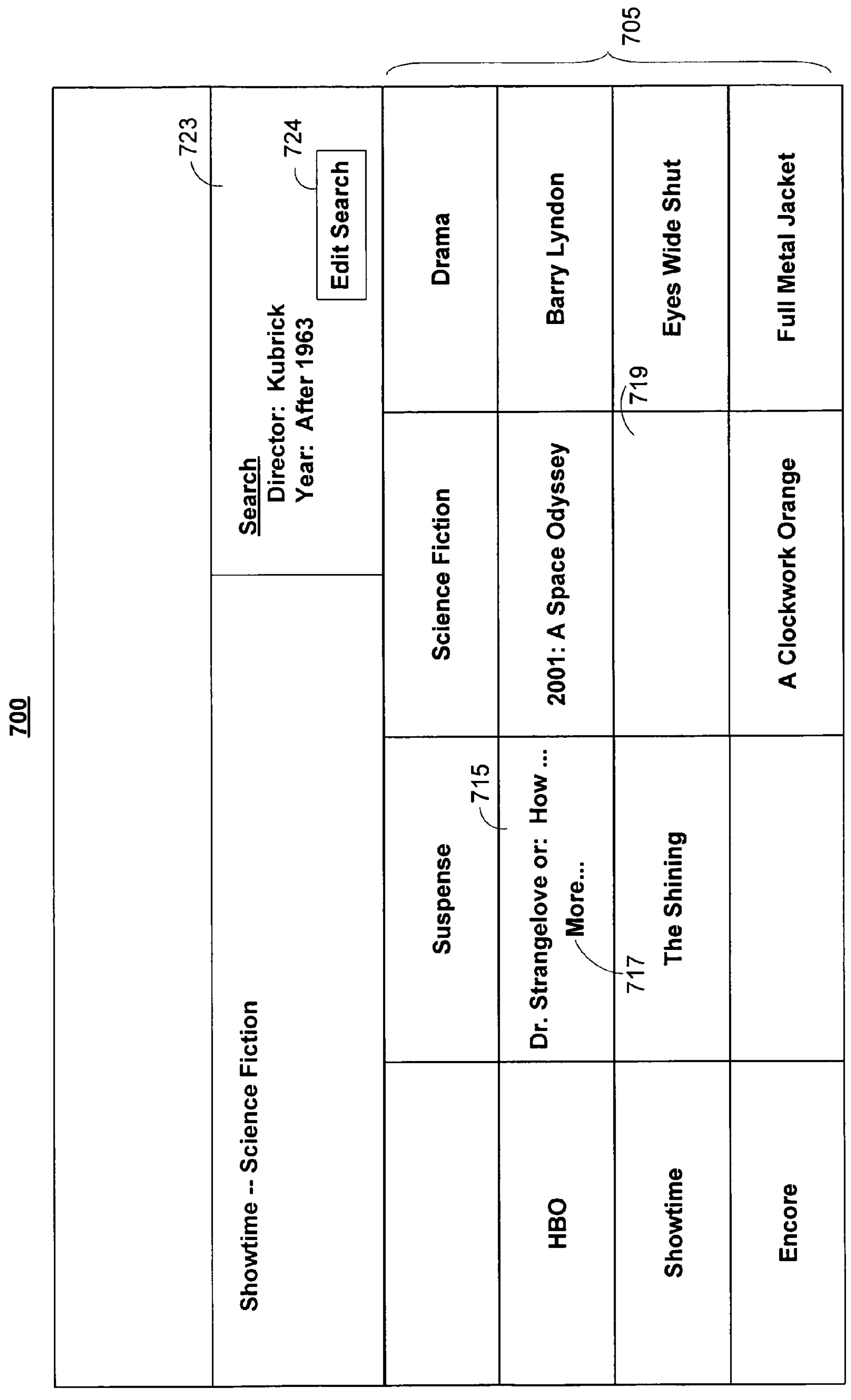
FIG. 7 shows an illustrative search results display screen in accordance with one embodiment of the present invention.

Portal menu screen 100 may also include a Search menu option 109, which may allow users to search through MOD program offerings to find content of interest. Exemplary search and search results display screens are shown in FIGS. 6-7. Other portal menu screen 100 menu options may include What's Hot option 111, New Releases option 113, Last Chance option 115, and various other category options allowing users to access program listings organized by some type of program category. Illustrative What's Hot menu option 111 may allow users to access program listings including the most popular or most watched programming. New Releases menu option 113 may provide access to program listings including programs recently added to the program listings, and Last Chance menu option 115 may provide program listings including programs which will only be available on the MOD portal for a short while longer. Other exemplary program categories may include program genre category (drama, science fiction, suspense, action, family, foreign, documentary, animation, etc.), media type (movie, television series, television special, audio, etc.), program transmission type (VOD, PPV, etc.), and program format type (high-definition, standard-definition, etc.). A menu screen allowing users to select programs organized by other categories may be accessed through option 121. Menu screen 100 may also allow users to access alphabetical listings of movies using Movies A-Z menu option 117, or alphabetical listings of television series using the Series A-Z menu option 121. Various other menu options may also be presented in the portal menu screen.

FIGS. 2-12 show illustrative MOD portal display screens that may be used in accordance with the principles of the present invention to display media content available from multiple program vendors and/or multiple program providers. The display screens of FIGS. 2-4, 7-9, and 12 show illustrative grid display screens used in accordance with the present invention. Grid display screens may be used to organize and display program listings to users according to at least two organization criteria. The grid display may provide users with an intuitive and easy-to-use means for finding and selecting desired media content amongst large quantities of media content available for viewing. If desired, program listings may be provided in other formats, in addition to or instead of a grid format (e.g., a list of program titles). Any of these formats may also be displayed in accordance with two organization criteria (e.g., the list of programs itself may be the first organization criterion, while separators or headers within the list may be the second organization criterion).

Figure 2:
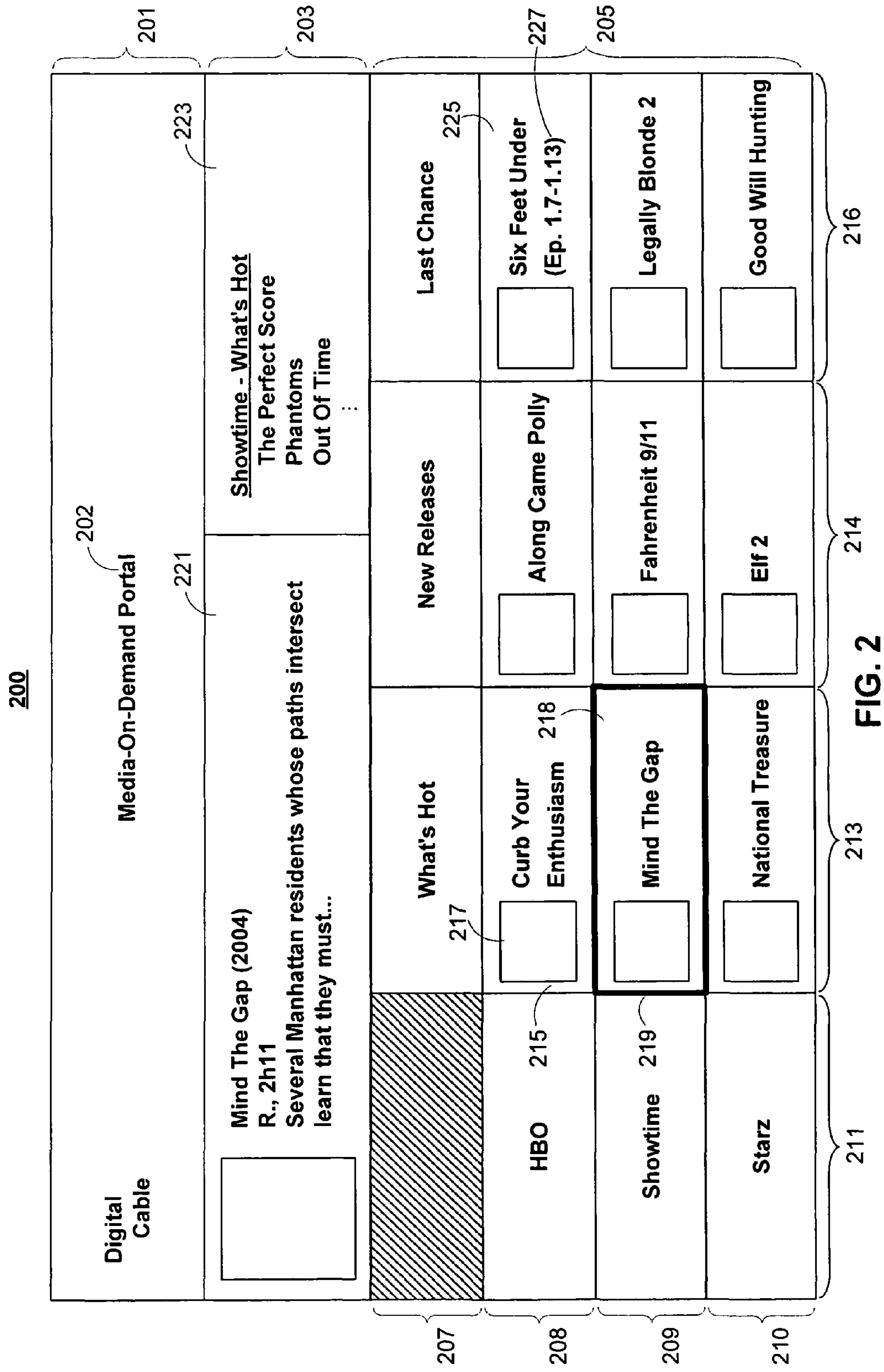
FIG. 2 shows an illustrative grid display screen in accordance with one embodiment of the present invention.

Display screen 200 of FIG. 2 shows an illustrative grid display screen that may include title bar 201, information bar 203, and grid display 205. Title bar 201 may include general information related to the MOD portal, such as display screen title 202. Grid display 205 may contain rows, such as rows 208 and 209, and columns, such as column 213. Each intersection of a row and of a column forms a cell which may include a program listing of media related to the corresponding row and column. For example, cell 215 is the intersection of row 208 and column 213 and contains a program listing for "Curb Your Enthusiasm." "Curb Your Enthusiasm" corresponds to the row category "HBO" of row 208 and column category "What's Hot" of column category 213.

Grid 205 may include header column 211 where each cell entry in column 211 contains an identifier indicating the category of a row. In the particular embodiment of display screen 200, the cells in header column 211 may correspond to a different program vendor, such as "HBO" (row 208), "Showtime" (row 209) or "Starz" (row 210). Other row categories or row organization schemes may be used, including organization by service provider, by other organization criteria, or by the various exemplary menu options described in relation to FIG. 1, for example. The rows may be ordered in any suitable order in grid 205. The order of the rows may be determined by the service provider, by the program vendors, by the user, by the MOD portal application, or any other appropriate entity or application. In embodiments in which the rows correspond to service providers and/or vendors, the order of the rows may be determined by the service providers, vendors, and/or MOD portal providers. Service providers, vendors, and MOD portal providers may enter into agreements to determine the order of the row categories. For example, particular vendors may pay premium fees to be listed in the top-most rows. Alternatively, the row order may be selected at random, or may change periodically. The order of the rows may also be determined by user preferences, which may be stored in user equipment or as part of the MOD portal.

Grid 205 may similarly include header row 207 where each cell entry in row 207 contains an identifier indicating the category of a column. In the particular embodiment of display screen 200, the cells in row 207 may correspond to a program category, such as category "What's Hot" (column 213), "New Releases" (column 214) and "Last Chance" (column 216). What's Hot column 213 includes program listings of the most popular or most watched programming as chosen by the user, service provider, vendor, or any other entity. New Releases column 214 includes program listings of programs recently made available for viewing by the service provider or vendor. Last Chance column 216 includes program listings of programs which may be removed shortly from availability through the MOD portal or the particular service provider or vendor. Columns may correspond to different categories, which may correspond, for example, to exemplary menu options described in relation to FIG. 1. Columns may be in any order in grid 205. Like the rows in grid 205, the order of the columns may be determined by service providers, vendors, MOD portal providers, user preferences, user equipment settings, and/or any suitable approach.

In some embodiments, the rows and columns may be referred to as a first and second dimension, respectively. Moreover, if appropriate, additional dimensions of categories may be provided. For simplicity, the different dimensions will generally be described as rows and columns. It will be appreciated that the row and column categories shown in the grid display screens may be inverted, such that the columns may correspond to vendors, service providers, or any other suitable categories, and the rows may correspond to What's Hot, New Releases, Last Chance, or any other suitable categories. The categorization and provision of the information in the different dimensions of grid displays is illustrative and can be inverted, reversed, or modified as desired. In some embodiments, each dimension of the grid may be associated with an organization criterion, and the categories of each dimension may correspond to the organization criterion such that the categories correspond to a common theme or topic of the organization criterion. For example, a grid dimension may be associated with program vendors, and the categories associated with the dimension may correspond to different vendors of programs included in the grid. As another example, a grid dimension may be associated program genres, and the grid may include such categories as drama, science-fiction, documentary, and other program genres.

Grid 205 may contain more or less rows and columns than those displayed in display screen 200. In general, grid 205 may have at least two rows and one column (2-by-1 grid), or at least two columns and one row (1-by-2 grid). However, other grid dimensions may be used, including 1-by-1 grids. Display screen 200 may display the entire grid 205, or may display a portion of the grid. The displayed portion of grid 205 may include header row 207 and header column 211, as well as a limited number of additional rows and columns. Users may access additional rows located above and below the displayed rows by navigating upwards and downwards within the table. Similarly, users may access additional columns located to the right and to the left of the displayed columns by navigating to the right and to the left of the displayed columns. The header row 207 and header column 211 may remain on the display screen at all times as the user navigates through the grid. The additional rows and columns may correspond to additional categories or vendors than the displayed rows and columns.

Because of the large quantity of programming available, multiple programs may be included in a cell and identified with program listings in each cell. However, because of the limited size of the grid cells, only a limited number of programs may generally be displayed in a cell. Cells may therefore contain only one, or a limited number, of featured programs. In display screen 200, for example, only a single featured program is displayed in each cell. Featured programs may be chosen so as to attract a user's attention to a particular cell, and to entice the user to request a complete listing of the programs associated with the particular cell.

Featured programs may be chosen at random among all programs corresponding to the cell's category. Featured programs may alternatively be chosen according to various criteria. For example, the featured programs for each category may be chosen by program vendors or service providers. The featured programs may also be chosen according to vendors' or providers' rankings, critics' rankings, or user rankings of programs, for example. The featured programs may also be chosen based, at least in part, on user profile information or other information indicative of a user's programming interests or preferences. (Further methods and systems for implementing user profiles are described in Cordray et al., U.S. patent application Ser. Nos. 11/324,156 and 11/323,464, filed Dec. 29, 2005, in Cordray, U.S. patent application Ser. No. 11/324,183, filed Dec. 29, 2005, and in Yates, U.S. patent application Ser. No. 11/324,202, filed Dec. 29, 2005, which are hereby incorporated by reference herein in their entireties.) Various other selection criteria or methods may be used to choose featured programs. The selection criteria may be used to select a single featured program for display in grids, such as grid 205, that show a single featured program in each cell. The selection criteria may also be used to put multiple featured programs in order, so as to determine the order in which multiple featured programs may be displayed in grids featuring multiple programs in each category. Grids featuring multiple programs in each category will be described in greater detail below, for example, in connection with FIGS. 3-4, 9, and 12. Featured programs may also be chosen at least in part in response to a user's filter or search command. User filter and search commands will be described in greater detail below, for example in connection with FIGS. 4-7.

Each cell in a grid may contain the title of a program, or other textual information related to a particular program or multiple programs associated with the cell. In display screen 200, for example, the titles of movies, television series and other programming are displayed in the grid cells. The program title may be supplemented by identifying information, such as a date or identifying number. Supplemental identifying information may be especially useful in uniquely identifying particular episodes or seasons of a television series. For example, in cell 225, the show "Six Feet Under" includes episode identifier 227 which includes identifying information "(EP. 1.7-1.13)." Episode identifier 227 may indicate that episodes seven (7) through thirteen (13) of the first (1) season of the television series are available from the associated vendor.

Each cell may include non-textual information associated with the cell and/or the cell's program listing. For example, the cell may contain image 217 or an icon, thumbnail, or other identifier. The image may be associated with the program listing identified in the cells, and may include images such as one or more frames from a program, thumbnails, box cover art, or other images related to the program listing of the cell. The images may also be icons identifying a program type (VOD, PPV, movie, series, etc.), a program rating (vendor's rating, Motion Picture Association of America (MPAA) rating, critic's rating, etc.), or other program or cell information. Each grid cell may also provide the user with additional information including, for example, an indication of the number of programs available in each category from the corresponding vendor, and the number of programs the user has already viewed in the selected category.

Display screen 200 may also include information bar 203. Information bar 203 may provide users with additional information related to a highlighted cell 218 in the grid. A user may use a remote control or other user input device to place highlight window 219 over a chosen cell 218. In response to a user placing highlight window 219 over a cell, information related to the highlighted cell 218 may be displayed in information bar 203. The information may alternatively be displayed in response to the user selecting the cell after moving highlight window 219 over the cell. Information displayed in information bar 203 may include, for example, images or icons related to the featured program, or other information related or not to the featured program. Information bar 203 may also contain textual information related to the featured program, such as program title, year, rating, duration, program description, actors, supplemental program information such as program episode or season information, program format information (e.g., HD, SD, closed caption, audio format (Dolby Digital 5.1, DTS, etc.), subtitles, languages, widescreen, etc.) or other program information. Information bar 203 may also contain any other appropriate information, related or not to the featured program. In display screen 200, program information related to highlighted cell 218 is shown in region 221 of information bar 203.

Information bar 203 may also display information about the row and/or column categories associated with the highlighted cell. The information may include a list of other programs associated with the cell. The list may include some or all programs corresponding to the row/column categories of the cell. In display screen 200, region 223 may include a partial list of programs associated with both the "Showtime" row category and the "What's Hot" column category of highlighted cell 218.

Figure 3:
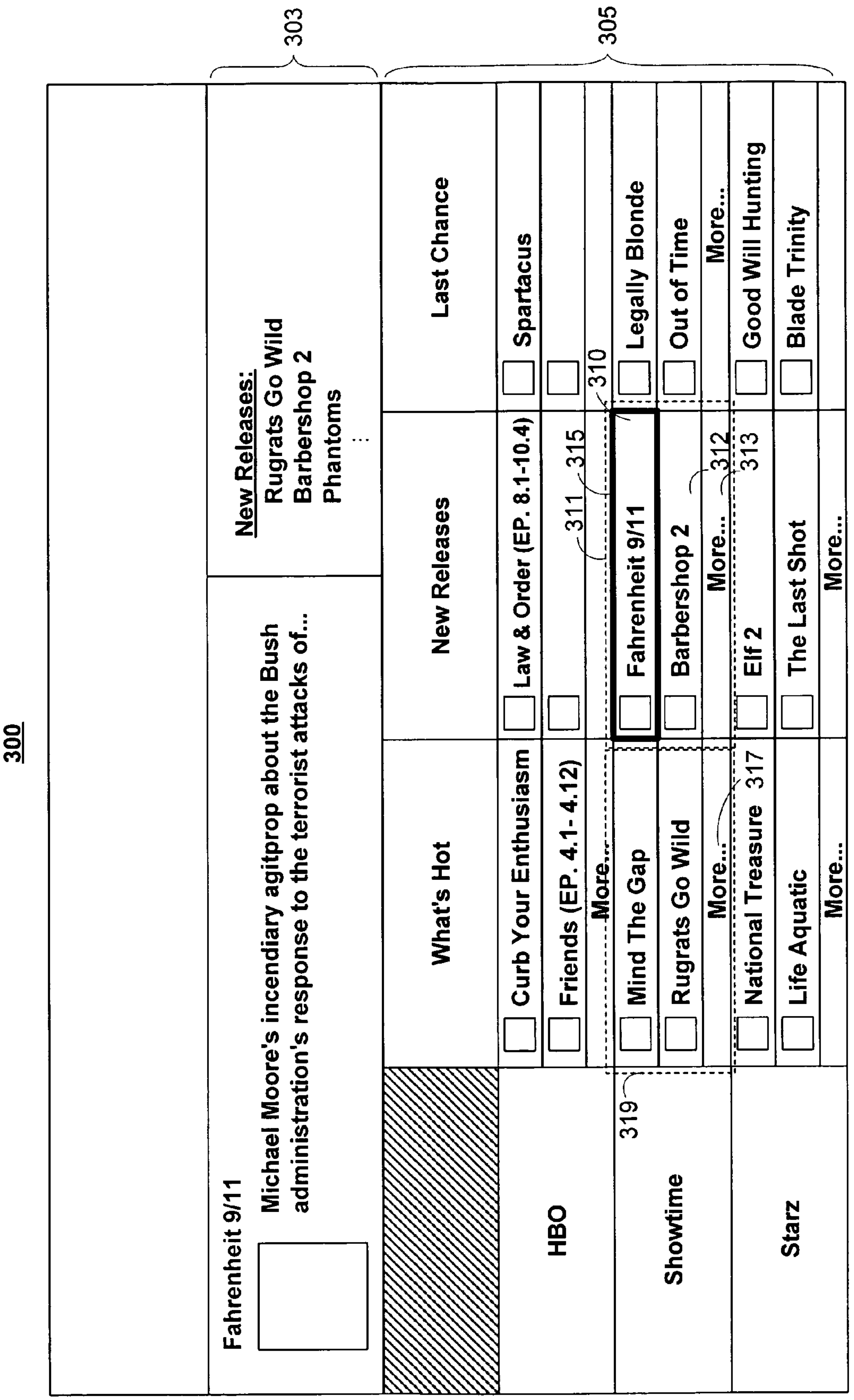
FIG. 3 shows an illustrative grid display screen in accordance with one embodiment of the present invention.

FIG. 3 shows an illustrative display screen 300 in which each row and column intersection includes multiple program listings corresponding to the intersection's row/column categories. One or more cells in display screen 300 may be subdivided to show two or more program listings associated with that cell's categories. For example, cell 311 is subdivided into three regions. Regions 310 and 312 may include program listings and region 313 may indicate that more programs are available in the same cell's categories.

The program listings shown in cells, such as cell 311, may contain the featured programs with the highest ratings corresponding to the row/column categories. As discussed above, the ratings may be ratings assigned to programs by vendors or service providers for the purpose of determining which programs may be featured in the grid. The ratings may also be ratings assigned by critics, or other entities. Ratings may also depend on user profile or other user preference information used to determine which programs are most likely to be of interest to a user.

Figure 11:
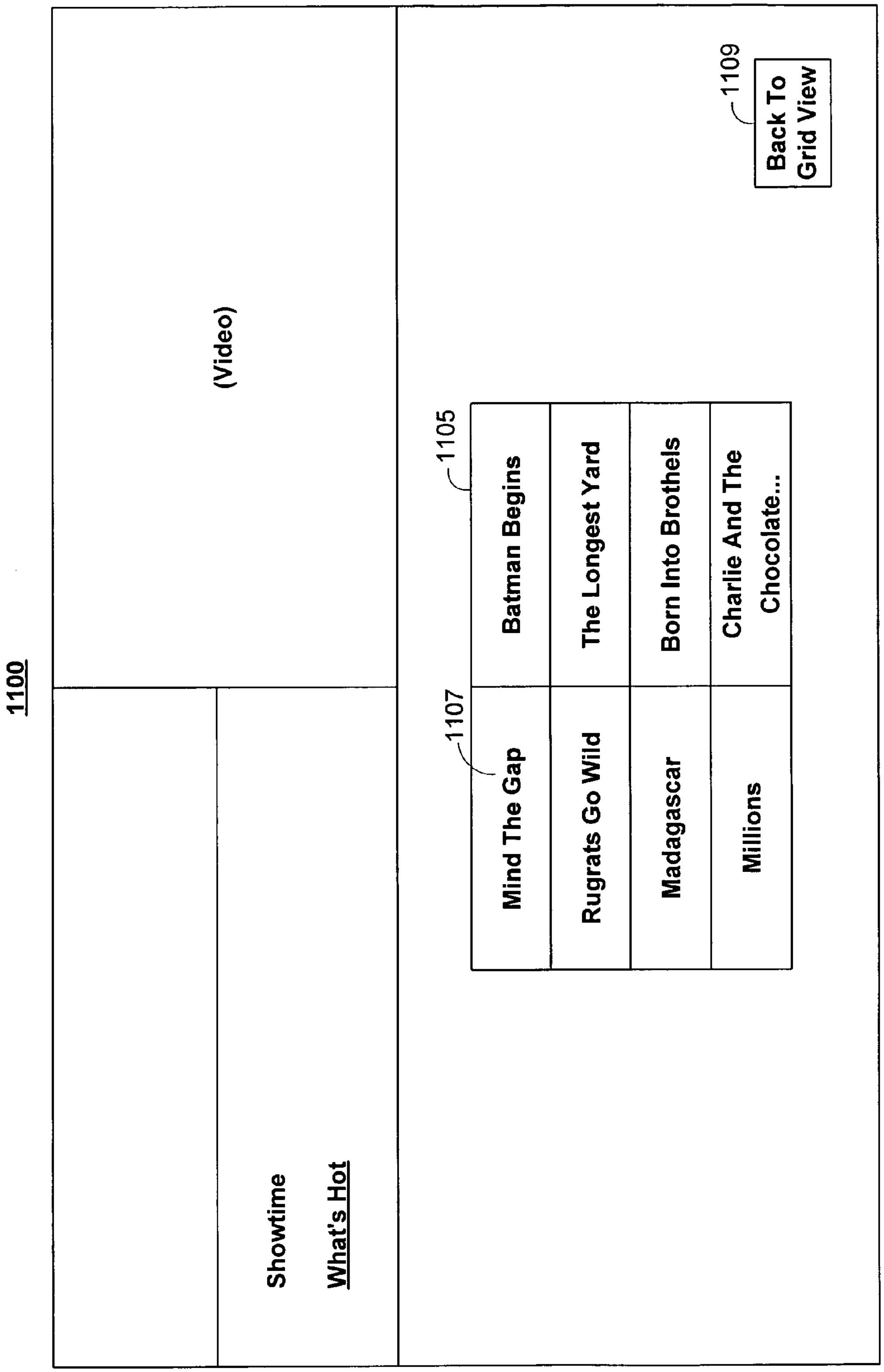
FIG. 11 shows an illustrative program listing display screen in accordance with one embodiment of the present invention.

Highlight window 315 may function in a manner similar to highlight window 219 of display screen 200. Highlight window 315 may be used to highlight cells or subdivisions of cells (e.g., regions or program listings) within grid 305. In one illustrative embodiment of the present invention, highlight window 315 may be used to navigate all of the regions of cells (i.e., program listings) within grid 305 without regard to what cell a program listing is inside of. For example, if a user wants additional information about the movie "Fahrenheit 9/11," the MOD portal application may allow the user to move highlight window 315 onto program listing 310 in order to be presented with additional information about the movie in information bar 303. A user may also select "More . . . " option 313 to display another screen, such as menu screen 1100 of FIG. 11, showing program listings of programs corresponding to the selected column and row categories. Selection of option 313 may also cause additional or different program listings to be displayed in regions 310 and 312 of grid 305.

In a second illustrative embodiment of the present invention, highlight window 315 may be used to navigate cells of grid 305. In this second embodiment, highlight window may be substantially the same size as each cell, such as cell 311, and may be used to highlight any cell in the grid. If a user selects a cell using a button on a remote control (e.g., an OK or select button) or other user input device when highlight window 315 is highlighting a cell, highlight window 315 may lock on the highlighted cell and allow navigation of the regions or program listings of the selected cell. Additional program listings may be available for navigation within the cell that were not previously displayed within the highlighted cell. The user may unlock the highlight window by pressing a button on a remote control (e.g., an exit or cancel button) or user input device. The unlocking may then allow the user to continue navigating amongst the cells (e.g., row/column categories).

As will be appreciated, the first embodiment described above allows for one level of navigation between the various regions (or program listings) within grid 305 without consideration of the cells that correspond to the row and column categories. The second embodiment described above allows for two levels of navigation. The first level of navigation is based on the cells that correspond to the row and column categories. Highlight window 315 may be moved from one cell to another where each move navigates to a different row/column category. For example, highlight window 315 may be navigated from cell 319 (which are the shows that are "hot" on Showtime) to cell 311 (which are the newly released programs or movies on Showtime). The second level of navigation is based on the regions within a cell. For example, when cell 311 is selected, the user may navigate amongst the regions within cell 311 only, where each region may correspond to a program that is newly released on Showtime. When cell 311 is selected, the user may additionally navigate amongst the regions within cell 311 to view additional featured and non-featured program listings corresponding to the row/column categories of cell 311. In some embodiments, it may be desirable to include multiple dimensions of program listings within each cell. This may allow for further categorization of information.

Figure 4:
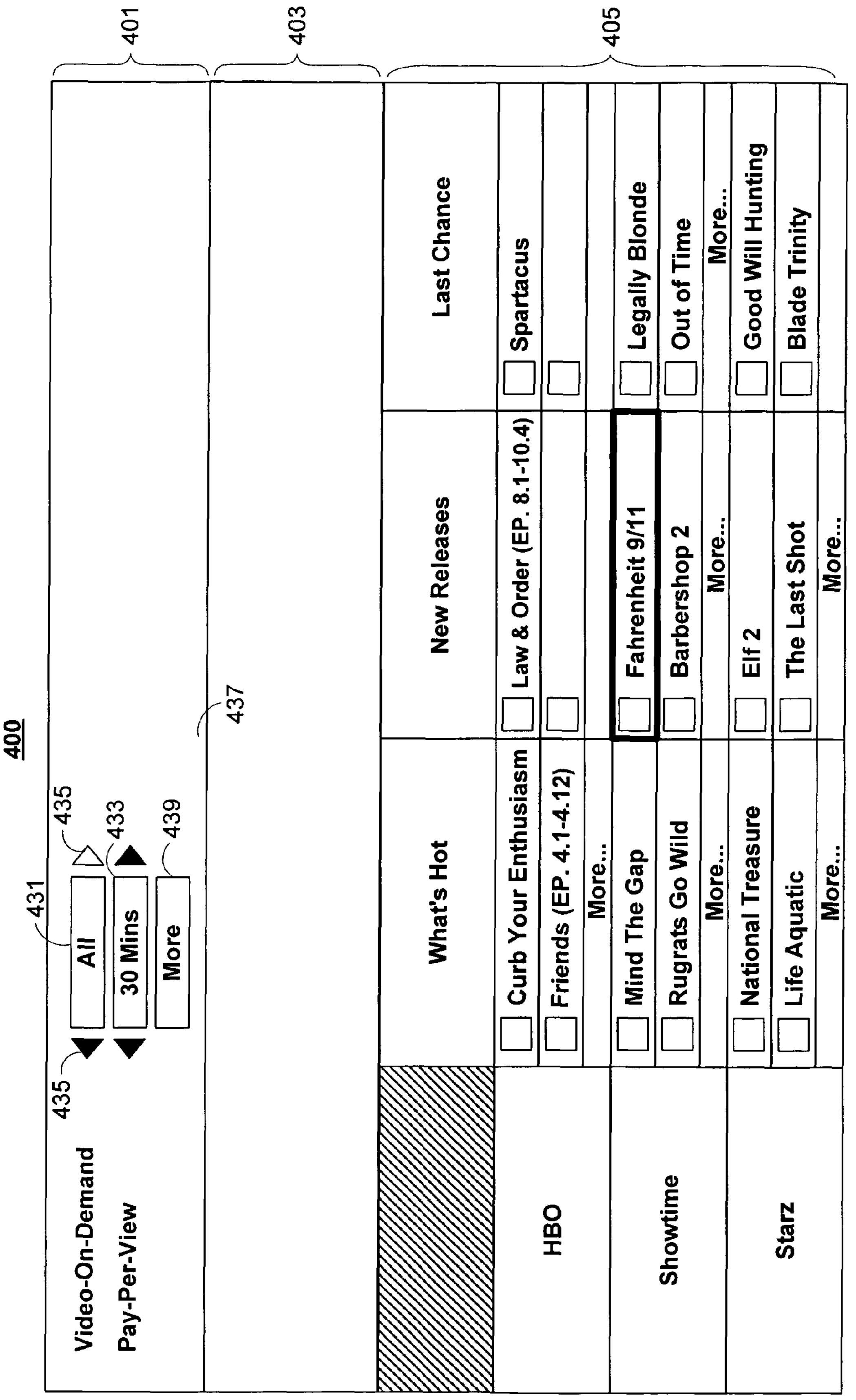
FIG. 4 shows an illustrative grid display screen including filter options in accordance with one embodiment of the present invention.

In order to show featured programs that are more likely to correspond to a user's interest, users may be able to select filter options in order to limit the programming displayed in the grid according to various filter criteria. FIG. 4 shows illustrative display screen 400 in which a user may apply filters to the featured programming displayed in the grid. Illustrative filter options including Video-On-Demand option 431, Pay-Per-View option 433 and More option 439, may be displayed in title bar 401 of display screen 400. Additional or different filter options than those illustrated in display screen 400 may also be used and are described herein.

The Video-On-Demand option 431 has been set to "All" as shown to indicate that all video-on-demand offerings should be displayed in grid 405. Arrow buttons 435 may be used to change the selection of Video-On-Demand option 431 between, for example, all and none. Pay-Per-View option 433 has been set to "30 Mins" to indicate that only those pay-per-view programs beginning within the next 30 minutes should be displayed in grid 405. Pay-Per-View option 433 may be changed to alternate selections, for example, None, 5 Mins, 15 Mins, 30 Mins, 45 Mins, 60 Mins, All, or any other time increment.

Display screen 400 may also include a More option 439 operative to provide users with filter options in addition to those shown in title bar 401. Selection of More option 439 may allow a user to choose additional filter options to apply to grid 405. The additional filter options chosen using More option 439 may be displayed, if desired, in region 437. For example, a program type option may be included in region 437. This option may allow a user to select to display only movies in grid 405, to the exclusion of other types of MOD programming such as television series or television specials.

In response to the user's selection of filter options, the grid may be updated to display featured programming corresponding to the user's filter criteria. The filtering functionality may be operative such that MOD content matching the criteria of the filter is displayed in grid 405, and all other MOD content is not displayed in grid 405. In other embodiments, the filter options may serve to make media matching the criteria of the filter preferentially displayed in the grid. In these embodiments, those programs (or other MOD content) that match the selected filter criteria may be displayed in preference to those programs not matching the criteria.

Figure 5:
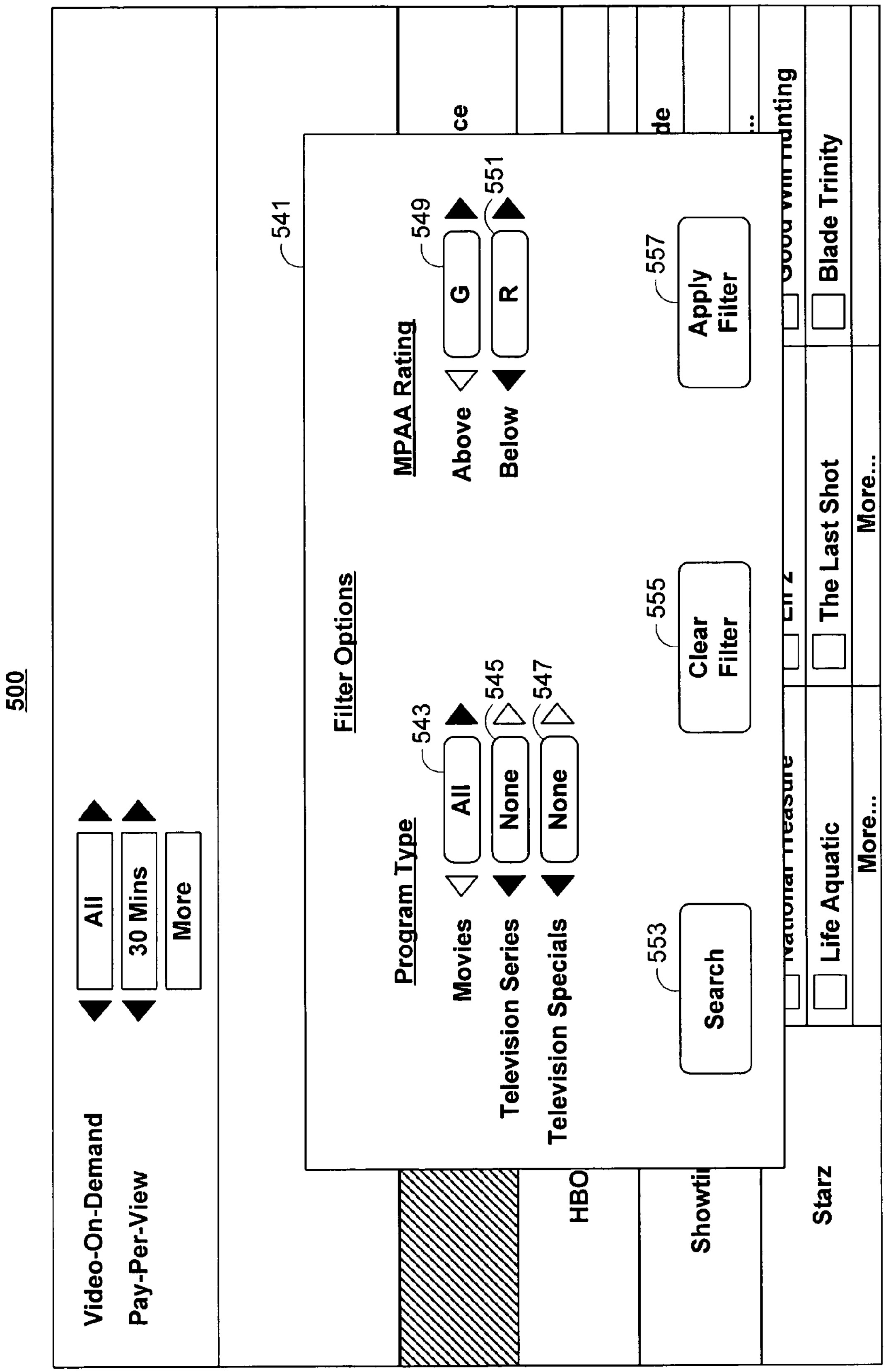
FIG. 5 shows an illustrative filter options overlay menu display screen in accordance with one embodiment of the present invention.

FIG. 5 shows an illustrative filter options overlay menu screen 541 that may be displayed in response to a user selecting "More" option 439 in display screen 400. The filter menu screen may allow the user to select additional filter options that may not be displayed in the filter options of display screen 400. For example, filter menu screen 541 may allow the user to filter the featured programming by various program types. Program type options may include Movie option 543, Television Series option 545 and Television Specials option 547. Each program type option may be set to All or None, allowing users to select whether programming of the selected type should be displayed. Filter menu screen 541 may also include MPAA Rating options allowing users to select the range of MPAA ratings to which displayed programming should be limited. Option 549 may allow users to select a minimum rating, while option 551 may allow users to select a maximum rating. Options 549 and 551 may include options of G, PG, PG-13, R, and NC-17. Other filter options (not shown) may be used to limit the characteristics of displayed programming using other appropriate filtering criteria.

Filter options overlay menu screen 541 may include "Clear filter" option 555 allowing users to clear all filter options and to return to the grid-view of FIG. 3, for example. Apply Filter option 557 may allow users to apply the filter options selected in filter menu 541. In response to selecting option 557, users may be presented with a display screen, such as display screen 400, in which the filter criteria selected by the user is applied and the MOD content displayed corresponds to the filter selections. Filter menu screen 541 may also include Search option 553 which allows users to access a search display screen. An illustrative search display screen is shown in FIG. 6.

FIG. 6 shows illustrative search display screen 600. Search display screen 600 may be used to select search options used to limit the programming presented in an MOD grid according to search criteria. Search display screen 600 may be accessed, for example, by selecting Search option 109 in MOD portal menu screen 100. The search display screen may also be accessed by selecting Search option 553 in filter options overlay menu screen 541, by activating a Search button on a user remote control, or using other appropriate methods.

Search display screen 600 may show different data fields by which users may search for media content. Users may input search parameters in textboxes 659, 661, 663, 665, and 667 in order to search for the inputted text through standard program information fields such as program Title, Director, Actors, Program Description, and All Fields, respectively. All Fields textbox 667 may allow users to search for programs containing the inputted text in any text field of program information. In some embodiments, All Fields textbox 667 may be the only textbox provided in search display screen 600. Users may additionally limit search results by, for example, program year (options 669 and 671), genre (option 673), MPAA ratings (options 675 and 677), and critics' ratings (option 679). The additional options may include any one or more of the filter options described above. Genre search option 673 may allow a user to specify that All search results should be provided, or to limit search results to one or more genres such as drama, science fiction, action, foreign, etc. Other search criteria (not shown) may also be added to display screen 600. Further search criteria and features are described in Ellis et al., U.S. Provisional Patent Application No. 60/675,387, filed Apr. 27, 2005, which is hereby incorporated by reference herein in its entirety, and in Yates, U.S. patent application Ser. No. 11/324,202, filed Dec. 29, 2005.

Users may clear all search criteria using Clear Search option 681. Users may perform a search using the selected criteria in display screen 600 by selecting Search option 683. In response to the MOD portal application performing a searches, users may be presented with search results display screens such as display screen 700 of FIG. 7.

FIG. 7 shows illustrative search results display screen 700 that provides a grid display screen including program listings resulting from a program search. Similar to the grid display screens of FIGS. 2 and 3, featured search results may be provided in cells of grid 705. Cells with multiple associated search results may contain More option 717 indicating that additional search results are associated with the cell. In other embodiments, a cell with multiple regions may be provided in a manner similar to that discussed above in connection with FIG. 3, and specifically in connection with cell 311. Region 723 of information bar 703 may include an indication of the search parameters used. Region 723 may also contain an "Edit Search" option 724 allowing users to edit search parameters by accessing a search menu such as display screen 600. In addition, each of the identifiers in region 723 may be selectable, thereby enabling users to select and change any search parameter. In search results screen 700, row and/or column categories with no matching results may be hidden (or removed) from the search results grid. For example, the categories New Releases, What's Hot, and Last Chance may be hidden from view in grid 705 because the search parameters returned no featured programs in those categories. In addition, some cells, such as cell 719, may not include any program listings if no programs matching the search parameters match the cells' row/column categories.

Figure 8:
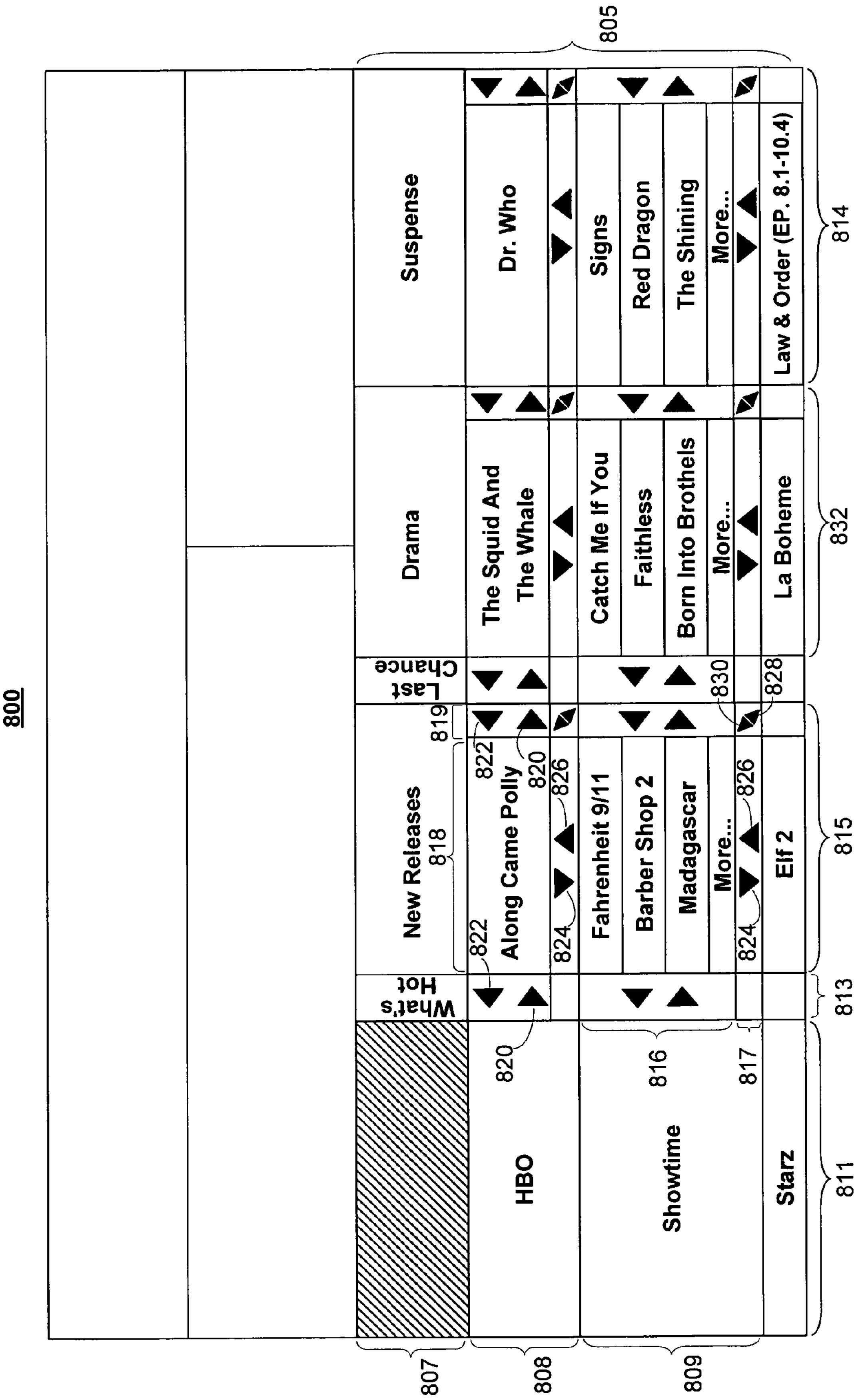
FIG. 8 shows an illustrative grid display screen allowing users to manipulate the display characteristics of the grid in accordance with one embodiment of the present invention.

The on-demand grid may also allow users to manipulate display characteristics of the grid in order to modify the appearance of the grid. For example, users may be able to expand or collapse rows and columns of the grid in order to be presented with more or less program listings in given rows or columns. Display screen 800 of FIG. 8 shows an illustrative grid display 805 with cells including program listings similar to those of display screens 200 and 300. Display screen 800 contains expanded and collapsed rows and columns, such as expanded row 809 and collapsed column 813. Expanded row 809 may have been expanded in order to display additional program listings in a particular row category (e.g., for a particular vendor), while column 813 may have been collapsed in order to hide its contents and in order to display additional columns such as column 814 in display screen 800. It will be appreciated that the discussion of expanding rows may be applied equally to expanding columns. Similarly, the discussion of collapsing columns may be applied equally to collapsing rows.

Rows or columns may be expanded or collapsed by selecting arrow options, such as expanding arrows 820 and 824 and collapsing arrows 822 and 826. Arrow options may indicate that more MOD listings may be available in the associated cell/row/column or that the listings displayed in the associated cell/row/column could be hidden or removed from view. For example, column 815 may be collapsed by selecting any column collapsing arrow 822 in region 819 of column 815. Column collapsing arrows may be inward-pointing arrows or left-pointing arrow, such as arrow 822, located in a column. A collapsed column may appear similar to collapsed column 813. Collapsed column 813 may have a significantly thinner width or size than other columns in the grid, and may contain either abbreviated program listings or no program listings (as shown). A collapsed column, such as column 813, may be removed from grid 805 by selecting any collapsing arrow, such as left-pointing arrow 822, in column 813. Columns may be collapsed and/or removed from the grid in order to allow additional columns to be displayed within grid display screen 800. For example in grid 805, right-most column 814 may not be visible in display screen 800 when column 813 is expanded. However, because column 813 is collapsed, column 814 is visible. Collapsed column 813 may be expanded to regular column width by selecting any expanding or outward-pointing arrow within the column, such as right-pointing arrow 820.

In other embodiments, the expansion of a column, such as column 813, may cause another column to be collapsed, where the other column may be a column adjacent to the expanded column (e.g., column 815), the right-most expanded column in the grid or a column at an edge of the displayed portion of the grid (e.g., column 814), or any another column displayed in grid 805. Alternatively, the expansion of a column, such as column 813, may cause other columns to be completely or partially hidden or obscured behind overlaid columns. For example, the expansion of column 813 may cause column 832 to be overlaid over column 814 and partially obscure column 814. The expansion of column 813 may also cause the size of other columns to change. For example, the expansion of column 813 may cause the width of other expanded (e.g., columns 814, 815 and 832) or collapsed columns to be reduced to accommodate an expanded view of column 813 within the visible area of grid 805. Other grid display changes in accordance with the invention, including combinations of grid display changes, may occur in response to a column being expanded.

Similarly to columns, rows such as row 809 may be collapsed by selecting any collapsing or inward-pointing arrow, such as upward-point arrow 826 within region 817 of row 809. In a first instance, selection of a collapsing arrow, such as arrow 826, within row 809 may cause row 809 to take on a regular row height or size substantially equal to the height or size of row 808, for example. Selecting a collapsing arrow within a regular height row, such as upward pointing arrow 826 in row 808, may cause the row to become collapsed. A collapsed row may have a reduced height or size (not shown). Selecting a collapsing arrow, such as arrow 826, within a collapsed row may cause the row to be hidden or removed from grid 805.

Rows and columns may also be expanded in order to increase the number of program listings displayed within the row or column. Row 809 shows an illustrative expanded row with a height or size approximately double that of a regular-height or regular-sized row. Expanded rows may show additional program listings within region 816 of each cell. For example, expanded row 809 may show three program listings within each cell as compared to the single program listing shown in regular-height or regular-sized rows. Expanded row 809 may have been expanded by selecting an expanding or outward-pointing arrow, such as downward pointing arrow 824, within region 817 of the row. Expanded row 809 may be expanded further by selecting an expanding arrow within region 817, such as arrow 824, in order to further increase the row height or size. Collapsed rows may also be expanded to regular height or size by selecting an expanding arrow within the collapsed row. Each selection of an expanding arrow may increase the row by one program listing or any desired number of program listings. In some embodiments, the number of listings that may be expanded or collapsed by selecting an expanding arrow or collapsing arrow, respectively, may be user or MOD portal application selected.

Regular width or regular size columns, such as column 815, may be expanded by selecting any expanding or outward-pointing arrow within the column, such as arrow 820 in region 819 of column 815. Expanded-width columns (not shown) may be wider or larger than regular width or size columns and may contain multiple program listings within the expanded region 818 of the column.

Diagonal expanding and collapsing arrows may serve to expand or collapse simultaneously both a cell's row and column size. Diagonal expanding arrow 828, for example, may be used to expand both the height or size of row 809 and the width or size of column 815. Similarly, diagonal collapsing arrow 830 may be used to simultaneously collapse both row 809 and column 815. Expanding arrows, such as row expansion 820, column expansion 824, and diagonal expansion arrows 828, may be used to expand a cell in one or both dimensions. In one embodiment of the present invention, a grid cell may be expanded until it occupies substantially all of the visible area of grid 805 below header row 807 and to the right of header column 811. This type of expansion may be caused by selection of a diagonal expanding arrow, such as arrow 828, or selection of the cell itself.

Figure 9:
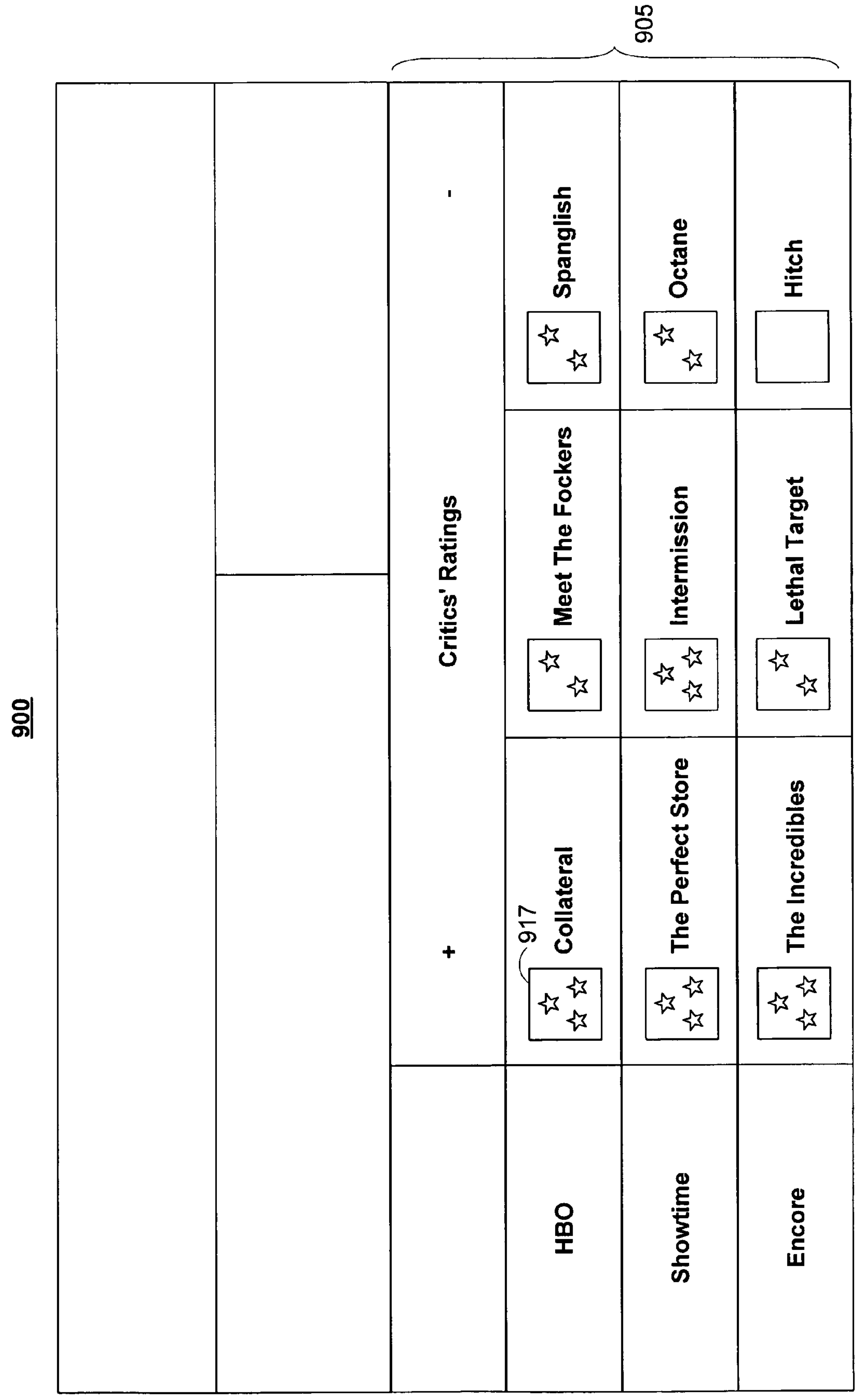
FIG. 9 shows an illustrative grid display screen in accordance with one embodiment of the present invention.

Various other grid organization schemes may be implemented to present users with programming which may be of most interest to them. Grid display screen 900 of FIG. 9 shows an illustrative grid in which the rows are organized by vendor, each row containing a list of available programming for a particular vendor. The list of programming may be ordered in each row according to various criteria, which may include alphabetical order, date order or critics' ratings order, or any other ordering criteria. The ordering of programs may also be done based on user preference or user profile information. For example, if a user indicates a preference for a particular genre of programming, such as "Foreign" programming, programs corresponding to the user's preference information may be preferentially displayed in the grid. In grid 905 of display screen 900, for example, programming is ordered in descending order of critics' rating, each program being accompanied by an icon 917 showing the program's rating. Critics' ratings, or any other type of ratings described herein, may be provided with a stars rating (as illustrated with icon 917), a numerical rating, a grade rating (e.g., A+, B, C−, etc.), or any other type of rating.

Figure 10:
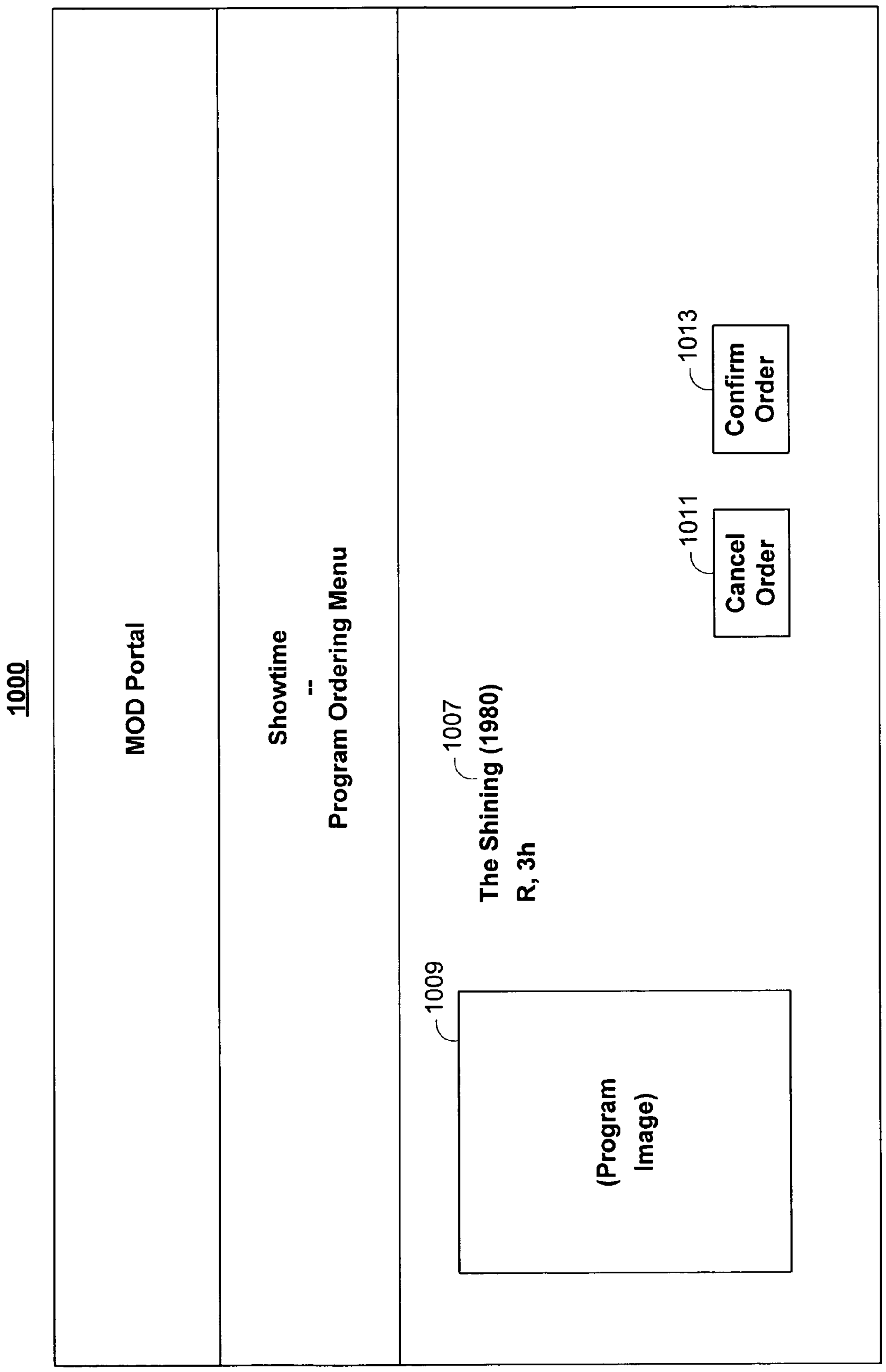
FIG. 10 shows an illustrative MOD portal ordering display screen in accordance with one embodiment of the present invention.

In response to a user selecting a particular grid cell (or region of a cell) that correspond to a program or a series of programming in any of the grid display screens of FIGS. 2-4 and 7-9, the user may be presented with an MOD portal ordering screen such as illustrative display screen 1000 of FIG. 10. Display screen 1000 may include textual information 1007 and image information 1009 identifying the particular program or series of programs to be ordered. Option buttons in display screen 1000 may also allow users to cancel their MOD order using cancel order option 1011, or to confirm their order using confirm order option 1013. Once a user confirms the order of the program, the user may be billed for the program and the program may be presented on the user's display screen. Further details regarding billing for programs and presentation of programs will be described in more detail below, for example, in connection with FIGS. 25-27. Display screen 1000 may include any suitable information, such as program title description, price, ratings, duration, and any other information.

Alternatively, in response to the user selecting a grid cell (or region of a cell) in any of the grid display screens of FIGS. 2-4 and 7-9, the user may be presented with a display screen 1100 showing a listing of all programs corresponding to the row and column categories of the selected cell. For example, in response to selecting cell 218 for the program "Mind the Gap" of grid 205, the user may be presented with display screen 1100 of FIG. 11. Display screen 1100 may include a complete listing 1105 of all programs corresponding to the "Showtime" row category and the "What's Hot" column category of cell 218, including program 1107 featured in cell 218. The user may also access display screen 1100 in response to selecting the more option 317 in cell 319 located at the intersection of the "Showtime" and "What's Hot" row/column in grid 305.

To purchase a desired program from display screen 1100, a user may select the program from the program listing 1105. In response to the user selection, the user may be presented with an ordering screen similar to display screen 1000 and corresponding to the selected program. If the user finds no programming of interest in program listing 1105, the user may select the "Back to grid-view" option 1109 in order to return to the previously presented grid display screen.

Figure 12:
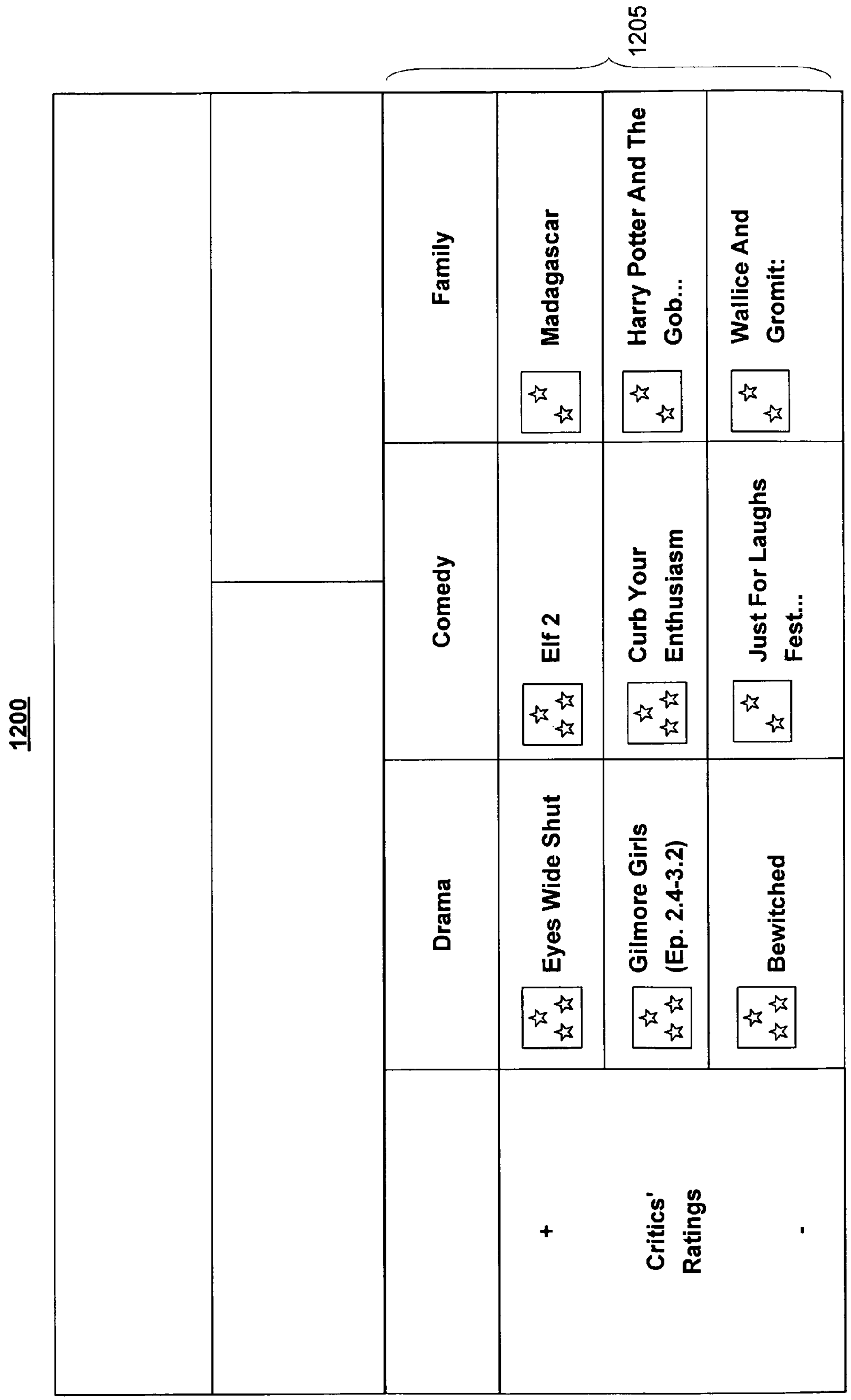
FIG. 12 shows an illustrative grid display screen in accordance with one embodiment of the present invention.

In some embodiments, grid row and column categories may be independent of the media vendors or providers. FIG. 12 shows illustrative grid display screen 1200 in which the rows are ordered in critics' ranking order, and the columns are organized by genre categories. Ordering of critics' ratings is described in greater detail above, for example, in connection with FIG. 9. Grid 1205 may allow users to view programming based on any two or more criteria that are independent of the program vendors and service providers.

The two or more criteria utilized may be any categorization criteria described herein, or others that may be desired. For example, a grid display may contain rows organized according to What's Hot, Last Chance and New Releases categories, and columns organized according to genre categories. Another grid display may contain rows organized by media type, such as movies, television programs, television specials, or music, and columns organized by genre categories. As another example, the grid display may contain rows organized by program type, such as movies, television programs, television specials, or music, and columns organized according to What's Hot, Last Chance and New Releases categories. Other categorization criteria, and combinations of categorization criteria, may be used. For example, grids may be ordered based on program price information, less expensive programming being more prominently featured than more expensive programming, for example. These and other criteria may be selected and combined to create user-friendly grid displays that allow users to locate programming of interest most efficiently. To improve users' experience, categories may be chosen or based on user profile information, may be customized by users, and may be stored in a user profile.

Display screens like display screen 1200 may be displayed in any appropriate situation. For example, display screen 1200 may be displayed in response to selection of grid-view option 107 of FIG. 1. In some embodiments, a display screen like display screen 1200 may also be displayed instead of display screens 1000 or 1100 in response to a user selecting a grid cell in any of the display screens of FIGS. 2-4 and 7-9.

Display screens of the MOD portal application as shown in FIGS. 1-12 use commonly-used application selection objects such as hyperlinks, buttons, lists, dropdown boxes, checkboxes, and radio buttons. It will be understood that these selection objects are only illustrative, and other selection objects can be used by those skilled in the art without departing from the scope and spirit of the present invention. For example, selection objects that allow for the selection of only one option, such as a radio button, may be replaced with a selection option that allows for the selection of multiple options, such as checkboxes.

The particular display screens of FIGS. 2-12 show full-screen display screens which may occupy substantially the entire MOD portal screen. The display screens are shown as full-screen displays for purposes of illustration only, and may also be implemented in other display formats. For example, the display screens may be presented as picture-in-guide (PIG) displays. PIG displays show the guide on a first portion of the screen and video or other image content on a second portion of the display screen. The display screens of FIGS. 2-12 may alternatively be presented in tripartite display format. The tripartite display may show the guide on a first portion of the screen, video, advertisements or other image content on a second portion of the screen, and program information or other information on a third portion of the screen. PIG displays and tripartite PIG displays are described in more detail in Satterfield et al. U.S. Pat. No. 6,564,378 issued May 13, 2003, Reynolds et al. U.S. Pat. No. 6,563,515 issued May 13, 2003, Yuen et al. U.S. Pat. No. 6,239,794 issued May 29, 2001, and Carpenter et al. U.S. patent application Ser. No. 09/773,883 filed Jan. 31, 2001, which are hereby incorporated by reference herein in their entireties.

The content of display screens of FIGS. 2-12 may also be accessed in a browse display window overlaid on a portion of the display screen. Browse displays may allow users to view and navigate through portions of grid menus, such as the grid display screens of FIGS. 2-4, 7-9 and 12, while viewing other media content on the display screen. Browse display windows are described in more detail in Reynolds et al. U.S. Pat. No. 6,563,515 issued May 13, 2003.

The on-demand portal described above may rely in large part on the same communication networks, distribution facilities, and servers used for distributing television broadcasting, on-demand media, and other media and services to users. An illustrative on-demand media distribution system includes programming sources 1302 and distribution facility 1304. Media such as television programming and digital music is provided from programming sources 1302 to distribution facility 1304, using communications path 1306. Communications path 1306 may be a satellite path, a fiber-optic path, a cable path, or any other suitable wired or wireless communications path or combination of such paths.

Programming sources 1302 may be any suitable sources of television and music programming, such as television broadcasters (e.g., NBC, ABC, and HBO), on-demand media vendors (e.g., HBO, Showtime, Starz, Encore, and Cinemax), or other television or music production studios. Programming sources 1302 may provide television programming in a variety of formats in high definition and standard definition, such as, for example, 1080p, 1080i, 720p, 480p, 480i, and any other suitable format.

Distribution facility 1304 may be a cable system headend, a satellite television distribution facility, a television broadcaster, or any other suitable facility for distributing video media (e.g., television programs, video-on-demand programs, pay-per-view programs) and audio media (e.g., music programming and music clips) to the equipment of subscribers of the corresponding cable, satellite, or IPTV system. In some approaches, distribution facility 1304 may also distribute other media to users, such as video and audio clips, web pages, and interactive applications, that may be offered to subscribers of a given cable, satellite, or IPTV system. Distribution facility 1304 may include one or more primary distribution facilities 1304*a* and/or one or more optional secondary distribution facilities 1304*b* that may distribute media to users. For brevity, in the description that follows, primary and secondary distribution facilities 1304*a* and 1304*b* may be referred to as distribution facility 1304. It will be understood that references to distribution facility 1304 may more generally refer to one or both of primary and secondary distribution facilities 1304*a* and 1304*b*, as appropriate.

One or more distribution facilities 1304*a* and 1304*b* may be owned and/or operated by one or more media providers (e.g., Comcast, Cablevision, Verizon, DirectTV, Sirus, XFM, etc.). Typically, a user does not subscribe to more than one media provider for access to the same or similar service (e.g., broadcast television service, Internet service, satellite radio or television service, etc.). (The term "subscribe" as referenced herein does not require, although in some embodiments it may require, the user paying a fee for a service. Rather the term subscribe is intended to distinguish the service provider that primarily provides the user with a media service, as opposed to a secondary or other media service provider that the user may simply access and/or search to receive additional media.)

For example, many households only receive cable television from one television provider (i.e., the primary television provider). Additionally, many households only receive Internet access from one Internet provider (i.e., the primary Internet provider). In some embodiments, despite separate distribution facilities being maintained for television and Internet media, the user may receive television service and Internet service from the same media provider (e.g., Comcast may provide both television and Internet service to the user). Alternatively, the television provider and the Internet provider may be different media providers (e.g., Comcast may provide television service while Verizon may provide Internet service to the user). Moreover, the user may choose to receive three different services (e.g., television, Internet and satellite radio) from one, two or three primary service providers. Regardless of the number of primary services providers, there are typically numerous primary distribution facilities 1304*a* in system 1300, but only one is shown in FIG. 13 to avoid overcomplicating the drawing.

Figure 13:
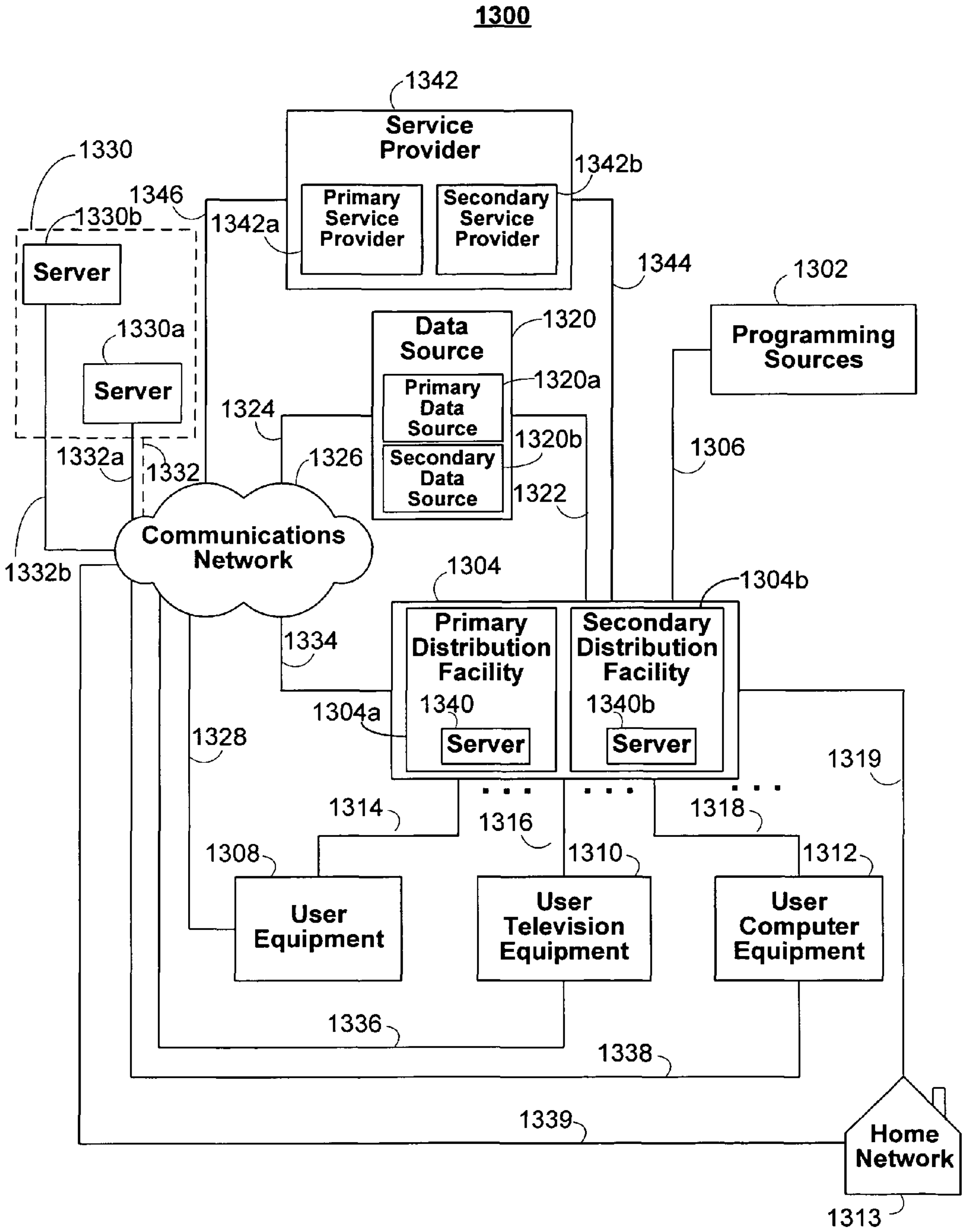
FIG. 13 is a diagram of an illustrative interactive media guidance system in accordance with the present invention.

Despite the large amounts of media that may be available to the user from the primary distribution facility 1304*a*, additional media may be available to the user from the secondary distribution facility 1304*b* that is shown in FIG. 13. The secondary distribution facility 1304*b* may be owned and/or operated by a service provider that is not the user's primary service provider. Similar to distribution facility 1304*a*, distribution facility 1304*b* may represent a single distribution facility and/or a plurality of distribution facilities that may be owned or operated by the same or different service providers. The present invention provides systems, computer readable media and methods that enable a user to view program listings for and access on-demand media content that may be offered by one or more distribution facilities 1304*a* and/or 1304*b*, and/or one or more programming sources 1302.

Distribution facility 1304, including distribution facilities 1304*a* and 1304*b*, may be connected to various user equipment devices 1308, 1310, and 1312. Such user equipment devices may be located, for example, in the homes of users. User equipment devices may include user television equipment 1310, user computer equipment 1312, or any other type of user equipment suitable for searching and/or accessing media. User equipment 1308 may be any type of user equipment (e.g., user television equipment, user computer equipment, cellular phones, handheld video players, gaming platforms, etc.) and, for simplicity, user equipment devices may be referred to generally as user equipment 1308.

User equipment devices 1308, 1310, and 1312 may receive media (such as television, music, web pages, etc.) and other data from distribution facility 1304 over communications paths, such as communications paths 1314, 1316, and 1318, respectively. User equipment devices 1308, 1310, 1312 may also transmit signals to distribution facility 1304 over paths 1314, 1316, and 1318, respectively. Paths 1314, 1316, and

1318 may be cables or other wired connections, free-space connections (e.g., for broadcast or other wireless signals), satellite links, or any other suitable link or combination of links.

A second approach illustrated in FIG. 13 by which media and media guidance are provided to end users is a non-television-centric approach. In this approach media such as video (which may include television programming), audio, images, web pages, or a suitable combination thereof, are provided to equipment of a plurality of users (e.g., user equipment 1308, user television equipment 1310, and user computer equipment 1312) by server 1330*a* via communications network 1326. Similar to distribution facility 1304, user access to server 1330*a* may also be controlled by at least one of the user's primary media servers. This approach is non-television-centric because media (e.g., television programming) is provided by and delivered at least partially, and sometimes exclusively, via equipment that have not traditionally been primarily focused on the television viewing experience. Non-television-centric equipment is playing a larger role in the television viewing experience.

Similarly, server 1330*b* may also provide users media and media guidance via a non-television-centric approach. In addition to the media made available by server 1330*a*, server 1330*b* may provide video (which may include television programming), audio, images, web pages, or a suitable combination thereof, to equipment of a plurality of users (e.g., user equipment 1308, user television equipment 1310, and user computer equipment 1312) via communications network 1326. User access to server 1330*b*, however, is controlled by at least one of the user's secondary media servers. Server 1330*b* may provide additional media that is not made available to the user by server 1330*a*. Servers 1330*a* and 1330*b*, and associated communication paths 1332*a* and 1332*b*, may generally be referred to as server 1330 and communication path 1332 for brevity. It will be understood that references to server 1330 and communication path 1332 may hereinafter refer generally to one or both of servers 1330*a* and 1330*b*, and communication paths 1332*a* and 1332*b*, respectively, as appropriate.

In some embodiments for this approach, communications network 1326 is the Internet. Server 1330 may provide for example, a web site that is accessible to the user's equipment and provides an on-line guidance application for the user. In such approaches, the user's equipment may be, for example, a PC or a hand-held device such as a PDA or web-enabled cellular telephone that incorporates a web browser. In other embodiments, server 1330 uses the Internet as a transmission medium but does not use the Web. In such approaches, the user's equipment may run a client application that enables the user to access media. Particular client applications may only be provided by server 1330. In still other approaches, communications network 1326 is a private communications network, such as a cellular phone network, that does not include the Internet, and is exclusive to a particular media server.

In yet other approaches, communications network 1326 may include a private communications network and the Internet. For example, a cellular telephone or other mobile-device service provider may provide Internet access to its subscribers via a private communications network, or may provide media such as video clips or television programs to its customers via the Internet and its own network.

The aforementioned approaches for providing media may, in some embodiments, be combined. For example, a distribution facility 1304 may provide a television-centric media delivery system, while also providing users' equipment (e.g., 1308, 1310 and 1312) with access to other non-television-centric delivery systems provided by server 1330. For example, a user's equipment may include a web-enabled set-top box or a television enabled PC. Distribution facility 1304 may, in addition to television and music programming, provide the user with Internet access whereby the user may access server 1330 via communications network 1326. Distribution facility 1304 may communicate with communications network 1326 over any suitable path 1334, such as a wired path, a cable path, fiber-optic path, satellite path, or combination of such paths.

Media guidance applications may be provided using any approach suitable for the type of media and distribution system for which the applications are used. Media guidance applications may be, for example, stand alone applications implemented on users' equipment. In other embodiments, media guidance applications may be client-server applications where only the client resides on the users' equipment. In still other embodiments, guidance applications may be provided as web sites accessed by a browser implemented on the users' equipment. Whatever the chosen implementation, the guidance application will require information about the media for which it is providing guidance. For example, titles or names of media, brief descriptions, or other information may be necessary to allow users to navigate among and find desired media selections.

In some television-centric embodiments, for example, the guidance application may be a stand-alone interactive television program guide that receives program guide data via one or more data feeds (e.g., a continuous feed, trickle feed, and/or data in the vertical blanking interval of a channel). The user's primary data source is shown in FIG. 13 as data source 1320*a*. Data source 1320*a* in system 1300 may include a program listings database that is used to provide the user with television program-related information such as scheduled broadcast times, titles, channels, ratings information (e.g., parental ratings and critic's ratings), detailed title descriptions, genre or category information (e.g., sports, news, movies, etc.), program format (e.g., standard definition, high definition) and information on actors and actresses. Data source 1320*a* may also be used to provide advertisements (e.g., program guide advertisements and advertisements for other interactive television applications), real-time data such as sports scores, stock quotes, news data, and weather data, application data for one or more media guidance applications or other interactive applications, and any other suitable data for use by system 1300. As another example, data source 1320*a* may provide data indicating the types of information that may be included in interactive media guidance overlays (e.g., at the request of the user, absent user modification, etc.).

The user may also have access to data owned, operated, controlled or provided by the data sources of media providers that are not one of the user's primary media providers. Data source 1320*b* may provide all the same data, features, etc. described above in reference to data source 1320*a*. Moreover, data source 1320*b* may provide, for example, additional data, different data or data less expensively than the data provided by data source 1320*a*. Data source 1320*b* may include a program listing database and other data associated with a secondary distribution facility 1304*b*, a secondary data programming source 1302, or any other source of programming.

Data sources 1320*a* and 1320*b* may generally be referred to as data source 1320. In one embodiment, data sources 1320*a* and 1320*b* may be consolidated, either physically, functionally, or both, to include substantially all data and program listings for all programming sources 1302, service providers 1342, servers 1330, and other sources of programming and data. In some embodiments of the present invention, on-demand media listings and other MOD portal database information may be stored in one or more data sources such as data source 1320. Data and information that may be included in on-demand media listings and MOD portal databases are described in further detail herein, for example, in connection with FIGS. 19-23.

Program guide data may be provided to user equipment, including user equipment located on home network 1313, using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.).

In some television-centric embodiments, guidance data from data source 1320 may be provided to users' equipment using a client-server approach. For example, a guidance application client residing on the user's equipment may initiate sessions with server 1340 and/or 1340*b* to obtain guidance data when needed. In some embodiments, the guidance application may initiate sessions with server 1340 via a home network server (e.g., a server located in home network 1313 that supports the user equipment devices located in home network 1313).

Data source 1320 may represent multiple data sources, although only two data sources are shown in FIG. 13 to avoid overcomplicating the drawing. For example, a separate data source may be associated with each of a plurality of primary or secondary television broadcasters and may provide data that is specific to those broadcasters (e.g., advertisements for future programming of the broadcasters, logo data for displaying broadcasters' logos in program guide display screens, etc.). Data source 1320, as well as any other system components of FIG. 13, may be provided using equipment at one or more locations. Systems components are drawn as single boxes in FIG. 13 to avoid overcomplicating the drawings.

Data source 1320 may provide data to distribution facility 1304 over communications path 1322 for distribution to the associated user equipment and home network 1313 (discussed below) over paths 1314, 1316, 1318, and 1319 (e.g., when data source 1320 is located at a main facility). Communications path 1322 may be any suitable communications path such as a satellite communications path or other wireless path, a fiber-optic or other wired communications path, a path that supports Internet communications, or other suitable path or combination of such paths.

In some television-centric and non-television centric approaches, data source 1320 may provide guidance data directly to user equipment 1308 over path 1324, communications network 1326, and path 1328 (e.g., when data source 1320 is located at a facility such as programming source 1302). In some embodiments of the present invention, data source 1320 may provide guidance data directly to user equipment located on home network 1313 (discussed below) over path 1324, communications network 1326, and path 1339 (e.g., when data source 1320 is located at a facility such as programming source 1302). Paths 1324, 1328, and 1339 may be wired paths such as telephone lines, cable paths, fiber-optic paths, satellite paths, wireless paths, any other suitable paths or a combination of such paths. Communications network 1326 may be any suitable communications network, such as the Internet, the public switched telephone network, or a packet-based network.

User equipment devices, including user equipment devices located on home network 1313 (discussed below), such as user television equipment and personal computers, may use the program schedule data and other interactive media guidance application data to display program listings and other information (e.g., information on digital music) for the user. An MOD portal application, interactive television program guide application or other suitable interactive media guidance application may be used to display the information on the user's display (e.g., in one or more overlays that are displayed on top of video for a given television channel). Interactive displays may be generated and displayed for the user using any suitable approach. In one suitable approach, distribution facility 1304, server 1330, or another facility, may generate application display screens and may transmit the display screens to user equipment for display. In another suitable approach, user equipment may store data for use in one or more interactive displays (e.g., program schedule data, advertisements, logos, etc.), and an interactive media guidance application implemented at least partially on the user equipment may generate the interactive displays based on instructions received from distribution facility 1304, server 1330 or another facility. In some embodiments of the present invention, user equipment may store only the data that is used to generate the interactive television displays (e.g., storing logo data for a particular television broadcaster only if the logo is to be included in one or more interactive television displays). In some embodiments of the present invention, user equipment may store data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive overlays for the user.

In still other embodiments, MOD portal applications or other interactive media guidance applications (television-centric and non-television centric) may be provided online as, for example, websites. For example, server 1330 may provide an online interactive television program guide. As another example, user equipment 1308 may be a mobile device, such as a cellular telephone or personal digital assistant (PDA). The mobile device may be web-enabled to allow the user to access an on-line guidance application (which may be modified from its original version to make it appropriate for a cellular phone). Alternatively, the mobile device may have an applet that communicates with server 1330 to obtain guidance data via the Internet.

Server 1330 may receive program schedule data and other data from data source 1320 via communications path 1324, communications network 1326, and communications path 1332 or via another suitable path or combination of paths. Path 1332 may be a satellite path, fiber-optic path, wired path, or any other path or combination of paths. User equipment 1308 may access the on-line interactive media guidance application and other sources from server 1330 via communications path 1328. User equipment 1308 may also access the application and other services on server 1330 via communications path 1314, distribution facility 1304, and communications path 1334. For example, a cable modem or other suitable equipment may be used by user equipment 1308 to communicate with distribution facility 1304.

User equipment such as user television equipment 1310, user computer equipment 1312, and user equipment located on home network 1313 may access the on-line interactive media guidance application and server 1330 using similar arrangements. User television equipment 1310 may access the on-line interactive media guidance application and server 1330 using communications path 1336 or using path 1316, distribution facility 1304, and path 1334. User computer equipment 1312 may access the on-line interactive media guidance application and server 1330 using communications path 1338 or using path 1318, distribution facility 1304, and path 1334. User equipment located on home network 1313 may access the on-line media guidance application and server 1330 using communications path 1339 or using path 1319, distribution facility 1304, and path 1334. Paths 1336, 1338, and 1339 may be any suitable paths such as wired paths, cable paths, fiber-optic paths, wireless paths, satellite paths, or a combination of such paths.

In some embodiments, system 1300 may support other interactive applications in addition to the interactive media guidance applications. Such applications may be implemented using any suitable approach. For example, the interactive applications may be implemented locally on the user equipment or in a distributed fashion (e.g., using a client-server architecture in which the user equipment serves at least partly, and for at least some of the time, as the client and a server, such as server 1340 at distribution facility 1304, server 1330, or other suitable equipment acts as the server). Other distributed architectures may also be used if desired. Moreover, some or all of the features of the interactive applications of system 1300 (including the media guidance application) may be provided using operating system software or middleware software. Such operating system software and middleware may be used instead of or in combination with application-level software. In yet other approaches, interactive applications may also be supported by servers or other suitable equipment at one or more service providers such as service provider 1342*a* or service provider 1342*b*. Regardless of the particular arrangement used, the software that supports these features may be referred to as an application or applications. In some embodiments, the MOD portal application, as described herein, may be considered one such example of an other interactive application.

In another example, an interactive application such as a home shopping service may be supported by a service provider such as service provider 1342 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 1342 via distribution facility 1304 and communications path 1344 or via communications network 1326 and communications path 1346. Communications paths such as paths 1344 and 1346 may be any suitable paths such as wired paths, cable paths, fiber-optic paths, satellite paths, or a combination of such paths.

Another example of an interactive application is a home banking application. A home banking service may be supported using personnel at facilities such as service provider 1342. An interactive home banking application that is implemented using the user equipment may access the home banking service via distribution facility 1304 and communications path 1344 or via communications network 1326 and communications path 1346.

If desired, an interactive media guidance application such as a network-based video recorder or a video-on-demand application may be supported using server 1340, server 1330, a home network server, or equipment at one or more service providers 1342. In some embodiments of the present invention, an MOD portal application may similarly be supported using server 1340, server 1330, or equipment at one or more service provider 1342. Video-on-demand or other on-demand content and video recorded using a network-based video recorder arrangement may be stored on server 1340 or server 1330 or a home network server or at a service provider 1342 and may be provided to the user equipment when requested by users. An interactive television program guide, for example, may be used to support the functions of a personal video recorder (sometimes called a digital video recorder) that is implemented using user equipment 1308. Illustrative equipment that may be used to support personal video recorder functions include specialized personal video recorder devices, integrated receiver decoders (IRDs), set-top boxes with integrated or external hard drives, or personal computers with video recording capabilities.

Interactive applications such as media guidance applications (e.g., MOD portal application, interactive television program guide applications, and video-on-demand applications), home shopping applications, home banking applications, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping services, network-based video recorder functions, personal video recorder functions, navigational functions, program guide functions, communications functions, and other suitable functions may be provided using one application or any other suitable number of applications. The one or more applications may display various overlays on user equipment including, for example, interactive television information on top of video for a given television channel. One or more media providers may also provide the one or more applications to the user.

Interactive television program guide applications, MOD portal applications, home banking applications, home shopping applications, network-based video recorder and personal video recorder applications, video-on-demand applications, gaming applications, communications applications, and navigational applications are only a few illustrative examples of the types of interactive media guidance and other applications that may be supported by system 1300. Other suitable interactive applications that may be supported include news services, web browsing, web broadcasting, online television and other Internet services, and interactive wagering services (e.g., for wagering on horse races, sporting events, and the like). Interactive television overlays that are displayed by these applications may also be customized in accordance with the present invention.

Users may have multiple types of user equipment by which they access media and obtain media guidance. For example, some users may have home networks that are accessed by in-home and mobile devices. As shown in FIG. 13, home network 1313 communicates with distribution facility 1304 and server 1330 over paths 1319 and 1339 (and, in the case of server 1330, communications network 1326). Such home networks 1313 may be located, for example, in homes of users or distributed, for example, among homes of users. Home networks 1313 may each include a plurality of interconnected user equipment devices, such as, for example user equipment devices 1308, 1310 and 1312. In some embodiments, users may control in-home devices via a media guidance application implemented on a remote device. For example, users may access an online media guidance application on a website via a personal computer at their office, or a mobile device such as a PDA or web-enabled cellular telephone. The user may set settings (e.g., recordings, reminders, or other settings) on the on-line guidance application to control the user's in-home equipment. The on-line guide may control the user's equipment directly, or by communicating with a media guidance application on the user's in-home equipment.

The MOD portal application may identify the on-demand media and programming that is available from the service providers, vendors, and other content providers to which a user may have access. In order to identify the available programming, the MOD portal application may monitor and/or access the different providers' and vendors' program offerings by obtaining program information from each vendor and provider. The vendors and providers may maintain up-to-date program information of their program offerings in one or more data sources 1320. The vendors and providers may also store program listings on one or more data sources, such as data source 1320, which may be accessible through communications network 1326 or through distribution facility 1304. The vendors and providers may also store program listings on one or more servers, such as server 1330 and 1340, which may be accessible through communications network 1326 or other communication paths shown in FIG. 13.

In a first illustrative embodiment, the MOD portal application may maintain a database of the vendors and providers whose media is accessible to users. This database will be referred to hereinafter as the MOD portal database. The MOD portal database may include identifiers allowing the portal to uniquely identify, locate, and communicate with the vendors and providers and to access and retrieve their program information. In this embodiment, the MOD portal database may be considered distributed amongst the vendors and providers data sources. The MOD portal database stores identifying information for each vendor and provider, and does not necessarily store each vendor's and provider's program information.

In a second illustrative embodiment, the MOD portal database may be an independent program information database containing program information for programming available from one or more vendors and providers. The MOD portal application may maintain the database by synchronizing the program information stored in the MOD portal database with the program information maintained by the one or more vendors or providers. The synchronization may occur periodically, or in response to a change in a vendor's or provider's program information. The synchronization may also occur in response to a program information synchronization command sent from any one or more of the data sources for vendors or providers to the MOD portal database. In embodiments in which vendors' and providers' program information are stored on one or more servers 1330, the synchronization of program information may be done through communications network 1326. In embodiments in which vendors' and providers' program information are stored on one or more servers 1340, or in one or more data sources 1320, the synchronization of program information may be done either through communications network 1326 or through distribution facility 1304.

Figure 14:
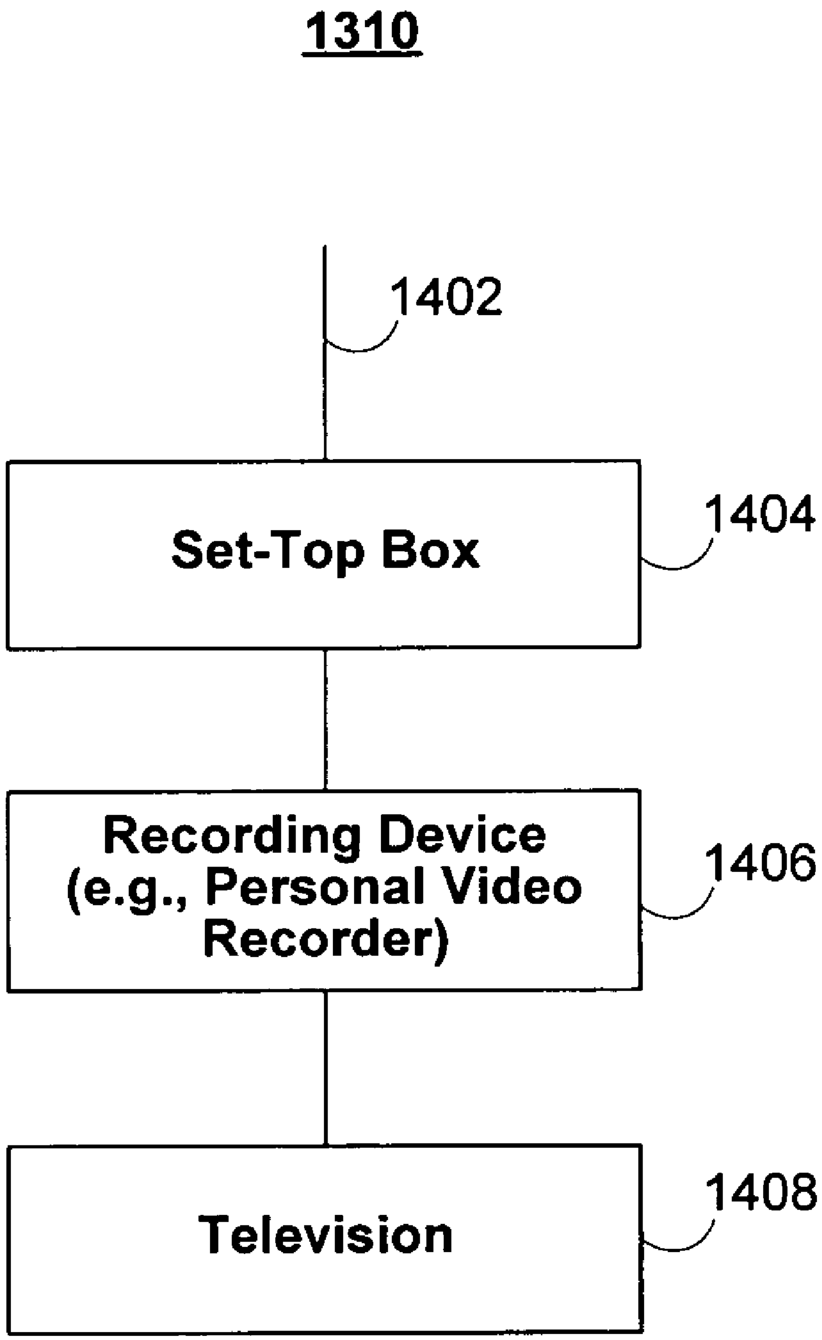
FIG. 14 is a diagram of illustrative user television equipment in accordance with the present invention.

FIGS. 14-18 show illustrative arrangements for user equipment. An illustrative set-top box-based arrangement for user equipment 1310 is shown in FIG. 14. User television equipment 1310 may be stand-alone or a part of home network 1313 (FIG. 13). Input/output 1402 may be connected to communications paths such as paths 1316 and 1336 (FIG. 13). Input/output functions may be provided by one or more wires or communications paths, but are shown as a single path in FIG. 14 to avoid overcomplicating the drawing. Television programming, program guide data, and any other suitable interactive media guidance application data or other data may be received using input/output 1402. Commands and requests and other data generated as a result of user interactions with the interactive media guidance application may also be transmitted over input/output 1402.

Set-top box 1404 may be any suitable analog or digital set-top box (e.g., a cable set-top box). Set-top box 1404 may contain an analog tuner for tuning to a desired analog television channel (e.g., a channel comprising television programming, interactive television data, or both). Set-top box 1404 may also contain digital decoding circuitry for receiving digital television channels (e.g., channels comprising television or music programming, interactive television data, etc.). Set-top box 1404 may also contain a high-definition television tuner for receiving and processing high-definition television channels. Analog, digital, and high-definition channels may be handled together if desired. Multiple tuners may be provided (e.g., to handle simultaneous watch and record functions or picture-in-picture (PIP) functions). Box 1404 may be an integrated receiver decoder (IRD) that handles satellite television. If desired, box 1404 may have circuitry for handling cable, over-the-air broadcast, and satellite content.

Set-top box 1404 may be configured to output media, such as television programs, in a preferred format. Because television programs may be received in a variety of formats, set-top box 1404 may contain scaler circuitry for upconverting and downconverting television programs into the preferred output format used by set-top box 1404. For example, set-top box 1404 may be configured to output television programs in 720p. In this example, the scaler circuitry may upconvert standard-definition television programs having 480 lines of vertical resolution to 720p format and downconvert certain high-definition television programs having 1080 lines of vertical resolution to 720p format.

Box 1404 may include a storage device (e.g., a digital storage device such as a hard disk drive) for providing recording capabilities. Box 1404 may also be connected to a recording device 1406 such as a video cassette recorder, flash memory, personal video recorder, optical disc recorder, or other device or devices with storage capabilities. In some embodiments, box 1404 may be configured to record either standard-definition television programs or high-definition television programs. In some embodiments, box 1404 may be configured to record both standard-definition television programs and high-definition television programs.

Set-top box 1404 contains a processor (e.g., a microcontroller or microprocessor or the like) that is used to execute software applications. Set-top box 1404 may contain memory such as random-access memory for use when executing applications. Nonvolatile memory may also be used (e.g., to launch a boot-up routine and other instructions). Hard disk storage in box 1404 or in recording device 1406 may be used to back up data and to otherwise support larger databases and storage requirements than may be supported using random-access memory approaches. Hard disk storage in box 1404 or in recording device 1406 may also be used to store and back up program guide settings or saved user preferences.

Set-top box 1404 may have infrared (IR) or other communications circuitry for communicating with a remote control or wireless keyboard. Set-top box 1404 may also have dedicated buttons and a front-panel display. The front-panel display may, for example, be used to display the current channel to which the set-top box is tuned.

Set-top box 1404 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 1404 may be integrated into other user equipment (e.g., a television or video recorder).

Recording device 1406 may be used to record videos provided by set-top box 1404. For example, if set-top box 1404 is tuned to a given television channel, the video signal for that television channel may be passed to recording device 1406 for recording on a videocassette, compact disc, digital video disk, or internal hard drive or other storage device. In some embodiments, recording device 1406 may be configured to record either standard-definition television programs or high-definition television programs. In some embodiments, recording device 1406 may be configured to record both standard-definition television programs and high-definition television programs. Recording device 1406 may have communications circuitry such as a cable modem, an ISDN modem, a DSL modem, or a telephone modem for communications with other equipment. Such communications may involve the Internet or any other suitable communications networks or paths. The components of recording device 1406 may be integrated into other user equipment (e.g., a television, stereo equipment, etc.).

Recording device 1406 may be controlled using a remote control or other suitable user interface. If desired, video recorder functions such as start, stop, record and other functions for device 1406 may be controlled by set-top box 1404. For example, set-top box 1404 may control recording device 1406 using infrared commands directed toward the remote control inputs of recording device 1406 or set-top box 1404 may control recording device 1406 using other wired or wireless communications paths between box 1404 and device 1406.

The output of recording device 1406 may be provided to television 1408 for display to the user. In some embodiments, television 1408 may be capable of displaying high-definition programming (i.e., HDTV-capable). If desired, multiple recording devices 1406 or no recording device 1406 may be used. If recording device 1406 is not present or is not being actively used, the video signals from set-top box 1404 may be provided directly to television 1408. Any suitable television or monitor may be used to display the video. For example, if the video is in a high-definition format, an HDTV-capable television or monitor is required to display the video. In the equipment of FIG. 14 and the other equipment of system 1300 (FIG. 13), the audio associated with various video items is typically distributed with those video items and is generally played back to the user as the videos are played. In some embodiments, the audio may be distributed to a receiver (not shown), which processes and outputs the audio via external speakers (not shown).

Figure 15:
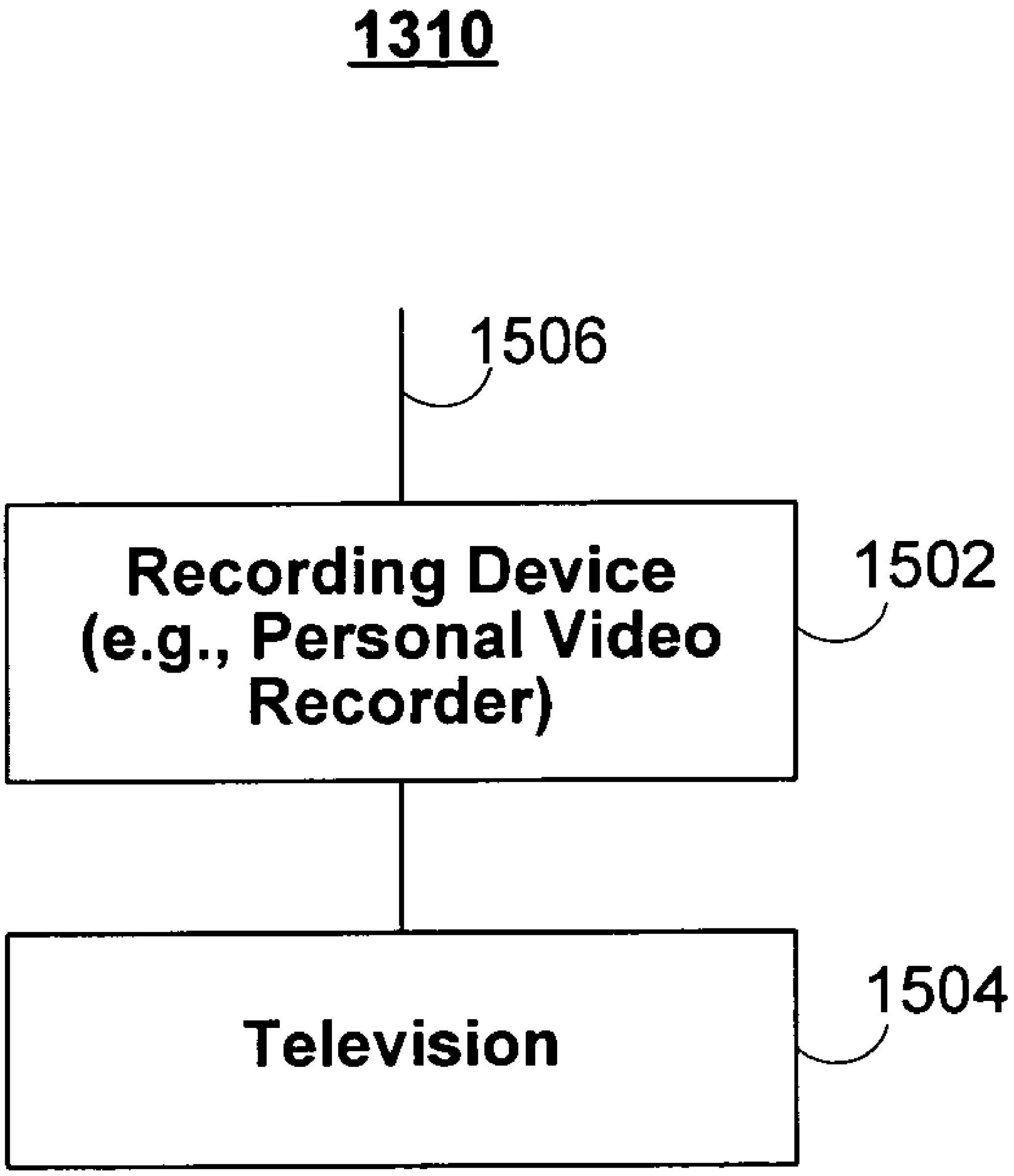
FIG. 15 is a diagram of additional illustrative user television equipment in accordance with the present invention.

Another illustrative arrangement for user television equipment 1310 (FIG. 13) is shown in FIG. 15. User television equipment 1310 may be stand-alone or a part of home network 1313 (FIG. 13). In the example of FIG. 15, user television equipment 1310 includes a recording device 1502 such as a digital video recorder (e.g., a personal video recorder (PVR)) that uses a hard disk or other storage for recording video. Recording device 1502 may alternatively be a digital video disc recorder, compact disc recorder, videocassette recorder, or other suitable recording device. Equipment 1310 of FIG. 15 may also include a television 1504. In some embodiments, television 1504 may be HDTV-capable. Input/output 1506 may be connected to communications paths such as paths 1316 and 1336 (FIG. 13). Television programming, program schedule data, and other data (e.g., advertisement data, data indicating one or more television channels for which the display of an overlay is to be customized, etc.) may be received using input/output 1506. Commands and requests and other data from the user may be transmitted over input/output 1506.

Recording device 1502 may contain at least one analog tuner for tuning to a desired analog television channel (e.g., to display video for a given television channel to a user, to receive program guide data and other data) and multiple other tuners may also be provided. Recording device 1502 may also contain digital decoding circuitry for receiving digital television programming, music programming, program guide data and other data on one or more digital channels. Recording device 1502 may also contain circuitry for receiving high-definition television channels. If desired, recording device 1502 may contain circuitry for handling analog, digital, and high-definition channels. Recording device 1502 also contains a processor (e.g., a microcontroller or microprocessor or the like) that is used to execute software applications. Recording device 1502 may contain memory such as random-access memory for use when executing applications. Nonvolatile memory may also be used to store a boot-up routine or other instructions. The hard disk and other storage in recording device 1502 may be used to support databases (e.g., program guide databases or other interactive television application databases). The hard disk or other storage in recording device 1502 may also be used to record video such as television programs or video-on-demand content or other content provided to recording device 1502 over input/output 1506.

Recording device 1502 may have IR communications circuitry or other suitable communications circuitry for communicating with a remote control. Recording device 1502 may also have dedicated buttons and a front-panel display. The front-panel display may, for example, be used to display the current channel to which the recording device is tuned.

Recording device 1502 may also have communications circuitry such as a cable modem, an ISDN modem, a DSL modem, a telephone modem, or a wireless modem for communications with other equipment. Such communications may involve the Internet or other suitable communications networks or paths.

If desired, recording device 1502 may include a satellite receiver or other equipment that has wireless communications circuitry for receiving satellite signals.

Recording device 1502 of FIG. 15 or recording device 1406 of FIG. 14 may record new video while previously recorded video is being played back on television 1504 or 1408. This allows users to press a pause button during normal television viewing. When the pause button is pressed, the current television program is stored on the hard disk of digital video recorder 1502. When the user presses play, the recorded video may be played back. This arrangement allows the user to seamlessly pause and resume television viewing. Recording devices 1502 and 1406 may also be used to allow a user to watch a previously-recorded program while simultaneously recording a new program.

The set-top box arrangement of FIG. 14 and the personal video recorder with a built-in set-top box arrangement of FIG. 15 are merely illustrative. Other arrangements may be used if desired. For example, user television equipment may be based on a WebTV box, a personal computer television (PC/TV), or any other suitable television equipment arrangement. If desired, the functions of components such as set-top box 1404, recording device 1502, a WebTV box, or PC/TV or the like may be integrated into a television or personal computer or other suitable device.

Figure 16:
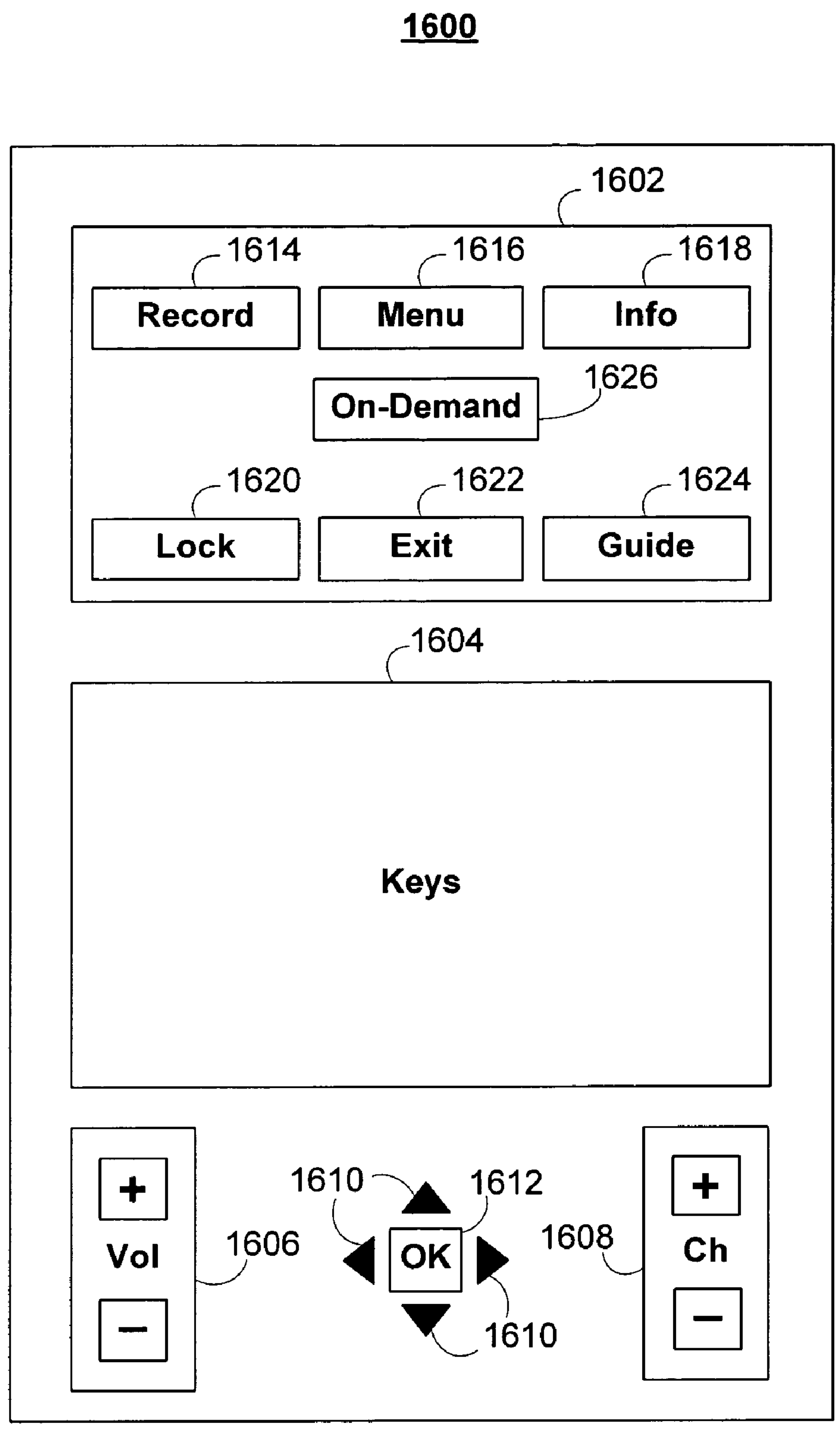
FIG. 16 is a diagram of an illustrative remote control in accordance with the present invention.

An illustrative remote control 1600 for operating user television equipment 1310 (FIG. 13) or suitable user computer equipment 1312 is shown in FIG. 16. Remote control 1600 is only illustrative and any other suitable user input interface may be used to operate user equipment (e.g., a mouse, trackball, keypad, keyboard, touch screen, voice recognition system, etc.). Remote control 1600 may have function keys 1602 and other keys 1604 such as keypad keys, power on/off keys, pause, stop, fast-forward and reverse keys. Volume up and down keys 1606 may be used for adjusting the volume of the audio portion of a video. Channel up and down keys 1608 may be used to change television channels and to access content on virtual channels. Cursor keys 1610 may be used to navigate on-screen menus. For example, cursor keys 1610 may be used to position an on-screen cursor, indicator, or highlight (sometimes all generically referred to herein as a highlight or highlight region) to indicate interest in a particular option or other item on a display screen that is displayed by the interactive television application.

OK key 1612 (sometimes called a select or enter key) may be used to select on-screen options that the user has highlighted.

Keys 1602 may include RECORD key 1614 for initiating recordings. MENU button 1616 may be used to direct an interactive media guidance application to display a menu on the user's display screen (e.g., on television 1408 or 1504 or on a suitable monitor or computer display). INFO button 1618 may be used to direct an interactive media guidance application to display an information display screen. For example, when a user presses INFO key 1618 while video for a given television channel is displayed for the user, an interactive television program guide may display a FLIP/BROWSE overlay including program schedule information for the current program on the given television channel on top of the video. As another example, when a particular program listing in an interactive television program listings display screen is highlighted, the user pressing INFO button 1618 may cause an interactive television program guide to provide additional program information associated with that program listing (e.g., a program description, actor information, schedule information, etc.).

LOCK button 1620 may be used to modify access privileges. For example, a parent may use LOCK button 1620 or on-screen options to establish parental control settings for the interactive media guidance application. The parental control settings may be time-based settings (e.g., to prevent a child from watching television during a particular time block, such as from 3:00 PM to 5:00 PM). The parental control settings may also be used to, for example, block programming based on rating, channel, and program title. A locked or blocked program (or other media) is typically not viewable until the interactive media guidance application is provided with a suitable personal identification number (PIN). Once this PIN has been entered, the interactive media guidance application will unlock the user's equipment and allow the locked content to be accessed.

EXIT button 1622 may be used to exit the interactive media guidance application or to exit a portion of the interactive media guidance application (e.g., to cause an interactive television program guide to remove a FLIP, BROWSE, or other interactive television overlay from the display screen). GUIDE button 1624 may be used to invoke an interactive television program guide (e.g., a program guide menu screen, program listings screen, or other program guide screen).

ON-DEMAND button 1626 may be used to launch the MOD portal application, or to return to the MOD portal menu screen. ON-DEMAND button 1626 may launch the MOD portal application and cause the interactive program guide to display the MOD portal screen 100 of FIG. 1 on the user equipment. If the user has already launched the MOD portal, the ON-DEMAND button may be used to return to the MOD main menu screen 100 from any other portal display screen.

The keys shown in FIG. 16 are merely illustrative. Other keys or buttons may be provided if desired. For example, a music button may be used to access music with the interactive media guidance application. An edit button may be used to edit stored content (e.g., to remove commercials, remove portions of a video, etc.). Alphanumeric buttons may be used to enter alphanumeric characters. A last or back button may be used to browse backward in the interactive media guidance application (e.g., to return to a previous channel, web page, or other display screen). Video recorder function buttons such as a play button, pause button, stop button, rewind button, fast-forward button, and record button, may be used to control video recorder functions (local or network-based) in system 1300 (FIG. 13). A help key may be used to invoke help functions such as context-sensitive on-screen help functions.

Figure 17:
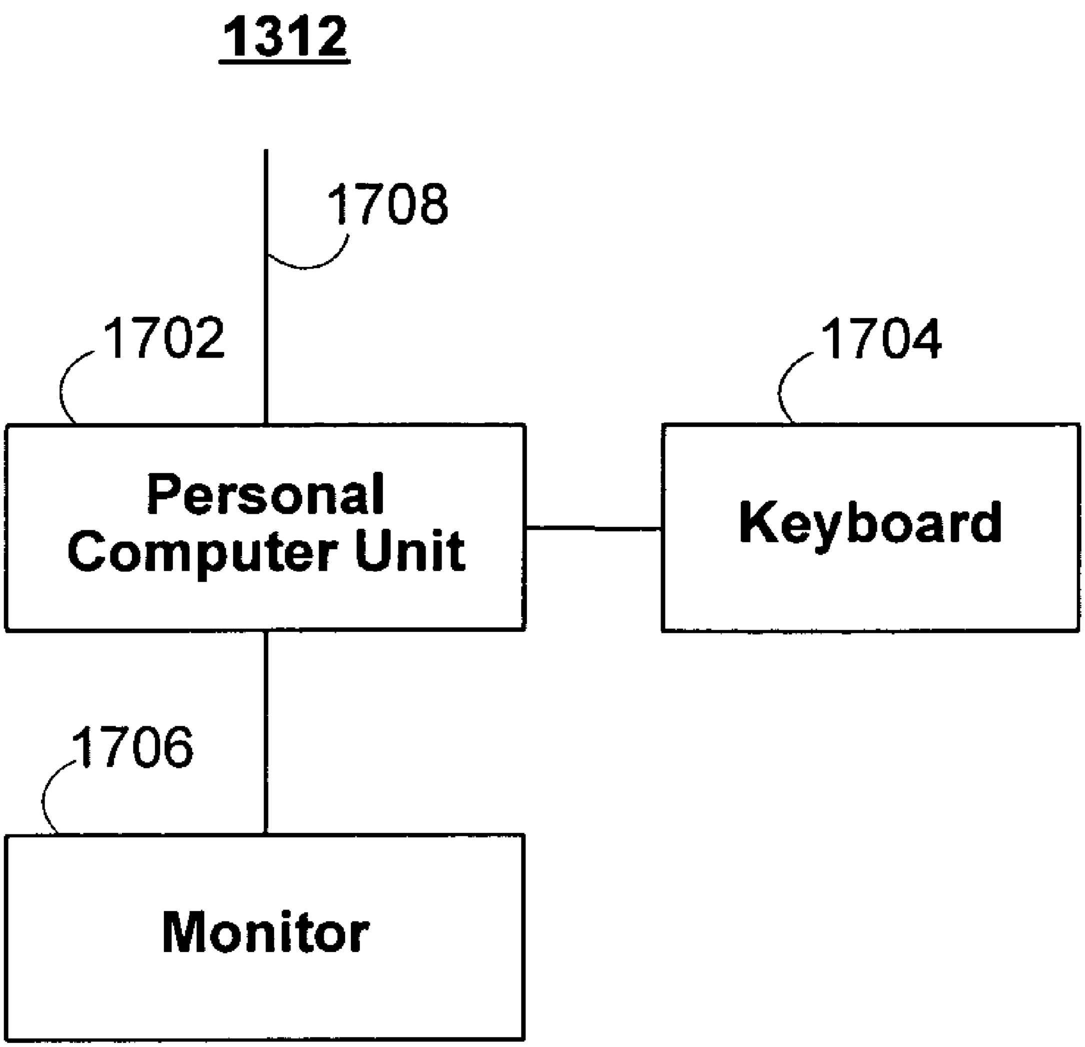
FIG. 17 is a diagram of illustrative user computer equipment in accordance with the present invention.

Illustrative user computer equipment 1312 (FIG. 13) is shown in FIG. 17. User computer equipment 1312 may be stand-alone or a part of home network 1313 (FIG. 13). In the arrangement of FIG. 17, personal computer unit 1702 may be controlled by the user using keyboard 1704 and/or other suitable user input device such as a trackball, mouse, touch pad, touch screen, voice recognition system, or a remote control, such as remote control 1600 of FIG. 16. Video content, such as television programming or web pages having video elements, and interactive media guidance application display screens may be displayed on monitor 1706. Television and music programming, media guidance application data (e.g., television program guide data), video-on-demand content, video recordings played back from a network-based video recorder, and other data may be received from paths 1318 and 1338 (FIG. 13) using input/output 1708. User commands and other information generated as a result of user interactions with the interactive media guidance application and system 1300 (FIG. 13) may also be transmitted over input/output 1708.

Personal computer unit 1702 may contain a television or video card, such as a television tuner card, for decoding analog, digital, and high-definition television channels and for handling streaming video content. Multiple video cards (e.g., tuner cards) may be provided if desired. An illustrative television tuner card that may be used may contain an analog television tuner for tuning to a given analog channel, digital decoding circuitry for filtering out a desired digital television or music channel from a packetized digital data stream, and a high-definition television tuner for tuning to a high-definition channel. Any suitable card or components in computer unit 1702 may be used to handle video and other content delivered via input/output line 1708 if desired.

Personal computer unit 1702 may contain one or more processors (e.g., microprocessors) that are used to run the interactive media guidance application or a portion of the interactive media guidance application.

Personal computer unit 1702 may include a hard drive, a recordable DVD drive, a recordable CD drive, or other suitable storage device or devices that stores video, program guide data, and other content. The interactive media guidance application and personal computer unit 1702 may use a storage device or devices to, for example, provide the functions of a personal video recorder.

User equipment, such as user equipment 1308, user television equipment 1310, user computer equipment 1312, and user equipment located on home network 1313 (FIG. 13), may be used with network equipment such as server 1330, server 1340, a home network server, and equipment at service providers such as service provider 1342 of FIG. 13 to provide network-based video recording functions. Video recording functions may be provided by storing copies of television programs and other video content on a remote server (e.g., server 1330 or server 1340 or a home network server) or other network-based equipment, such as equipment at a service provider such as service provider 1342.

Video recordings may be made in response to user commands that are entered at user equipment 1308 or user equipment located on home network 1313 (FIG. 13). In a personal video recorder arrangement, the interactive media guidance application may be used to record video locally on the user equipment in response to the user commands. In a network-based video recorder arrangement, the interactive media guidance application may be used to record video or to make virtual recordings (described below) on network equipment such as server 1330, server 1340, a home network server, or equipment at service provider 1342 in response to the user commands. The user commands may be provided to the network equipment over the communications paths shown in FIG. 13. The personal video recorder arrangement and the network-based video recorder arrangement can support functions such as fast-forward, rewind, pause, play, and record.

To avoid unnecessary duplication in a network-based video recorder environment, system 1300 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network.

Figure 18:
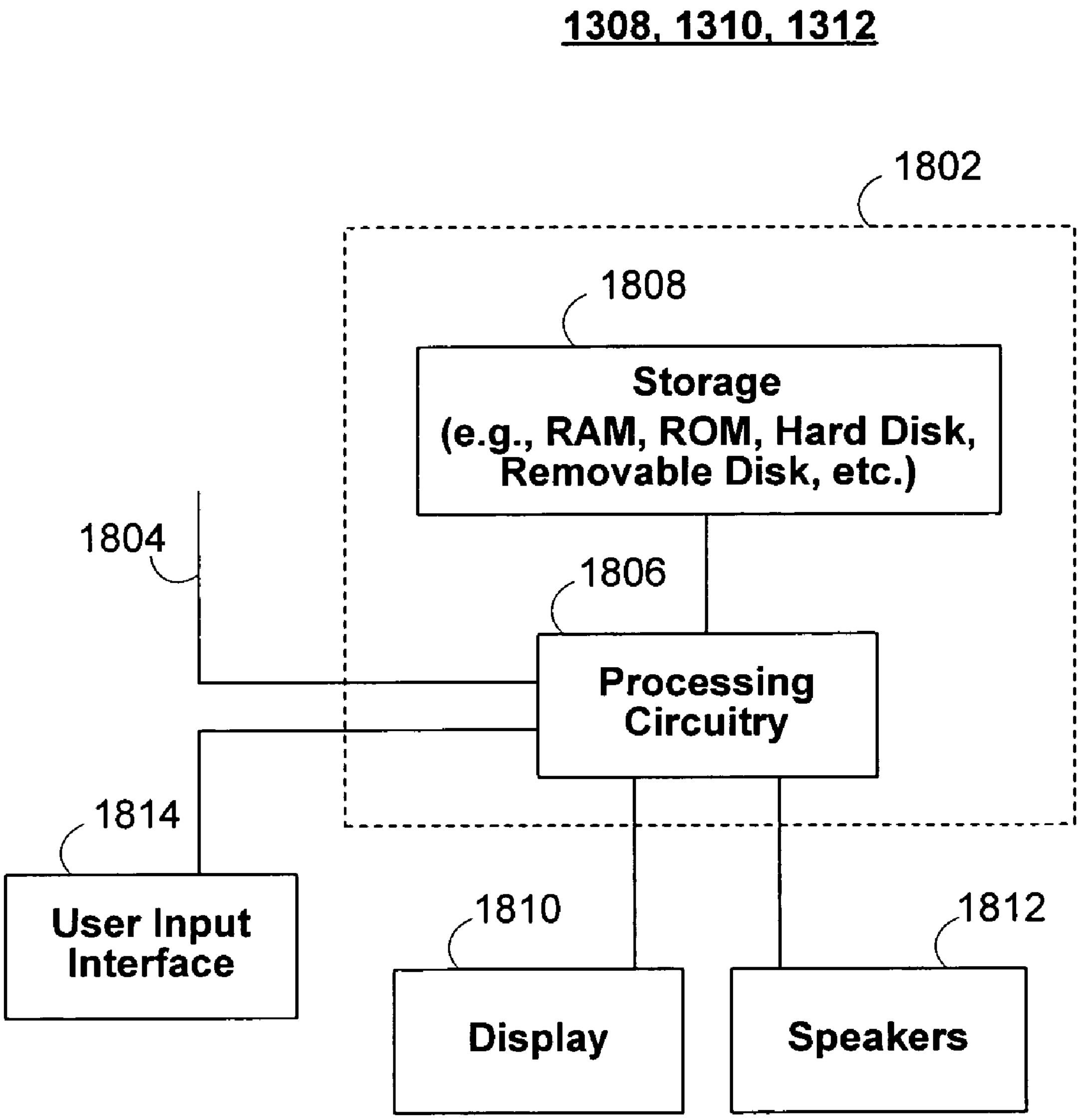
FIG. 18 is a generalized diagram of illustrative user equipment in accordance with the present invention.

The user television equipment and user computer equipment arrangements described above are merely illustrative. A more generalized embodiment of illustrative user equipment 1308, 1310, and 1312 (FIG. 13) and user equipment located on home network 1313 (FIG. 13) is shown in FIG. 18. Control circuitry 1802 is connected to input/output 1804. Input/output 1804 may be connected to one or more communications paths such as paths 1314, 1316, 1318, 1328, 1336, and 1338 of FIG. 13. Media (e.g., television programming, music programming, other video and audio and web pages) may be received via input/output 1804 (e.g., from programming sources 1302, servers or other equipment, such as server 1330, service providers such as service provider 1342, distribution facility 1304, etc.). Interactive media guidance application data, such as program schedule information for an interactive television program guide, may be received from data source 1320 via input/output 1804. Input/output 1804 may also be used to receive data from data source 1320 for other interactive television applications. The user may use control circuitry 1802 to send and receive commands, requests, and other suitable data using input/output 1804.

Control circuitry 1802 may be based on any suitable processing circuitry 1806 such as processing circuitry based on one or more microprocessors, microcontrollers, digital signal processors, programmable logic devices, etc. In some embodiments, control circuitry 1802 executes instructions for an interactive media guidance application or other interactive application (e.g., web browser) from memory. Memory (e.g., random-access memory and read-only memory), hard drives, optical drives, or any other suitable memory or storage devices may be provided as storage 1808 that is part of control circuitry 1802. Tuning circuitry such as one or more analog tuners, one or more MPEG-2 decoders or other digital video circuitry, high-definition tuners, or any other suitable tuning or video circuits or combinations of such circuits may also be included as part of circuitry 1802. Encoding circuitry (e.g., for converting over-the-air, analog, or digital signals to MPEG signals for storage) may also be provided. The tuning and encoding circuitry may be used by the user equipment to receive and display, play, or record a particular television or music channel or other desired audio and video content (e.g., video-on-demand content or requested network-based or local video recorder playback). Television programming and other video and on-screen options and information may be displayed on display 1810. Display 1810 may be a monitor, a television, or any other suitable equipment for displaying visual images. In some embodiments, display 1810 may be HDTV-capable. Speakers 1812 may be provided as part of a television or may be stand-alone units. Digital music and the audio component of videos displayed on display 1810 may be played through speakers 1812. In some embodiments, the audio may be distributed to a receiver (not shown), which processes and outputs the audio via speakers 1812.

A user may control the control circuitry 1802 using user input interface 1814. User input interface 1814 may be any suitable user interface, such as a mouse, trackball, keypad, keyboard, touch screen, touch pad, voice recognition interface, or a remote control.

FIGS. 19-23 show illustrative embodiments of data structures that may be used in accordance with the principles of the present invention to store portal, provider, vendor and program information. The data structures of FIGS. 19-23 also show illustrative data that may be stored and used by systems providing MOD portal functionalities. The data structures may be used to create and maintain a database of the portals, service providers, vendors or other media providers, programs and program information that may be accessible to a user. The data stored in the data structures may be stored in memories located in user equipment 1308, in servers 1330, 1340, in data sources 1320, or on any other servers or facilities accessible through communications network 1326, or distribution facility 1304. The data may alternatively be distributed across different servers, with, for example, program information provided by different service providers 1342 located on servers maintained by the different service providers (e.g., program information related to service provider 1342*a* may be stored on servers such as servers 1330*a*, 1340, or data source 1320*a*, while program information related to service provider 1342*b* may be stored on servers 1330*b*, 1340*b*, or data source 1320*b*). In one embodiment, the MOD portal application may store MOD portal data structure information in an MOD portal database in a data source, such as data source 1320. The MOD portal database, which may be stored at least in part in data source 1320, may be operative to communicate with one or more servers or data sources to update its program information should any service providers, vendors, or other media providers modify their selection of media offerings. The MOD portal database may thus be operative to maintain the program information it stores synchronized with the program information and program listings of the providers and vendors of the on-demand media content.

Figure 19:
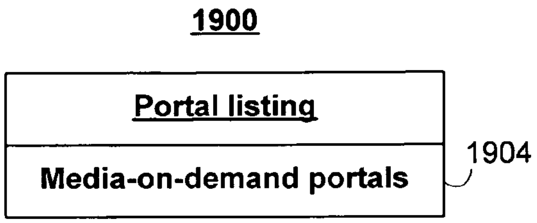
FIG. 19 is a diagram of one embodiment of a portal-listing data structure in accordance with one embodiment of the present invention.

FIG. 19 shows an illustrative embodiment of a portal-listing data structure 1900. Data structure 1900 may include field 1904 that includes the MOD portals that a user may have access to. Field 1904 may be organized in the form of a linked list of portal identifiers, an array of portal identifiers, a table of portal identifiers, or any other organization scheme of portal identifiers. It will be appreciated that all fields in data structures of FIGS. 19-23 may be organized using any organization scheme. For simplicity, the organization scheme used to describe fields in the data structures of FIGS. 19-23 will be a list.

Each MOD portal listed in field 1904 may be identified by a name and/or other unique identifier that may be used to uniquely identify and locate the MOD portal. The identifier may include, for example, an IP address or other server address that may be used to locate the MOD portal through communications network 1326. Additional information that may be included in MOD portal field 1904 is described in more detail in connection with FIGS. 20-23.

Figure 20:
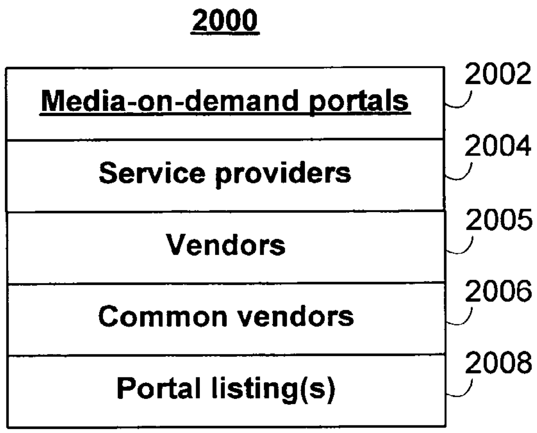
FIG. 20 is a diagram of one embodiment of an MOD portal information data structure in accordance with one embodiment of the present invention.

FIG. 20 shows an illustrative embodiment of an MOD portal information data structure 2000. Multiple MOD portals may be accessible to a user, and thus multiple instances of MOD portal information data structure 2000 corresponding to each MOD portal may be required. Data structure 2000 may include field 2002 that may include a unique name and/or identifier corresponding to a particular MOD portal. Data structure 2000 may further include field 2004 which stores a list of all service providers to which the MOD portal may provide access. Data structure 2000 may also include fields 2005 and 2006 which respectively store a list of all vendors to which the portal may provide access, and a list of common vendors to which multiple service providers may provide access. Common vendors may be identified in order to ensure that the program listings of vendors that may be accessed through different service providers are not listed multiple times in the program listings provided by the MOD portal. For example, in generating a grid display screen that is independent of program vendors and providers, such as display screen 1200, duplicate program listings corresponding to programs offered by multiple vendors may be removed or replaced by alternate program listings. Duplicate program listings may similarly be removed from other display screens that provide program listings that are dependent or independent of the vendor or provider. Data structure 2000 may additionally include in field 2008 an identifier of the portal-listing(s) the portal may be associated with. The portal-listing identifier information of field 2008 may be used to access portal listing information included, for example, in data structure 1900, and to identify other MOD portals that a user may have access to, such as MOD portals listed in field 1904.

Figure 21:
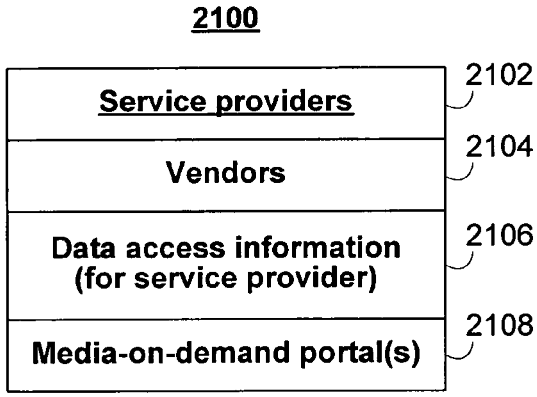
FIG. 21 is a diagram of one embodiment of a service provider information data structure in accordance with one embodiment of the present invention.

FIG. 21 shows an illustrative embodiment of a service provider information data structure 2100 used to track information related to a service provider such as a service provider identified in field 2004 of data structure 2000. Data structure 2100 may include field 2102 which stores a unique name and/or identifying information used to identify, locate, or communicate with the service provider. Data structure 2100 may also include a list of all program vendors or other content providers associated with the service provider in field 2104.

Data structure 2100 may include data access information associated with the service provider in field 2106. The data access information may include any information that may be required or useful in communicating with the service provider. This information may include, for example, information used to locate the service provider, such as a list of server addresses. This information may also be used to allow user equipment or other servers (or any equipment described in system 1300) to gain access to or identify itself to the service provider. This may include, for example, user and/or login information and information used to communicate with the service provider, such as encryption and/or decryption keys. The data access information may also include information regarding the data format or data organization scheme used by the service provider, and any other information useful in communicating with and accessing or sharing data information with the service provider. Data structure 2100 may also include in field 2108 a list of MOD portals that the service provider is associated with.

Figure 22:
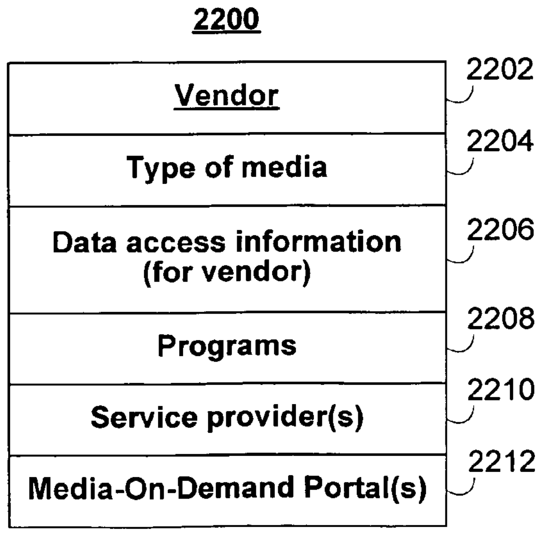
FIG. 22 is a diagram of one embodiment of a vendor information data structure in accordance with one embodiment of the present invention.

FIG. 22 shows an illustrative embodiment of vendor information data structure 2200, that may be used to store information related to vendors identified, for example, in fields 2005 and 2104 of data structure 2000 and 2100, respectively. Data structure 2200 may include in field 2202 a unique name and/or identifying information used to uniquely identify or locate the vendor. Data structure 2200 may also include in field 2204 an indication of the type of media provided by the vendor. Field 2204 may, for example, specify whether the vendor provides on-demand, pay-per-view, and/or other types of on-demand media and programs. Field 2204 may also include additional information regarding the programs, including, for example, the programs' format (high-definition (HD), standard definition (SD), etc.), and the format or type of compression that programs are transmitted in (MPEG, MP3, MPEG-4, etc.).

Data access information related to the vendor may be included in field 2206. The data access information may include information used in communicating with the vendor, and may include information similar to that described in connection with the data access information stored in field 2106 of data structure 2100. Vendor data access information may include information used to locate, gain access to, login, and/or communicate with the vendor. Field 2206 may also include information relating to the ways in which the vendor may transmit data or programming to users, and how a user may request media from the vendor. Vendor data structure 2200 may also include a listing of programs or other media offered by the vendor in field 2208. Each program listed in field 2208 may have a corresponding data structure such as data structure 2300 of FIG. 23, which includes information related to the program. Data structure 2200 may also include in field 2210 a list of all service providers that the vendor is associated with, and in field 2212 a list of all MOD portals that the vendor is associated with.

FIG. 23 shows an illustrative embodiment of program information data structure 2300, that may be used to store information related to a program identified in field 2208 of data structure 2200, for example. Data structure 2300 may include field 2302 which may include a unique name and/or identifier of the program corresponding to the data structure. Fields 2304 and 2306 may include lists of the vendors and providers, respectively, that may offer the program in their program offerings. The list of vendors of field 2304 may include identifiers, such as those of field 2202 of data structure 2200, for all the vendors whose data structure 2200 include the program in their program list in field 2208, for example. The list of providers of field 2306 may include identifiers, such as those stored in field 2102 of data structure 2100, for all the providers identified in field 2210 of the data structures of vendors listed in field 2304, for example.

Fields 2308 and 2310 may include the program type (VOD, PPV, etc.) and the program format (HD, SD, etc.), respectively. Field 2312 may include vendor-specific information related to the program for each of the vendors identified in field 2304. The vendor-specific program information may include any information that the vendor may associate with a particular program. This may include information used to organize grid displays or search results of the vendor's program.

The vendor-specific program information may be stored directly in field 2312. The program information of field 2312 may also be stored in a distinct vendor-specific-program-information data structure, where various instances of the data structure corresponding to a particular program may be referenced in field 2312 of the program's information data structure. Each instance of the data structure may contain vendor-specific program information for a particular program being offered by a particular vendor.

The vendor-specific information may include, for example, the category or categories that the program is associated with in display screens. Categories may include "Hot Pick," "New Release," "Last Chance," and other categories, such as those shown and described in connection with the display screens of FIGS. 2-12. The information may include ratings of the program, such as the vendor's rating of the program in each of the categories the program is associated with. Vendor ratings may include, for example, an indication that a program is the first hot pick or the ninth new release of all programs provided by the vendor. This information may be used to order and organize rows, columns and program listings within display screens. It will be appreciated that similar information may also be provided for categorization based on service providers. The vendor-specific information may also include other vendor-specific information, such as the price of ordering the program, and the last date the program will be offered on (if any).

Field 2314 may include information about the location of the program, such as an identifier of the server the program is stored on, or other information that may be used in requesting the program from the vendor. Information related to the location of the program may in some embodiments be repetitive of the vendor information stored in field 2304. However, if a vendor stores programming on different servers, for example, or provides or limits access to programs using various requesting schemes, the program specific storage and access information stored in field 2314 may be useful in requesting or accessing programming.

Field 2316 may include data access information for the program. The data access information may include information used in ordering or purchasing the program or in requesting additional information about the program from a vendor. The data access information may include information used to locate, gain access to, login, and/or communicate with the server on which the program is stored. Data access information field 2316 may contain data similar to that found in data access information fields 2106 and 2206 of data structures 2100 and 2200 described previously.

Data structure 2300 may also include supplemental program information in field 2318. The supplemental program information stored in field 2318 may include program-specific information that all instances of the program may substantially share. The supplemental information may include, for example, standard program information such as the information associated with programs in the Internet Movie DataBase (IMDB) and other databases. The supplemental information may include the program title, the program type (movie, program series, television special, etc.), the program date, the length of the program (time), the programs' ratings (MPAA rating, critics' ratings), lists of the program directors and actors, the program genre(s), program description information, and other information relating to a program. The supplemental information may also include supplemental program data such as icons, images, frames or thumbnails related to the program, the trailer or preview of the program, links to further program information, information about merchandise related to the program, or any other program information that may or may not be vendor specific.

The data structures described in the context of FIGS. 19-23 show illustrative types of data that may be used by the MOD portal to provide grid and other display screens to users, and to allow users to access on-demand programs and media from one or more program vendors and service providers. Different data structures containing similar, additional, or more limited program listing and other data may also be used in accordance with the principles of the present invention.

Figure 24:
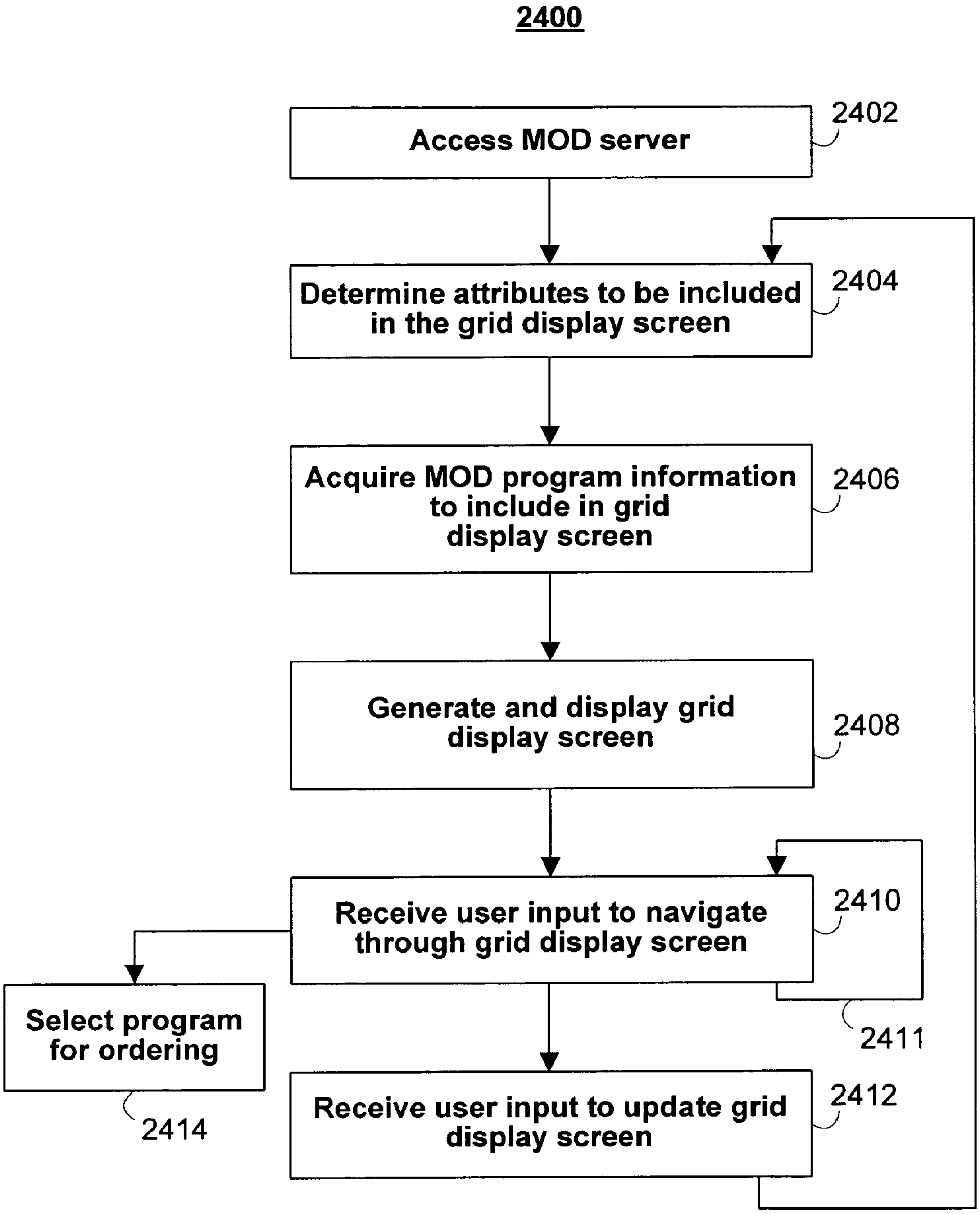
FIG. 24 shows an illustrative flow diagram for allowing the MOD portal to generate and modify grid display screens in accordance with the present invention.
Figure 25:
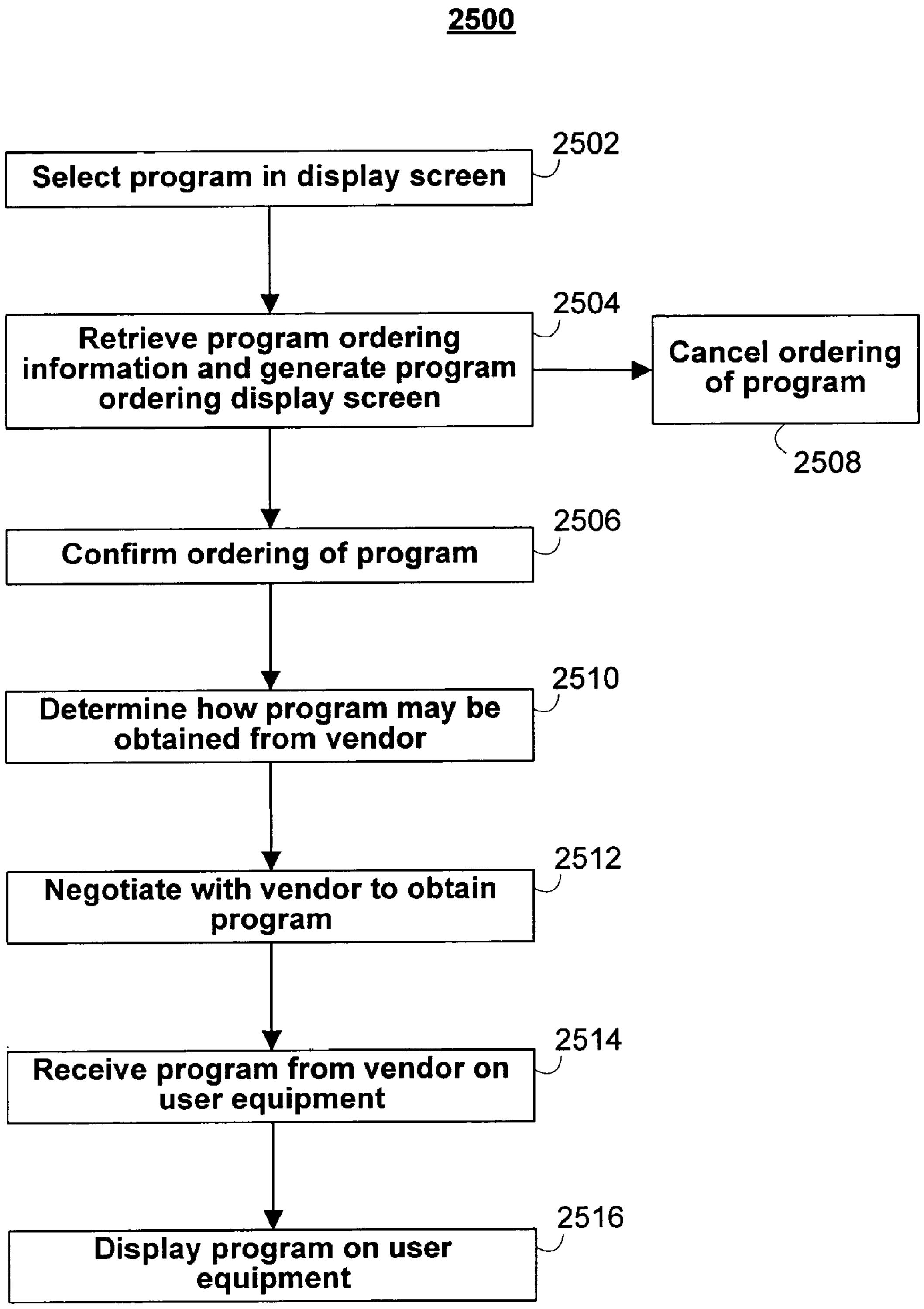
FIG. 25 shows an illustrative flow diagram for allowing a user to select, order, request, receive and view a program on user equipment in accordance with the present invention.
Figure 26:
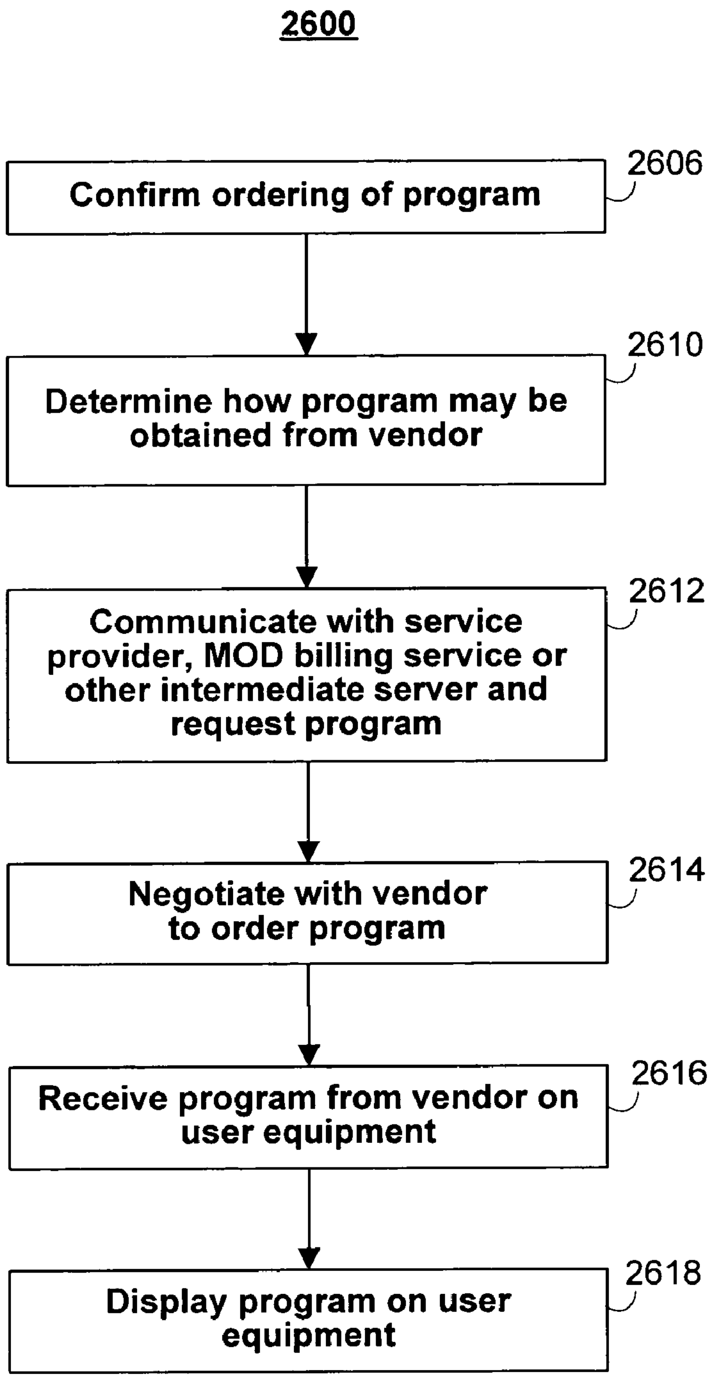
FIG. 26 shows an illustrative flow diagram for allowing a user to order, request, receive and view a program on user equipment in accordance with the present invention.
Figure 27:
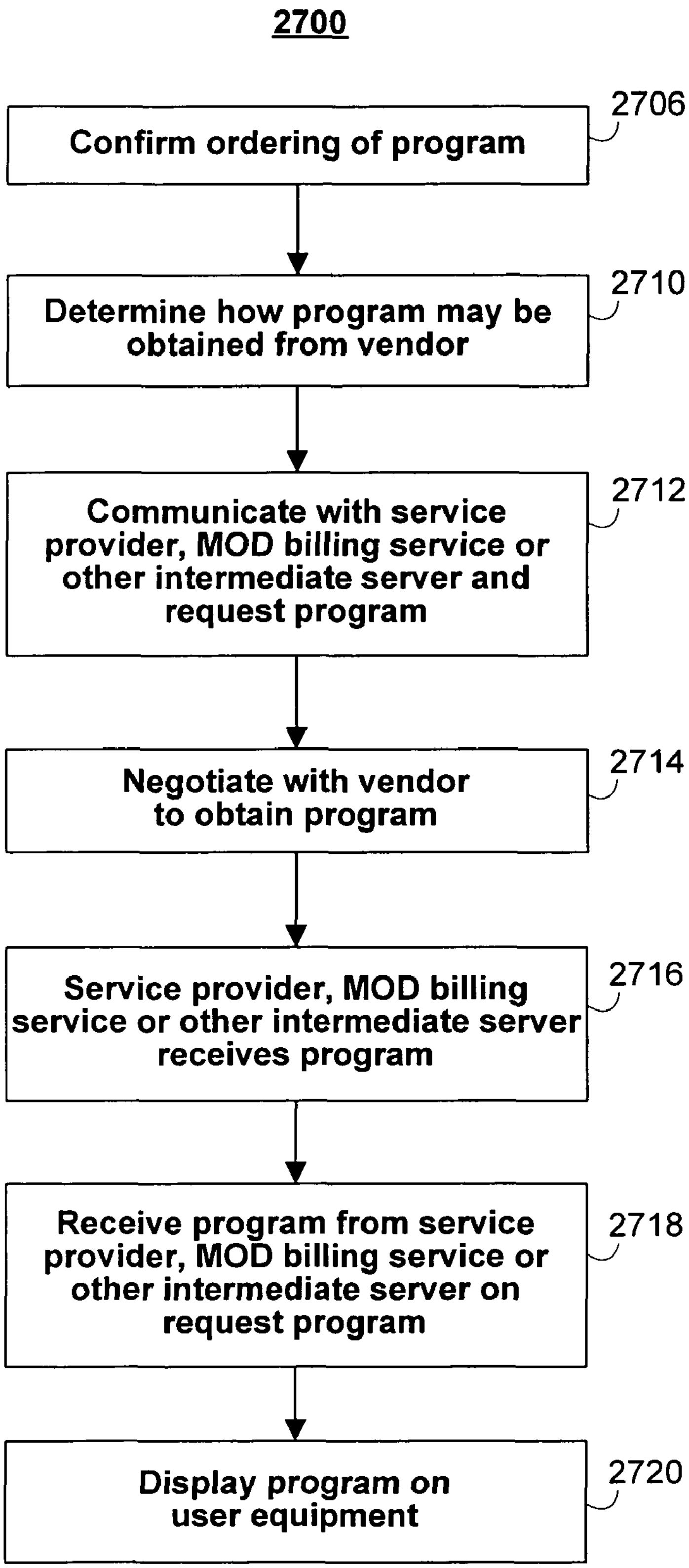
FIG. 27 shows an illustrative flow diagram for allowing a user to order, request, receive and view a program on user equipment in accordance with the present invention.
Figure 28:
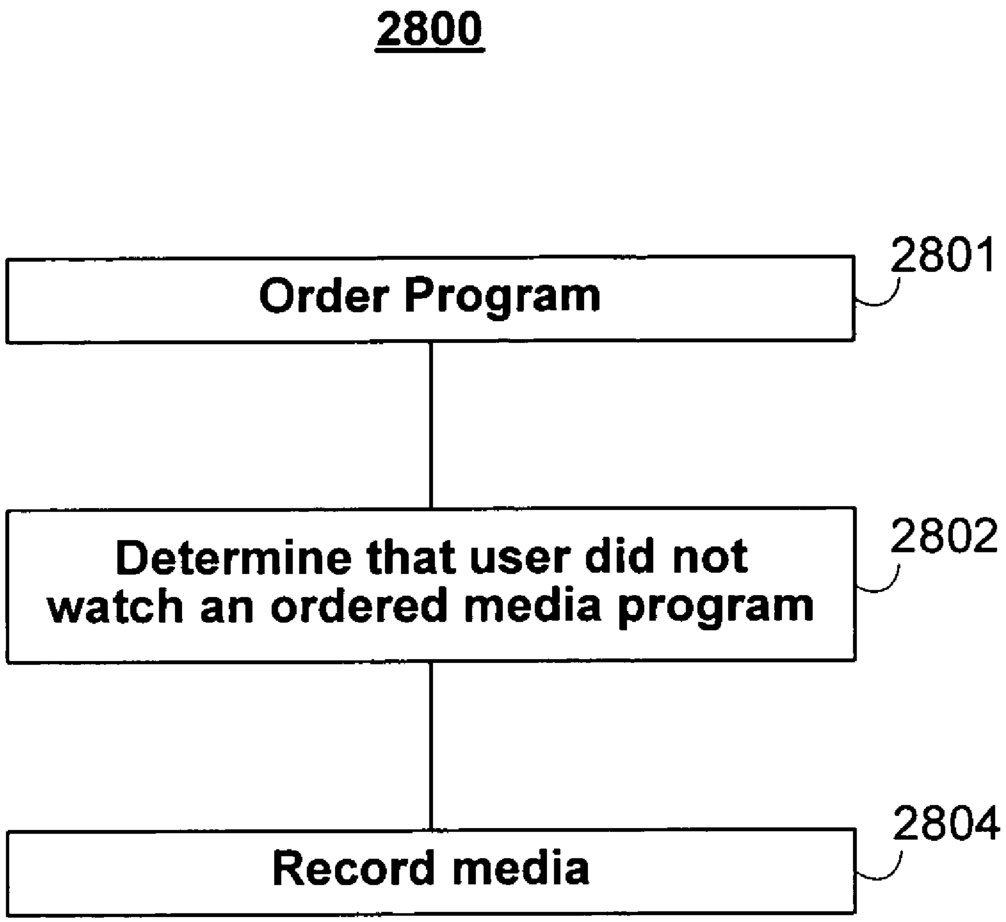
FIG. 28 shows an illustrative flow diagram for allowing a media guidance application to automatically record programs that a user may order and not watch in accordance with the present invention.

FIGS. 24-28 show exemplary flow diagrams illustrating the functioning of the MOD portal. The diagram of FIG. 24 shows an exemplary process of how the MOD portal may use program listing and other information to generate display screens for a user, and how the portal may modify the display screen in response to user input. FIGS. 25-27 show illustrative processes by which the MOD portal may allow a user to select a program, to order the program, and to view the program on user equipment. The processes of FIGS. 25-27 show different ways in which the MOD portal may provide the program to the user. Finally, FIG. 28 shows an illustrative flow diagram of a process for automatically recording programs that a user may not watch.

FIG. 24 shows illustrative process 2400 allowing a user to access a media-on-demand portal that may be used in accordance with some embodiments of the present invention. Process 2400 may be used to access media-on-demand programs distributed by a plurality of media providers using a media guidance application, for example. At step 2402, the MOD portal may be accessed by the user in any of the ways discussed herein. For example, the MOD portal may be accessed by the user in response to the user selecting an "On-Demand" menu option from a program guide presented on user equipment requesting 1308. The MOD portal may also be accessed by tuning to a channel on user television equipment 1310, or by pressing an "On-Demand" button such as button 1626 on user input device 1600, or by any other appropriate method.

At step 2404, the MOD portal application may determine the attributes of the grid or other program listing display screen to be shown on the user equipment. The attributes of the display screen may be determined by user requirements, vendor or provider requirements, MOD portal requirements, or other requirements.

At step 2406, the MOD portal application may use the requirements information to acquire MOD program information. The MOD program information may be used, for example, to identify featured programs in the MOD portal database. Once featured programs are identified, the MOD portal application may retrieve for each featured program the program information required for display in the grid (e.g., title, images, program description, etc.). The program information may generally be retrieved from field 2318 of the program's data structure 2300. Information from other fields, such as 2304, 2308, 2310, and 2312, may also be retrieved. The retrieved program information is used to generate a customized display screen at step 2408.

At step 2410, the user may navigate through the grid display screen. Navigation through the grid display screen may require relatively little access to and searching of the MOD portal database, and may be done without departing from step 2410 (as indicated schematically by loop arrow 2411). Limited access to the MOD portal database may be required at step 2410 to retrieve, for example, supplemental program information including program description information and program icons from the MOD portal database. Displaying a new page grid information may require further program information retrieval. A user may exit step 2410 and proceed to step 2412 by, for example, requesting a new grid display, entering a filter or search command, or entering other grid altering commands. The user requests of step 2412 may cause the MOD portal application to return to step 2404, where new grid attributes may be determined in order to generate a new grid according to the user's request. Alternatively, if the grid display generated at step 2408 includes programs of interest to the user, the user may navigate through the display screen at step 2410, and proceed to select a program for ordering at step 2414. Once the user has selected a program for ordering, the MOD portal application may proceed to step 2502 of FIG. 25.

In practice, one or more steps shown in process 2400 may be combined with other steps, performed in any suitable order, modified, performed in parallel (e.g., simultaneously or substantially simultaneously) or deleted. For example, in one embodiment, step 2404 may further include determining requirements or preferences for the attributes of the display screen based on the user, vendor, provider, MOD portal or other. User requirements influencing the display attributes may include user commands such as selection, filter, search, or other commands used to modify or limit the selection of programs included in a program listing or grid display. Such user commands are described in more detail herein, for example in connection with FIGS. 1-12. User requirements may also include user preferences, display preferences, or other user or user equipment specific requirements. User preferences may be stored in one or more user profiles stored on user equipment 1308, or on one or more servers including servers 1330 and 1340, for example.

Vendor or provider requirements influencing the display attributes may include general vendor or provider requirements, which may be used to determine the row or column categories used in grid displays, the order of the rows and columns within the grid, and other display preferences. The vendor or provider requirements may also include program specific requirements, such as featured programs, the ranking of programs for display within different categories, and other vendor or provider specific program information such as the information stored in field 2312 of data structure 2300.

MOD portal requirements influencing the display attributes may include requirements to determine the row or column categories used in grid displays, the order of the rows and columns within the grid, and other display preferences, for example. MOD portal requirements may also include user equipment requirements, such as limits on display screen size, screen resolution and grid size, which may influence the number of cells in the grid, for example, and the number of program listings that may be displayed within each cell.

The user, vendor, provider and portal requirements may be used to determine the attributes of the display screen and of the program offerings that will be displayed on the display screen. In the particular case of a grid display screen, for example, the requirements may be used to determine the dimensions of the grid, the row and column categories for display in the grid, the characteristics of programs to include (e.g., vendor featured programs, or highest ranked programs by critics', etc.), the maximum number of program listings included in each cell in the grid, and the display format of the program listings (e.g., whether any images or icons will be displayed, etc.). The user, vendor, provider and portal requirements may therefore be used to retrieve from the MOD portal database the information required to produce a display grid.

The MOD portal application may acquire MOD program information at step 2406 using various methods. The MOD program information may be stored in one or more data structures, such as the data structures of FIGS. 19-23. The MOD portal application may search through the program information for appropriate programs as determined by the display attributes in step 2404. In some embodiments, the MOD portal application may retrieve program information identifying programs distributed by at least two different media providers. The program identifying information and media provider identifying information may have been stored on a memory. For example, in order to produce a grid display screen such as display screen 200, the MOD portal application may search for each vendor's top rated programs for each column category included in grid 205. The vendor's top rated program for each category may be found, for example, by retrieving the vendor category and rating-by-category information stored in data field 2312 of each program's listing in the MOD portal database.

FIG. 25 shows illustrative process 2500 of a sequence of steps that may occur after a user selects a program for ordering or purchasing from a display screen in the present invention. In particular, the sequence of steps in process 2500 may involve retrieving program ordering information from the MOD portal database, prompting a user for confirmation of a selection, and negotiating and displaying the requested program on user equipment.

The following description of process 2500 is described in two parts. In a first part, steps 2502-2508, related to selection and confirmation of a program order, are described. In a second part, steps 2510-2516, related to negotiation and reception of a program, are described. The first and second parts of process 2500 are described separately for clarity and ease of understanding purposes only.

At step 2502, a program is selected from a display screen. The program may be selected from a grid display screen (such as display screen 200) or a program listing display screen (such as display screen 1100), for example. Other program selection methods may also be used.

At step 2504, the MOD portal application may retrieve program ordering information and/or program supplemental information from the MOD portal database, and may generate a program ordering display screen such as display screen 1000.

Step 2504 may include the MOD portal application retrieving from the MOD portal database information such as program vendor information stored in field 2304, program provider information stored in field 2306, program type information stored in field 2308, program format information stored in field 2310, program price information stored in field 2312, program storage location information stored in field 2314, program data access information stored in field 2316, or supplemental program information 2318. The retrieved information may be used to determine how the program may be ordered, paid for, accessed and retrieved from a vendor or provider. The retrieved information may also be used to provide additional information or additional ordering options to users in an ordering display screen, such as providing users with an opportunity to select a program format if a program is available in multiple formats, for example. In some cases, some or all of this information may have been retrieved prior to program selection, for example when the grid display 200 or the listing screen 1100 is displayed. The MOD portal application may also retrieve user profile or other user information to determine a user's access rights to the vendor's or provider's programming or to the selected program, or to determine a user's payment information, for example. The MOD portal may also retrieve from the MOD portal database additional information for generating a program ordering display screen such as display screen 1000. Such information may include program supplemental information including program title, date, MPAA rating, length, program description information, and a program image.

At step 2506, the user may confirm ordering of the program, for example, by selecting option 1013 of display screen 1000. Alternatively, at step 2508, the user may cancel ordering of the program, for example by selecting option 1011 of program screen 1000.

If the user confirms ordering of the program, the MOD portal application may determine, at step 2510, how to obtain the requested program from the vendor. This step may include retrieving program data access information and program storage location information from data fields 2316 and 2314, respectively, in order to determine where and how the program may be accessed.

Based on the determination of step 2510, the MOD portal may request and retrieve the requested program from the vendor or provider in a number of different ways. Three illustrative approaches are described in the context of FIGS. 25-27. The steps of the second part of process 2500 (steps 2510-2516) and the steps of processes 2600 and 2700 correspond to alternate methods for requesting and receiving a program. The steps of the three processes may be combined with other steps, performed in any suitable order, modified, performed in parallel (e.g., simultaneously or substantially simultaneously) or deleted. The steps may also be combined with other steps of the first part of process 2500 (steps 2502-2508), or performed in any suitable order, modified, or performed in parallel with any of step 2502-2508.

In FIG. 25, steps 2512-2516 may be used if the MOD portal application can negotiate or communicate directly with the vendor, and retrieve programs directly from the vendor. At step 2512, the MOD portal application may negotiate with a vendor access portal to obtain the requested program from the vendor. The negotiation may involve identifying the user requesting the program, the user equipment on which the program should be displayed, the user or user equipment's primary service provider, or other identifying and billing information. This information may then be provided to the vendor. Users may be identified by an account number of other identifying information. User equipment may be identified by an equipment identifier, a location identifier, or other identifier such as an IP address. The negotiation may also involve communicating to the vendor an identifier for identifying the requested program. The MOD portal application may also transmit supplemental ordering information to the vendor, the information including, for example, a request to receive the program in a particular format (high-definition, wide-screen, etc.), and any other parameters that may be chosen by the MOD portal application.

If the negotiation of step 2512 is successful, the MOD portal application may begin receiving the requested program on the user equipment at step 2514. In the case of pay-per-view programs or other broadcast programs, step 2514 may involve receiving a decryption key or other access information required from the vendor to access the program. Referring to the diagram of FIG. 13, user equipment 1308 may communicate with the vendor, and receive the requested program, through one of communication paths 1314 or 1328, for example. If the requested program is located in programming source 1302 or on server 1340, user equipment 1308 may receive the program via distribution facility 1304 and communication path 1314. Alternatively, if the requested program is located at service provider 1342, in data source 1320, or on server 1330, user equipment may receive the program either via communications network 1326 and communication path 1328, or via distribution facility 1304 and communication path 1314. Other communications paths between a vendor or service provider and user equipment 1308 may also be used to transmit the requested program from the vendor to the user equipment. At step 2516, the requested program may be displayed on user equipment 1308.

In one embodiment, steps 2506 and 2508 may be removed to allow users to receive a program directly in response to the program selection without a need for additional confirmation steps. In another embodiment, step 2510 may be substantially incorporated into step 2504. In such an embodiment, the MOD portal application may retrieve program data access information and program storage location information at step 2504, thereby allowing the MOD portal application to perform step 2512 following step 2506.

An alternative series of steps for requesting and receiving a program is shown in steps 2610-2618 of FIG. 26. Steps 2610-2618 show an illustrative series of steps involved in requesting and receiving a program from a vendor if the MOD portal cannot request programs directly from the vendor, but can receive programs directly from the vendor. Process 2600 may be used to request a program from a vendor through a third-party server, and to transmit the requested program directly from the vendor to the user equipment without passing by the third-party server. Process 2600 may be used, for example, if a vendor only accepts requests for programs from authorized servers such as service provider or billing service servers, but communicates directly with user equipment when transmitting requested programs.

Steps 2606 and 2610 may be substantially similar to steps 2506 and 2510, respectively, of process 2500. Step 2612 may be performed in response to a determination that the MOD portal cannot request programs directly from the vendor. At step 2612, the MOD portal application may communicate with a service provider, an MOD billing service, and/or another intermediate server to request the program and/or other information necessary to retrieve a program (e.g., billing information, or other information). The communication may involve providing the service provider, MOD billing service or other intermediate server with information identifying the user requesting the program, the user equipment on which the program should be displayed, the user or user equipment's primary service provider, or other identifying and billing information. The negotiation may also involve communicating to the vendor an identifier for identifying the requested program. The MOD portal application may also transmit supplemental ordering information to the intermediate server, the information including, for example, a request to receive the program in a particular format (high-definition, wide-screen, etc.), and any other parameters that may be chosen by the MOD portal application.

At step 2614, the service provider, MOD billing service or other intermediate server may negotiate with the vendor to order the requested program. The negotiation may involve identifying the requesting user and the requested program to the vendor. The negotiation may also involve providing the vendor with other information, such as billing information, requested program format parameters, and other information including the information exchanged in the context of the negotiation of steps 2512 and 2612 described previously. If the negotiation at step 2614 is successful, the MOD portal may receive the program from the vendor on user equipment at step 2616, and the program may be displayed on user equipment at step 2618.

In process 2600, the MOD portal may rely on one or more intermediate servers to relay a program request made through the MOD portal application to the vendor or service provider providing the media program. Referring to the diagram of FIG. 13, the intermediate server may be any of server 1330, server 1340 located at distribution facility 1304, a server located at service provider 1342, or any appropriate server. The intermediate server may be a server associated with a primary service provider 1342*a*, primary data source 1320*a* or 1330*a*, or a primary distribution facility 1304*a*. The intermediate server may alternatively be a server associated with a secondary service provider 1342*b*, secondary data source 1320*b* or 1330*b*, or a secondary distribution facility 1304*b*. The intermediate server may also be independent of the user's service provider, or of the service provider associated with the vendor. The communication between the MOD portal application and the intermediate server, and the communication between the intermediate server and the vendor, may follow a communication path passing through communications network 1326, through distribution facility 1304, through a direct communication link between the intermediate server and the vendor (not shown), or through any other appropriate path shown or not shown in FIG. 13. The requested program may be transmitted from the vendor to the user equipment in a manner similar to that described previously in the content of process 2500.

FIG. 27 shows a third illustrative series of steps 2710-2720 involved in requesting and receiving a program from a vendor if the MOD portal can neither request nor receive programs directly from the vendor. Process 2700 may be used to request a program from a vendor through a third-party server, and to receive the requested program from the vendor via the same or a different third-party server. Process 2700 may be used, for example, if a vendor cannot communicate directly with user equipment.

Steps 2706 and 2710 may be substantially similar to steps 2506 and 2606, and steps 2510 and 2610, respectively, of processes 2500 and 2600. Step 2712 may be performed in response to a determination that the MOD portal cannot request programs directly from the vendor, and/or cannot receive programs directly from the vendor. Step 2712 may be substantially similar to step 2612, and may involve the MOD portal application communicating with a service provider, an MOD billing service, or another intermediate server to request the program.

At step 2714, the service provider, MOD billing service or other intermediate server may negotiate with the vendor to order the requested program. The negotiation may involve identifying the service provider, MOD billing service or other intermediate server and the requested program to the vendor. The negotiation may also involve providing the vendor with other information, such as billing information, requested program format parameters, and other information including the information exchanged in the context of the negotiation of steps 2512 and 2612 described previously. If the negotiation at step 2714 is successful, the service provider or other server may receive the program from the vendor at step 2716, and may relay the program to user equipment. At step 2718, the user equipment may receive the program and may display in on user equipment at step 2720.

In process 2700, the MOD portal may rely on one or more intermediate servers to relay a program request made through the MOD portal application to the vendor or service provider providing the media program. The communication paths and servers that the MOD portal application may rely on in requesting a program from a vendor are described in more detail above in connection with process 2600. Similar communication paths and servers may be used in connection with process 2700, both to enable communication between the MOD portal, the intermediate server and vendor, and between these parties and user equipment 1308. Communication with user equipment 1308 may additionally rely on communications path 1314 between user equipment 1308 and distribution facility 1304, and communication path 1328 and communications network 1326.

In addition to the processes described in connection with FIGS. 25-27, a fourth process may be used to enable requesting and receiving of a program from a vendor by an MOD portal. The fourth process may rely on the MOD portal communicating directly with a vendor to request a program from the vendor, and the vendor transmitting the program to the user equipment via one or more intermediate servers. This fourth process, which may rely on steps substantially similar to the steps described in processes 2500, 2600 and 2700, may be used if, for example, the vendor cannot distinguish or individually address a user's equipment. In this situation, the vendor may transmit the requested program to the user's service provider, for example, and the service provider may relay the requested program to the particular user's equipment. Other processes may also be used to allow an MOD portal application to request on-demand content, and to allow user equipment to receive requested on-demand content.

In some embodiments, steps 2510, 2610 and 2710 may include further steps in which the MOD portal application may determine whether the MOD portal application can communicate directly with the vendor, and whether the user equipment can receive programs directly from the vendor. Based on this determination, the MOD portal may decide to proceed with an appropriate one of steps 2512, 2612 and 2712.

FIG. 28 shows an illustrative process for recording programs that a user has ordered but does not watch, or for allowing the user to watch the programs during later showings of the programs. The process may allow the MOD portal application or any other media guidance application to record unwatched MOD programming on a local or network-based video recorder, or to allow a user to access an ordered but unwatched MOD program at a later time. Process 2800 may be used, for example, if the ordered program is available to the user for viewing only during a rental period corresponding to a limited period of time following ordering of the program. At step 2802, it may be determined that a user is not watching a media program. At step 2804, the media program may be recorded in response to the determination that the user is not watching the program.

In one illustrative embodiment, the determination that a user is not watching a media program may be done automatically by a media guidance application. The media guidance application may detect that a user did not watch the ordered media if, for example, the user pauses or stops play of a program and fails to return to continue to watch the program. The user may pause or stop play of the program by entering a pause or stop command, by tuning away from the program, or by entering other commands in the media guidance application that may cause the application to automatically pause or stop play of the program. If the program remains paused or stopped for an extended period of time, the media guidance application may determine that the user has stopped watching the media. This determination may occur preferably before the end of the rental period or before any automatic playback timeout occurs, such as automatic playback timeouts causing an MOD server to cancel the playback of a program if the program was ordered more than one-day previously, for example, or if the program remains paused or stopped for an extended period of time.

The media guidance application may also detect that a user does not watch the ordered media if, for example, a display screen or overlay obscures or covers a substantial part, or all of, the screen displaying the ordered media. If a display screen or overlay covers a substantial part of the screen for a significant amount of time during the showing of an ordered program, or at the time the ordered program ends, the media guidance application may determine that the user did not watch the media.

The media guidance application may also determine that a user does not watch an ordered program if the user orders an MOD program using the media guidance application or an MOD portal, and never starts playback of the program. If a user does not start playback of an on-demand program after some predetermined amount of time following the ordering of the program, such as during the rental period or a subset of the rental period, the media guidance application may determine that the user will not be watching the program. The determination may preferably occur before any rental period timeout or any other timeout of the MOD server causing a cancellation of the play of the program.

An illustrative situation in which a user may order an MOD program and fail to watch it may also occur if a user orders an MOD program and schedules the program to be watched at a future time. In one embodiment, the user's television equipment may not be turned ON at the scheduled playback time. In another embodiment, the user may not tune to the MOD program at the scheduled time. This may occur if the user is not using the user television equipment or if the user is watching another program. In any of these embodiments, the media guidance application may determine that the user is not watching the program.

In a second illustrative embodiment, the determination that a user is not watching the program may be done in response to a user input indicating that the user is not watching the program. The user may, for example, activate recording by selecting button 1614 on a user input device, or by selecting a "Record" menu option to record the program. The Record menu option may be presented in a menu screen at the time the program is ordered, while the program is paused or stopped, or at any other time. In response to the user selecting the Record menu option, the media guidance application may record the program in step 2804.

In response to the determination that the user is not watching the program, the media guidance application may cause the program to be recorded. The program may be recorded on a local storage device such as recording devices 1406, 1502, or 1808, or storage devices in set-top box 1404 or computer equipment 1702, for example. The program may alternatively be recorded on a network-based storage device located, for example, in distribution facility 1304, or on one or more servers 130. The media guidance application may cause the entire program to be recorded, or only the unwatched portions of the program to be recorded.

Alternatively, in response to the determination that the user is not watching the program, the MOD portal application may allow the user to watch the program at a later time without requiring the purchase the MOD program. The MOD portal application may store an indication that the user has ordered but not watched the program, for example. The indication may be stored as part of a user profile, or other user-associated information, on a memory of the user equipment, of the MOD portal database, or at any other appropriate location. In some embodiments, the user may be charged for viewing the program only if and when the recording is watched at a later time. In some embodiments, the user may be charged for viewing the program when it is recorded, and may not be charged for the program if and when the recording is viewed at a later time. The recorded copy of the program may be automatically made unavailable (e.g., deleted or locked) after it is watched or after a defined period of time.

It will be understood that the foregoing is only illustrative of the principles of the present invention, and that various modifications can be made by those skilled in the art without departing from the scope and spirit of the present invention. The particular methods and circuit implementations shown herein are presented for purposes of illustration and not of limitation, and other constructions and embodiments can be used instead if desired.

The invention claimed is:

1. A method automatically making available to a user for viewing media that has been ordered and has not been fully watched, the method comprising:

allowing a user to order a media program for viewing, wherein the user is able to start playback of the ordered media program on-demand during a limited viewing period following the ordering of the program;

determining that the user has not watched the ordered on-demand media program during the limited viewing period; and in response to determining that the user has not watched the ordered media program during the limited viewing period, automatically accessing the ordered on-demand media program from a vendor of the ordered on-demand media program; and receiving the ordered on-demand media program without requiring the user to reorder the media program after the limited viewing period has elapsed.

2. The method of claim 1, wherein the on-demand media program is automatically made available for viewing after the limited viewing period has elapsed by recording the program.

3. The method of claim 2, wherein the on-demand program is recorded before the limited viewing period has elapsed.

4. The method of claim 1, wherein the on-demand media program is automatically made available for viewing after the limited viewing period has elapsed by allowing the user to watch the on-demand program after the limited viewing period has elapsed.

5. The method of claim 1, wherein the determining that the user has not watched the ordered program comprises determining that display of the program was obscured during a period of time during the showing of the on-demand program.

6. The method of claim 1, wherein the determining that the user has not watched the ordered on-demand program comprises determining that play of the program was stopped during the showing of the on-demand program.

7. The method of claim 1, wherein the determining that the user has not watched the ordered on-demand program comprises determining that a user tuned away from the program during the showing of the on-demand program.

8. An interactive media guide system that automatically makes available to a user for viewing media that has been ordered and has not been fully watched, the system comprising:

an interactive media guidance application implemented at least partially on circuitry configured to:

allow a user to order a media program for viewing, wherein the user is able to start playback of the ordered media program on-demand during a limited viewing period following the ordering of the program;

determine that the user has not watched the ordered on-demand media program during the limited viewing period; and in response to determining that the user has not watched the ordered media program during the limited viewing period, automatically access the ordered on-demand media program from a vendor of the ordered media program; and receive the ordered on-demand media program without requiring the user to reorder the media program after the limited viewing period has elapsed.

9. The system of claim 8, wherein the on-demand media program is automatically made available for viewing after the limited viewing period has elapsed by having the circuitry further configured to record the on-demand program.

10. The system of claim 9, wherein the circuitry is further configured to record the on-demand program before the limited viewing period has elapsed.

11. The system of claim 8, wherein the on-demand media program is automatically made available for viewing after the limited viewing period has elapsed by allowing the user to watch the on-demand program after the limited viewing period has elapsed.

12. The system of claim 8, wherein the circuitry is further configured to determine that display of the on-demand program was obscured during a period of time during the showing of the on-demand program.

13. The system of claim 8, wherein the circuitry is further configured to determine that play of the on-demand program was stopped during the showing of the on-demand program.

14. The system of claim 8, wherein the circuitry is further configured to determine that a user tuned away from the program during the showing of the on-demand program.

15. The method of claim 1, wherein the limited viewing period comprises a rental period.

16. The system of claim 8, wherein the limited viewing period comprises a rental period.

* * * * *